US006708146B1

(12) United States Patent
Sewall et al.

(10) Patent No.: US 6,708,146 B1
(45) Date of Patent: Mar. 16, 2004

(54) VOICEBAND SIGNAL CLASSIFIER

(75) Inventors: Jeremy S. Sewall, Edmonton (CA); Bruce F. Cockburn, Edmonton (CA); Deepak P. Sarda, Petalum, CA (US)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/303,160

(22) Filed: Apr. 30, 1999

Related U.S. Application Data

(63) Continuation-in-part of application No. 08/779,862, filed on Jan. 3, 1997, now abandoned.

(51) Int. Cl.[7] ............................................ G10L 15/08
(52) U.S. Cl. ....................................... 704/217; 214/215
(58) Field of Search ................................ 704/205–218, 704/231–234, 237, 238, 239, 255; 382/155; 455/226.1; 706/13

(56) References Cited

U.S. PATENT DOCUMENTS

| | | | | |
|---|---|---|---|---|
| 3,851,112 A | | 11/1974 | Kusan | |
| 4,027,102 A | | 5/1977 | Ando et al. | |
| 4,672,669 A | | 6/1987 | DesBlanche | |
| 4,720,862 A | | 1/1988 | Nakata et al. | |
| 4,815,136 A | | 3/1989 | Benvenuto | |
| 4,815,137 A | | 3/1989 | Benvenuto | |
| 4,982,150 A | | 1/1991 | Silverstein et al. | |
| 5,018,200 A | * | 5/1991 | Ozawa | 704/222 |
| 5,210,820 A | | 5/1993 | Kenyon | |
| 5,276,765 A | | 1/1994 | Freeman et al. | |
| 5,295,223 A | | 3/1994 | Saito | |
| 5,311,575 A | | 5/1994 | Oh | |
| 5,315,704 A | * | 5/1994 | Shinta et al. | 704/232 |
| 5,325,425 A | | 6/1994 | Novas et al. | |
| 5,353,346 A | | 10/1994 | Cox et al. | |
| 5,365,426 A | | 11/1994 | Siegel et al. | |
| 5,579,435 A | * | 11/1996 | Jansson | 704/208 |
| 5,602,938 A | * | 2/1997 | Akiyama et al. | 382/155 |
| 5,611,019 A | | 3/1997 | Nakatoh | |
| 5,657,424 A | * | 8/1997 | Farrell et al. | 704/255 |
| 6,061,647 A | * | 5/2000 | Barrett | 704/208 |
| 6,240,282 B1 | * | 5/2001 | Kleider et al. | 455/226.1 |
| 6,272,479 B1 | * | 8/2001 | Farry et al. | 706/13 |

OTHER PUBLICATIONS

Yatsuzuka, Y., "Highly Sensitive Speech Detector and High–Speed Voiceband Data Discriminator in DSI–ADPCM Systems," *IEEE Transactions on Communications* 30:739–750 (Apr. 1982).

Roberge, C., and Adoul, J.–P., "Fast On–Line Speech/Voiceband–Data Discrimination for Statistical Multiplexing of Data with Telephone Conversations," *IEEE Transactions on Communications* 34:744–751 (Aug. 1986).

Kobatake, H., Tawa, K., and Ishida, A., "Speech/Nonspeech Discrimination for Speech Recognition System under Real Life Noise Environments," Conf. Proceedings of the IEEE ICASSP (IV, 1989), 365–368.

*Primary Examiner*—David D. Knepper
(74) *Attorney, Agent, or Firm*—Christensen O'Connor Johnson Kindness PLLC

(57) ABSTRACT

A method and apparatus for classifying signals into a multiplicity of signal classes which employs discriminant functions of low-complexity discriminant variables that are computed directly from the passband signal. The method can be applied to the problem of classifying voiceband data (VBD), facsimile (FAX), native binary data, and speech on a 64 Kbps digital channel. In a hybrid two stage classification system, the first stage employs linear discriminant functions to make classification decisions into a smaller number of possible preliminary signal classes. The decisions of the first stage are then refined by a second stage that uses nonlinear discriminant functions such as quadratic or pseudo-quadratic functions. The second stage of a hybrid classifier then assigns the signal into a larger number of possible classes than does the first stage of the classifier alone.

20 Claims, 41 Drawing Sheets

Benvenuto, N., "Detection of Modem Type and Bit Rate of FSK Voiceband Data Signals," IEEE International Conference on Communications (Jun. 11–14, 1989),. 1101–1105.

Benvenuto, N., "Classification of Voiceband Data Signals Using the Constellation Magnitude," *IEEE Transactions on Communications* 43:2759–2770 (Nov. 1995).

Hipp, J.E., "Modulation Classification Based on Statistical Moments," Conf. Proceedings of the IEEE MILCOM (Oct. 1986), 20.2.1–20.2.6.

Mammone, R.J., Rothaker, R.J., Podilchuk, C.I., Davidovici, S., and Schilling, D.L., "Estimation of Carrier Frequency, Modulation Type and Bit Rate of an Unknown Modulated Signal," Conf. Proceedings of the IEEE International Conference on Communications (Jun. 1987), 28.4.1–28.4.7.

Benvenuto, N., and Daumer, W.R., "Classification of Voiceband Data Signals," IEEE International Conf. on Communications (Apr. 16–19, 1990), 1010–1013.

Benvenuto, N., "A Speech/Voiceband Data Discriminator," *IEEE Transactions on* Communications 43:539–543 (Apr. 1993).

"Dafotel NET–MONITOR System 2432," Product Brochure, Compression Technology Corp., Germantown, Maryland, undated.

"AT&T Voice/Data Call Classifier" Product Brochure, AT&T Network Systems, 1991.

"Digital Channel Occupancy Analyser" Product Brochure, Tellabs Ltd., Lisle, Illinois, 1990.

Law, R.A., Holm, T.W., and Cox, N.B., "Real–Time Multi–Channel Monitoring of Communications on a T1 Span," IEEE Pacific Rim Conference on Communications, Computers and Signal Processing (May 9–10, 1991), 306–309.

Shumway, R.H., "Discriminant Analysis for Time Series," in P.R. Krishnaiah and L.N. Kanal, eds., *Handbook of Statistics*, vol. 2, North–Holland Publishing Company (1982), 1–46.

Norusis, M.J., "Discriminant Analysis," in *SPSS Professional Statistics 6–1*, SPSS Inc. (1994), 1–45.

Proakis, J.G., and Salehi, M., Section 2.4, in *Communication Systems* Engineering, Prentice–Hall (1994), 100–105.

Oppenheim, A.V., and Shafer, R.W., "Spectrum Analysis of Random Signals Using Estimates of the Autocorrelation Sequence," in *Discrete–Time Signal Processing*, Prentice––Hall (1989), 742–747.

Franks, L., "Representation of Bandpass Signals," in *Signal Theory*, (1969), 79–97.

O'Neal, Jr., J.B., and Stroh, R.W., "Differential PCM for Speech and Data Signals," *IEEE Transactions on Communications* 20:900–913 (Oct. 1972).

Carey, M.B., Chen, H.–T., Descloux, A., Ingle, J.F., and Park, K.I., "1982/83 End Office Connection Study: Analog Voice and Voiceband Data Transmission Performance Characterization of the Public Switched Network," *AT&T Bell Laboratories Technical Journal*, 63:2059–2119 (Nov. 1984).

Sewall, J.S., and Cockburn, B.F., "Signal Classification in Digital Telephone Networks," IEEE Cdn. Conf. on Electrical and Computer Engineering (Sep. 5–8, 1995), 957–961.

Geisser, S., "Bayesian Discrimination," in P.R. Krishnaiah and L.N. Kanal, eds., *Handbook of Statistics*, vol. 2, North–Holland Publishing Company (1982), 101–120.

Hu, M.–K., "Visual Pattern Recognition by Moment Invariants," *IRE Transactions on Information Theory* (1968), 179–187.

Sewall, J.S., and Cockburn, B.F., "Near–Optimal Voiceband Signal Classification Using the Autocorrelation Sequence and the Central Second–Order Moment," accepted for publication, *IEEE Transactions on Communications* 45(Jul. 1997).

J.S. Sewall, *Signal Classification in Digital Telephone Networks*, unpublished dissertation, University of Alberta, Edmonton, Canada, 1996.

Cockburn, B.F. and Sarda, D.P., "Implementation and Evaluation of an Accurate Real–Time Voiceband Signal Classifier," submitted to programme committee of the 1998 IEEE Canadian Conference on Electrical and Computer Engineering (CCECE 98) Nov. 28, 1997, and Mar. 23, 1998, Conference dates, May 24–28, 1998, Waterloo, Ontario, 4 pages.

D.R Irvin, "Voice/Data Detector and Discriminator for Use in Transform Speech Coders," *IBM Technical Disclosure Bulletin*, vol. 26, No. 1, Jun. 1983, pp. 363–365.

Watanabe, Hideyuki et al., "Discriminative Metric Design For Pattern Recognition," ICASSP–95., 1995 International Conference on Acoustics, Speech, and Signal Processing (May 9–12, 1995), pp. 3439–3442 and abstract page.

* cited by examiner

Structure of the Discriminant Variable Normalizer

Linear Decision Subsystem Flowchart (no Signal PDF Database)

Signal Classification System Using Hybrid Decision Subsystem

Hybrid Decision Subsystem

Signal Classification System Using Hybrid Decision Subsystem

Note: k is an integer not less than 2 in value.

Flowchart Defining Hybrid Decision Rule
(two most probable linear classes considered)

Signal Classification System Using Normalized Discriminant Variables

Signal Classification System Using Multistage Decision Subsystem

Signal Classifier with Bayesian Decision Subsystem that Consults a Database of Probability Density Functions for the Discriminant Functions Record Structure for Database Used to Store Signal Probability Density Functions

```
pdfDatabaseRecordType {
    signalClass : 0...65535;
    discriminantVariable : 0...65535;
    intervalStart : realVariableValue;
    intervalEnd : realVariableValue;
    probability : realDecimalFraction;
};
```

FIG. 25

Signal Classifier with Bayesian Decision Subsystem that Consults a Database of Probability Density Functions for the Discriminant Functions Signal Classifier with Bayesian Decision Subsystem that Consults a Database of Probability Density Functions for the Discriminant Functions Signal Classifier with Bayesian Decision Subsystem that Consults a Database of Probability Density Functions for the Discriminant Functions Signal Classifier with Bayesian Decision Subsystem that Consults a Database of Probability Density Functions for the Discriminant Functions Bayesian Decision Subsystem Using Hybrid Decision Rule Signal Classifier with Bayesian Decision Subsystem that Consults a Database of Probability Density Functions for the Discriminant Functions Flowchart of More Specific Two-Stage Bayesian Decision Subsystem

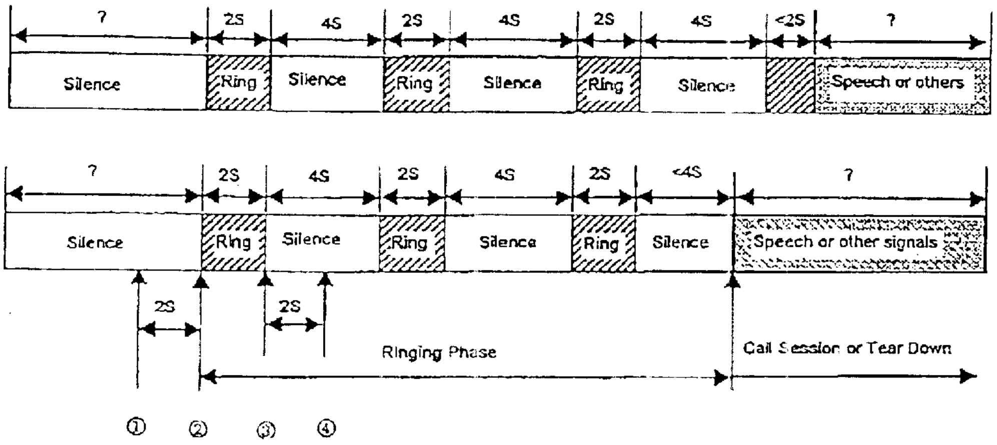
FIG. 41A Typical Call Setup Procedure
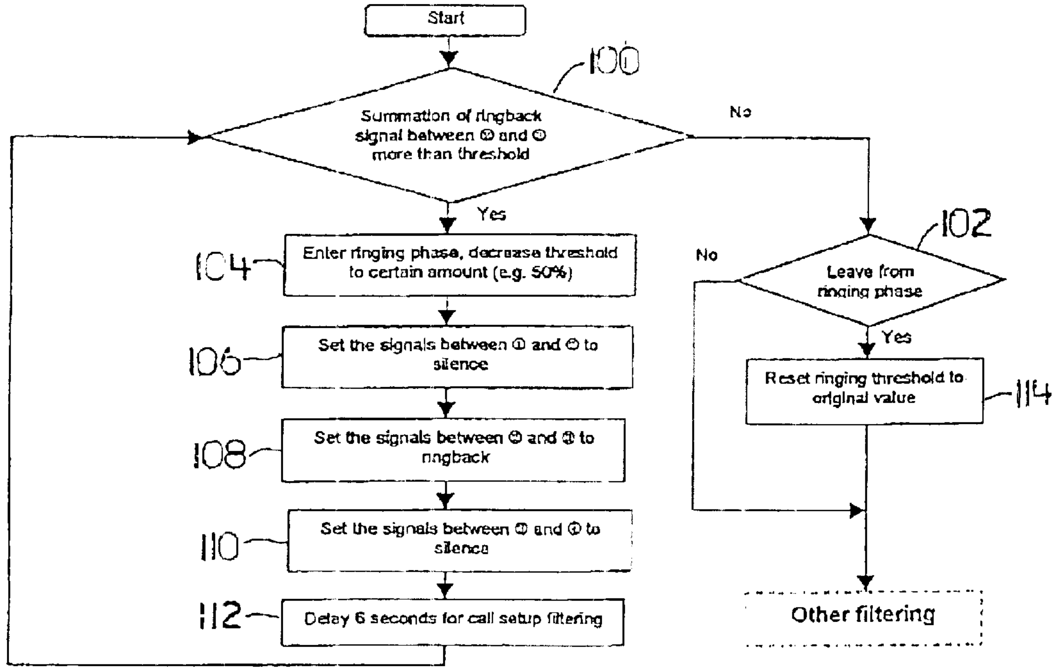
FIG. 41B Flow-Chart of Call Setup Filtering

VOICEBAND SIGNAL CLASSIFIER

CROSS REFERENCE TO RELATED APPLICATION

This is a continuation-in-part of U.S. application Ser. No. 08/779,862, filed Jan. 3, 1997, now abandoned.

BACKGROUND OF THE INVENTION

Within digital communications networks it is often desirable to be able to monitor the different types of traffic that are being transported and, specifically, to be able to assign each monitored connection to one of a number of expected signal classes. For example, within a digital telephone network it is often desirable to determine which type of voiceband traffic is being carried on 64 Kbps channels. Possible voiceband classes could be idle channels, voice signals, and voiceband data signals such as modem signals and facsimile signals. For the voiceband classification problem several methods have been proposed in the literature.

For example, using two discriminant variables, Benvenuto reports that voice and VBD signals can be distinguished in as little as 32 ms [N. Benvenuto, A Speech/Voiceband Data Discriminator, *IEEE Trans. Comm.*, vol. 41, no. 4, April 1993, pp. 539–543 and see U.S. Pat. Nos. 4,815,136 and 4,815,137 of Benvenuto]. The normalized second lag of the autocorrelation sequence (ACS) and the normalized central second-order moment of the amplitude of the complex baseband signal are used as the two sole discriminant variables. Benvenuto observes that the second lag of the ACS is usually positive for voice and negative for non-voice signals. The central second-order moment is shown to be an approximate indicator of the non-voice signal complexity in addition to being useful for voice versus non-voice discrimination.

Before classification, the signal is sampled (if analog) and divided into segments containing N samples each. Each segment must contain sufficient signal energy throughout to be acceptable for further processing. Benvenuto denotes the complex discrete-time low-pass signal by $\gamma(n)$, where n is the discrete time index. This signal is obtained by mixing the passband signal with an estimated carrier of 2 KHz and then low pass filtered. The autocorrelation sequence at lag k, denoted by $R_\gamma(k)$, is estimated by Benvenuto as $$R_\gamma(k)=(1/N)\Sigma_{i-1}^{N}\gamma(i+k)\gamma^*(i),$$

where $\gamma^*(i)$ denotes the complex conjugate of $\gamma(i)$. The values of $R_\gamma(k)$ are often normalized with respect to $R_\gamma(0)$, which is the average power for cyclostationary processes. When so normalized, the autocorrelation at lag k is denoted by $(\sim R)_\gamma(k)$. The normalized central second-order moment of a signal $\gamma(n)$ is given by $(\sim\eta)_2=(m_2/m_1^2)-1$, where $$m_1=(1/N)\Sigma_{i-1}^{N}|\gamma(i)|$$

$$m_2=(1/N)\Sigma_{i-1}^{N}|\gamma(i)|^2,$$

and $|\gamma(i)|$ denotes the phasor amplitude of $\gamma(i)$.

Benvenuto found experimentally that $(\sim\eta)_2$ and the normalized second lag $(\sim R)_\gamma(2)$, when considered together as discriminant variables, are effective for discriminating voice from non-voice. Using 32 ms signal segments, speech was misclassified as VBD about 1% of the time. With well-chosen decision boundaries, VBD is rarely misclassified as speech. On the other hand, Benvenuto's method has less success when applied to classify other voiceband signals.

Signals such as V.34 modem, V.22bis modem, and speech, may be classified on the basis of their differing power spectral density (PSD) shapes. The PSD of a signal can be obtained by computing the Fourier transform directly, or the Fourier transform can be estimated using faster techniques. However, computing Fourier transforms requires large numbers of floating point operations (FLOPS), in the order of $10^5$ FLOPS per PSD. On the other hand, computing autocorrelations requires substantially fewer FLOPS, in the order of $10^4$ FLOPS for a 32 ms signal segment.

Commercial voiceband classifiers known to be available in the art include CTel's NET-MONITOR System 2432, AT&T's Voice/Data Call Classifier, Tellabs' Digital Channel Occupancy Analyzer, and MPR Teltech Ltd.'s Service Discrimination Unit. Many of these units exploit call set-up signaling to aid classification and/or use computationally expensive spectral analysis techniques. For the voiceband signal classification problem, the new classification method permits physically smaller and cheaper classifiers with classification resolution and accuracy superior to that of commercially available units.

SUMMARY OF THE INVENTION

The inventors propose a new signal classifier and method of classifying a signal. The new classification method achieves greater accuracy with lower computational effort than prior art methods such as that of Benvenuto. For the voiceband classification problems the new method classifies a broader set of voiceband signals and has lower misclassification rates by virtue of employing computationally efficient discriminant variables and preferably using statistically optimal (or near-optimal) discriminant functions.

The signal classification method may operate on the signal being carried by a connection without having knowledge of when the connection may have been created. The method may also be employed in situations where there is access to only one direction of a bidirectional connection. Thus connections do not have to be monitored full-time; this avoids requiring knowledge of initial handshaking sequences or signalling data and is consistent with the scenario where the classifier sequentially scans over many connections, spending only a brief time monitoring the signal on each connection in turn.

The invention involves the use of information in the initial lags of the autocorrelation function of the signal.

In other aspects of the invention, improved techniques are used to classify signals: (a) to perform full-wave rectification rather than complex demodulation; (b) to use an improved estimate of the ACS on the passband signal; (c) to use statistical methods to determine an optimal subset of ACS lags to include as discriminant variables for greater VBD signal resolution; and (d) to use statistical methods to form optimal or near-optimal discriminant functions.

Therefore, there is provided, in accordance with one aspect of the invention, a signal classifier for classifying a signal into one of a plurality of signal classes, the signal having at least one segment with N samples. The signal classifier comprises an autocorrelator that generates more than one autocorrelation coefficient and a discriminator that operates on more than one, but less than N, autocorrelation coefficients to discriminate between signal classes. The discriminator implements both a linear decision sub-system and a non-linear decision sub-system. In another aspect of the invention, there is provided means to compute a normalized central second-order moment of the segment, and in which the discriminator is operable on the normalized central second-order moment. The means to compute the central second-order moment of the segment preferably includes a rectifier for rectifying the signal before computation of the central second-order moment.

A power estimator, for estimating the average power of the signal over the segment, may be used, together with an idle channel detector, to identify when the signal power is below a threshold for a given segment. The output of the power estimator may also be used to normalize the autocorrelation coefficients.

These and other aspects of the invention are described in the detailed description and claims that follow.

BRIEF DESCRIPTION OF THE FIGURES

There will now be described preferred embodiments of the invention with reference to the drawings, in which like numerals denote like elements and in which:

FIG. 25 is a schematic showing a Record Structure for Database Used to Store Signal Probability Density Functions;

FIGS. 41A and 41B show a typical call structure and a call structure filter flow chart.

DETAILED DESCRIPTION OF PREFERRED EMBODIMENTS

Figure 1:
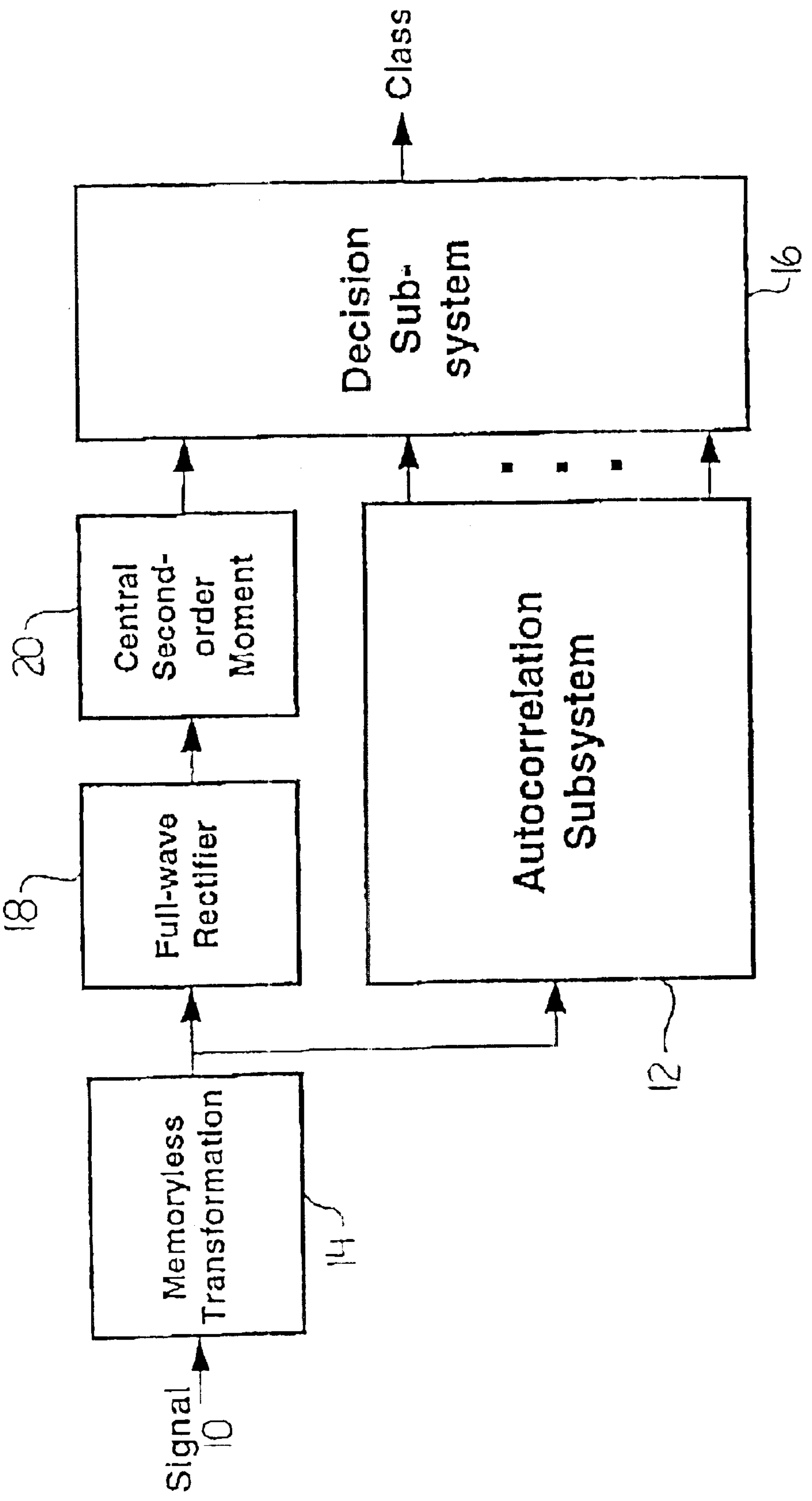
FIG. 1 is a schematic of a signal classification system according to the invention.

Referring to FIG. 1, there is shown a signal classifier for classifying a signal 10. Typically, the signal 10 is a sequence of codes representing samples of an originally analog signal taken at a regular sampling interval t. The signal 10 may be input directly to an autocorrelator 12 but may also be transformed using a memoryless transformation 14, for example a nonlinear transformation, or a transformation effected by a lookup table, into a set of processed codes that may be input directly to the autocorrelator 12. Autocorrelators are well known in the art. The autocorrelator may be implemented in specially designed hardware, but it is usual to implement the autocorrelator in a conventional computer, for example a personal computer or digital signal processor using software that configures the computer to carry out autocorrelations.

The autocorrelator 12 preferably implements the following unbiased estimator for the ACS of a passband signal 10 (Equation 1):

$$R_d(k)=1/(N-|k|)\Sigma_{i=1}^{N-|k|}[d(i+k)d(i)].$$

where d(i) is the real-value of the passband signal at time interval i, N denotes the segment length in number of samples, and k identifies the lag of interest in the range 0, . . . , N−1. The lag k should equal the sample interval t or a multiple of the sample interval t. By computing a real ACS estimator rather than a complex-valued one, the number of multiplications is reduced by a factor of 2 and one fewer addition is required per sample.

When the signal 10 is encoded using some form of quadrature amplitude modulation (QAM), which is typicall of most VBD and FAX signals, the passband representation of a QAM symbol at time t=0 has the general form:

$$U_{mn}(t)=A_m g\mathrm{T}(t)\cos(2\pi F_c t+\theta(n)),$$

where $F_c$ is the carrier frequency, $A_m$ is the symbol amplitude, and θ(n) is the symbol phase. The impulse response of the pulse shaping filter gT(t) is usually defined as a square-root raised cosine. The transmitted baseband QAM signal v(t) is given by:

$$v(t)=\Sigma_{n=-\infty}^{\infty}A_n\ e^{j\theta(n)}g\mathrm{T}(t-nP),$$

where the signal v(t) is represented as an infinite sum of complex symbols $A_n\ e^{j\theta(n)}$ multiplied by shaped pulses gT(t) appropriately delayed by integral multiples of the symbol period P. Since the symbol sequence $\{A_n\ e^{j\theta(n)}\}$ is random, v(t) can be interpreted as a sample function of some random process V(t).

The time averaged autocorrelation of a baseband QAM signal is given by:

$$(\bar{R})_v(\tau)=(1/T)\Sigma_{m=-\infty}^{\infty}R_a(m)R_g(\tau-mT),$$

where τ is the lag offset, T is the interval over which the autocorrelation is averaged, $R_g(T)$ is the ACS of gT(t), and $R_a(\tau)$ is the ACS of the symbol sequence $\{A_n\ e^{j\theta(n)}\}$. By taking the Fourier transform of the preceding equation, the following PSD of v(t) is obtained:

$$S_v(f)=\int_{-\infty}^{\infty}(\bar{R})_v(\tau)e^{-j2\pi f\tau}d\tau=(1/T)S_a(f)(G\mathrm{T}(f))^2,$$

where: $S_a(f)=\Sigma_{m=-\infty}^{\infty}R_a(m)e^{-j2\pi fmT}$ and GT(f) is the Fourier transform of gT(t). The time averaged autocorrelation of the passband QAM signal becomes:

$$(\bar{R})_u(\tau)=(1/T)\Sigma_{m=-\infty}^{\infty}R_a(m)R_g(\tau-mT)\cos(2\pi F_c\tau).$$

For QAM, if the information sequence contains symbols that are uncorrelated and have zero mean, then $R_a(0)=\sigma_a^2$ and $R_a(T\neq 0)=0$ and the preceding equation simplifies to $$(\bar{R})_u(\tau)=(1/T)\tau_a^2R_g(\tau)\cos(2\pi F_c\tau).$$

Assuming that similar pulse-shaping filters are used, two signals must differ significantly in either their PSDs or their carrier frequencies to be distinguishable using only their ACSs (which are linear transforms of the PSDs). Two QAM signals that encode zero-mean uncorrelated symbol sequences and that use identical carrier frequencies and pulse shaping filters cannot be distinguished using only their ACSs.

Consequently, a signal class structure for common voiceband signals that allows the autocorrelation signal to be used to distinguish the classes is as follows, where the different classes group together signals with similar PSDs and carrier frequencies.

Class 1: slow modems (forward channels), including Bell 103, V.21, Bell 212A, V.22 and V.22bis.

Class 2: slow modems (reverse channels), including Bell 103, V.21, Bell 212A, V.22 and V.22bis.

Class 3: fastest modem (V.34 and V.90 uplink)

Class 4: common fax (V.29)

Class 5: fast fax (V.17), modem (V.32 and V.32bis).

Class 6: slow fax V.27ter at 4800 bps)

Class 7: slowest fax (V.27ter at 2400 bps)

Class 8: speech, both sexes.

Class 9: native binary and V.90 downlink.

Equation 1 outputs a series of values $R_d(k)$, k–0 to N−1, for each segment of length N of signal 10 (or a processed form of signal 10). Lag 2 ($R_d$(2)) was used by Benvenuto to distinguish speech from non-speech. To distinguish between classes 1–9, not only is it preferable to use other lags, but it is preferable to use combinations of lags. A combination of autocorrelation lags used to discriminate between signal classes is a discriminant function. The discriminant function is implemented in a discriminator 16 which in its preferred form implements a statistically optimal discriminant function, Thus, if s is a sequence s={s(t), t=0, . . . , N−1} consisting of N consecutive measured values of some physical signal parameter, as for example, speech, and a discriminant variable is a function of an observation s (such as the mean of the observation s), then a discriminant function is a linear or non-linear (but preferably quadratic) function of two or more discriminant variables. An optimal discriminant function is a discriminant function that, subject to restrictions on the form of the function, minimizes the probability of misclassifying a randomly selected observation.

Given a class $E_j$ and a set {x1, . . . , xw} of discriminant variables, the mean vector $\mu_j=(\mu_j(1), \ldots, \mu_j(W))$ is a vector of length W>1 containing the means of each of the variables over all observations in $E_j$. The covariance matrix $R_j$ for class $E_j$ is a W×W matrix, where each element $e_j(t,u)$ denotes the covariance between variables $x_t$ and $x_u$ over all observations in class $E_j$ (note that 1≦t≦W and 1≦u≦W). Statistically optimal linear discriminant functions can be computed using standard algorithms when the following conditions are met: (1) the mean vectors for all classes are distinct; (2) the covariance matrices for all classes are equal; and (3) the components of the observations x are normally distributed within each class. For the two-class case (q=2), the optimal linear discriminant function DL(x) as implemented by discriminator 16 is given by:

$$D\mathrm{L}(x)=(\mu_1-\mu_2)^tR^{-1}x-(\tfrac{1}{2})\mu_1^tR^{-1}\mu_1+(\tfrac{1}{2})\mu_2^tR^{-1}\mu_2,$$

where $\mu^t$ denotes the transpose of $\mu$ and $R^{-1}$ denotes the inverse of the covariance matrix R over the set union of all classes. An observation x is assigned to class 1 if DL(x)>K for some suitable threshold K; otherwise, x is assigned to class 2. Threshold K is selected to minimize the probability of misclassifying class 1 observations as class 2, and vice versa.

For the case with more than 2 classes (q>2) it is convenient to define the following intermediate term for each class j:

$$g_j(x)=\mu_j^t R^{-1} x-(½)\mu_j^t R^{-1}\mu_j$$

for j=1, 2, . . . , q. Bayesian allocation causes an observation x to be allocated into class c whenever $$g_c(x)-g_j(x)>ln\pi_j-ln\pi_c$$

for j=1, 2, . . . , q and j≠c. In the preceding expression, ni denotes an estimate of the prior probability that an arbitrary observation will belong to class j. The expression ln $\pi_j$ denotes the natural logarithm of $\pi_j$. Bayes' rule is that the probability of P of some event E, given that another event A has been observed, is equal to the prior probability of E times the probability of A given the occurrence of A divided by the probability of A for all possible events E. A linear discriminant function will have the form F=ΣiCiRdi. The preferred Rdi are selected ones of Rd0, Rd1 . . . Rd9 for the discrimination of classes 1–9 as discussed below. The coefficients $C_i$ may be estimated from empirical observation and/or optimized using Bayes' rule. For application of Bayes' rule (to yield optimal classification—it is not necessarily required) the following steps must be taken:

Calculate the discriminant variables.

Calculate the linear or quadratic discriminant functions using the variables.

For each function, calculate the posterior probability of class membership for each class using Bayes' rule. Extra information required to use Bayes' rule, incudes the a priori probabilities of class membership (which may be assumed to be equal for all classes) and the probability density functions for each function in each class.

The observation is then allocated to the class with the highest a posteriori probability of membership.

If the mean vectors for all classes are equal, then an optimal linear discriminant function cannot be computed. However, if the intra-class covariances are different, then Shumway [Discriminant Analysis for Time Series, pp. 1–46 in *Handbook of Statistics*, vol. 2, North-Holland Pub. Co., 1982] describes how an optimal quadratic discriminant function can be formed from the discriminant variables. For two-class problems, Shumway's optimal quadratic discriminant function D'Q(x) has the form:

$$D'_Q(x)=(½)x^t(R_2^{-1}-R_1^{-1})x+(\mu_1^t R_1^{-1}-\mu_2^t R_2^{-1})x.$$

This equation can be interpreted as the sum of discriminant variables multiplied by coefficients, added to a constant value. Since x is a vector, it may be used to represent a set of discriminant variables. Once the somewhat complicated computation of the optimal values for the coefficients is performed using the discriminant variable mean values and covariances, computing the discriminant function for a particular observation vector is straightforward. For zero-mean stationary stochastic signals, that is when $\mu_1=\mu_2$, the quadratic discriminant function in the two-class case simplifies to (equation 2)

$$D_Q(x)=x^t(R_2^{-1}-R_1^{-1})x.$$

For the case with more than 2 classes (q>2) where the means vectors are unequal and the covariance matrices are unequal, it is convenient to define the following intermediate term for each class j:

$$h_j(x)=g_i(x)-(½)ln(\det(R_j))-(½)x^t R_j^{-1}x$$

for j=1, 2, . . . , q. In the preceding formula ln(det($R_j$)) denotes the natural logarithm of the determinant of covariance matrix $R_j$. An observation x should be allocated into class c whenever $$h_c(x)-h_j(x)>ln\pi_j-ln\pi_c$$

for j=1, 2, . . . , q and j≠c.

Commercially available statistical software packages may be employed to compute near-optimal pseudo-quadratic discriminant functions such as those packages described in M. J. Norusis, *SPSS Professional Statistics* 6.1, SPSS Inc., 1994, and henceforward referred to as SPSS. However, such packages do not achieve the accuracy that could be achieved using true quadratic discriminants. A pseudo-quadratic discriminant function is a function that approximates a quadratic function, but uses fewer computations to yield a similar result. Examples are used by the SPSS software. The difference between the pseudo-quadratic discriminant function and the optimal discriminant function is that classification is based on the discriminant functions and not on the original variables. In the pseudo-quadratic form of equation 2, the R matrices are replaced by the covariance matrices of the canonical linear discriminant functions. The standard canonical discriminant function coefficient matrix is formed by solving a general eigenvalue problem from the unscaled discriminant function coefficient matrix (as discussed in the manual for the SPSS software).

Benvenuto found that the central second order moment $(\sim\eta)_2$ and the autocorrelation coefficient for lag 2 $(\sim R)_\gamma(2)$ computed on the approximately demodulated baseband signal are sufficient for discriminating voice from non-voice. These variables are inadequate for subclassifying at least some common VBD signals, such as V.22bis and V.34. By including the first autocorrelation lag $(\sim R)_\gamma(1)$ on the passband signal, these two signal types are easily discriminated. However, as in Benvenuto, it is preferable to compute the central second-order moment.

As shown in FIG. 1, the input signal 10 is rectified in a full-wave rectifier 18 before computing the central second order moment in processor 20. The omission of demodulation is acceptable since conventional digital signal processors (DSPs) used in the autocorrelator 12 and discriminator 16 are sufficiently powerful to operate directly on signals in the voiceband passband. Rectification of the input signal 10 is required because the $m_1^2$ denominator in the formula for $(\sim\eta)_2$ is zero for passband signals. Rectification in the case of digitally encoded signals may be achieved in conventional manner by simply zeroing the sign bit in the sample codes. The equation for $(\sim\eta)_2$ remains the same, but $m_1$ and $m_2$ are defined as $$m_1=(1/N)\Sigma_{i-1}^N(\hat{}d)(i) \text{ and}$$

$$m_2=(1/N)\Sigma_{i-1}^N[(\hat{}d)(i)]^2,$$

where (^d)(i) denotes the real-valued of the i-th sample of the full-wave rectified passband signal.

Figure 2:
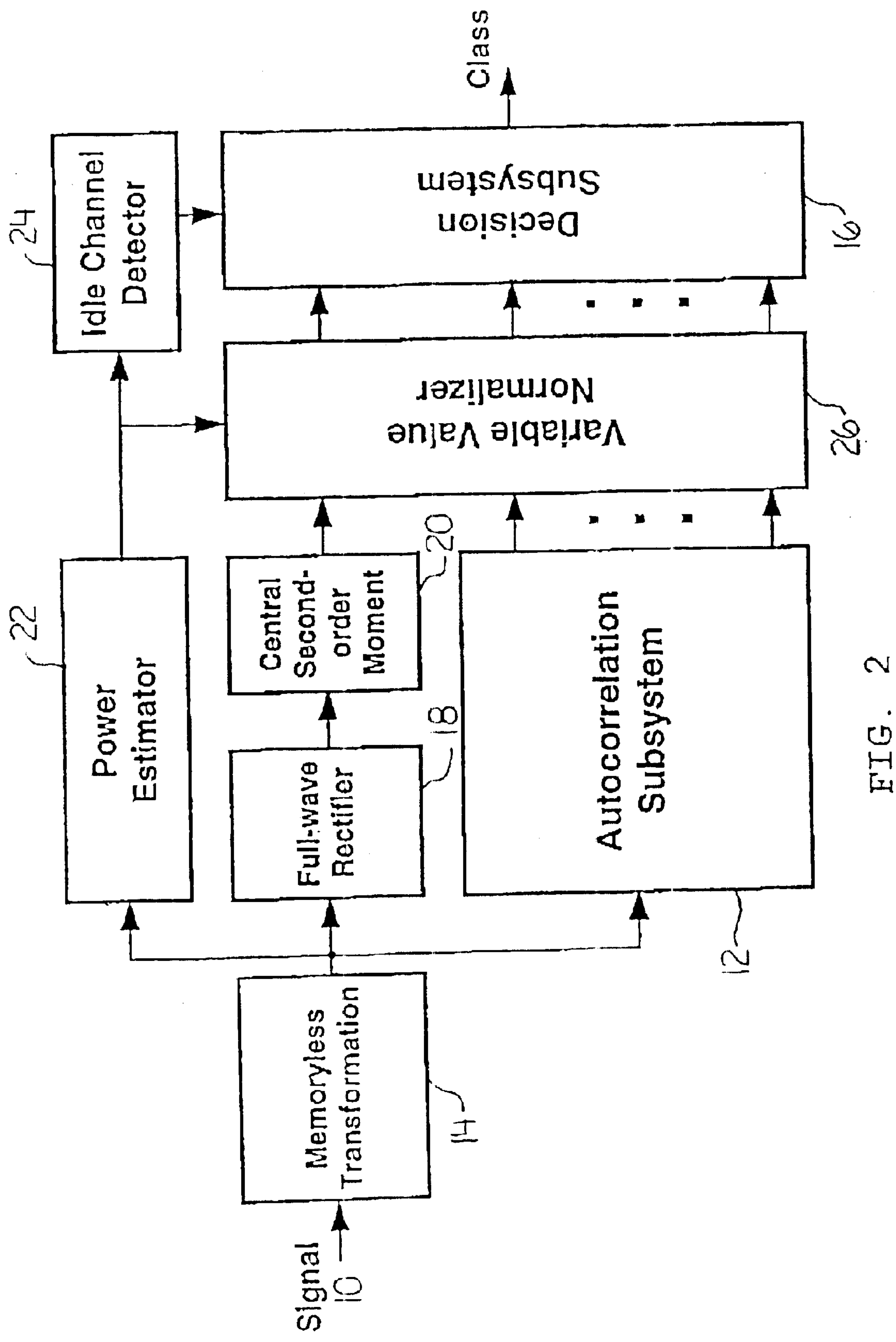
FIG. 2 is a schematic of a signal classification system according to the invention using normalized discriminant variables.
Figure 3:
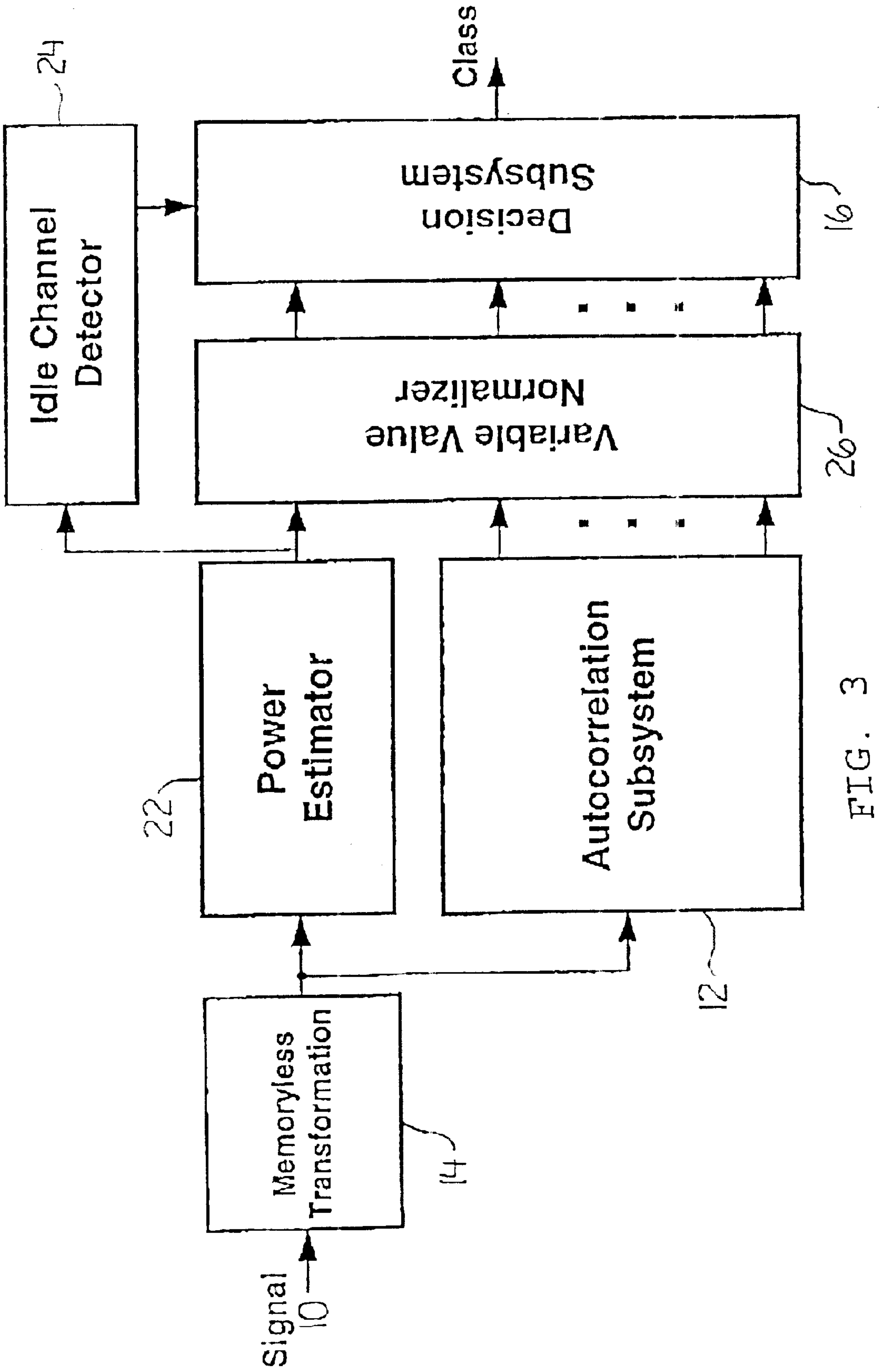
FIG. 3 is a schematic of a signal classification system according to the invention using autocorrelation values only.
Figure 7:
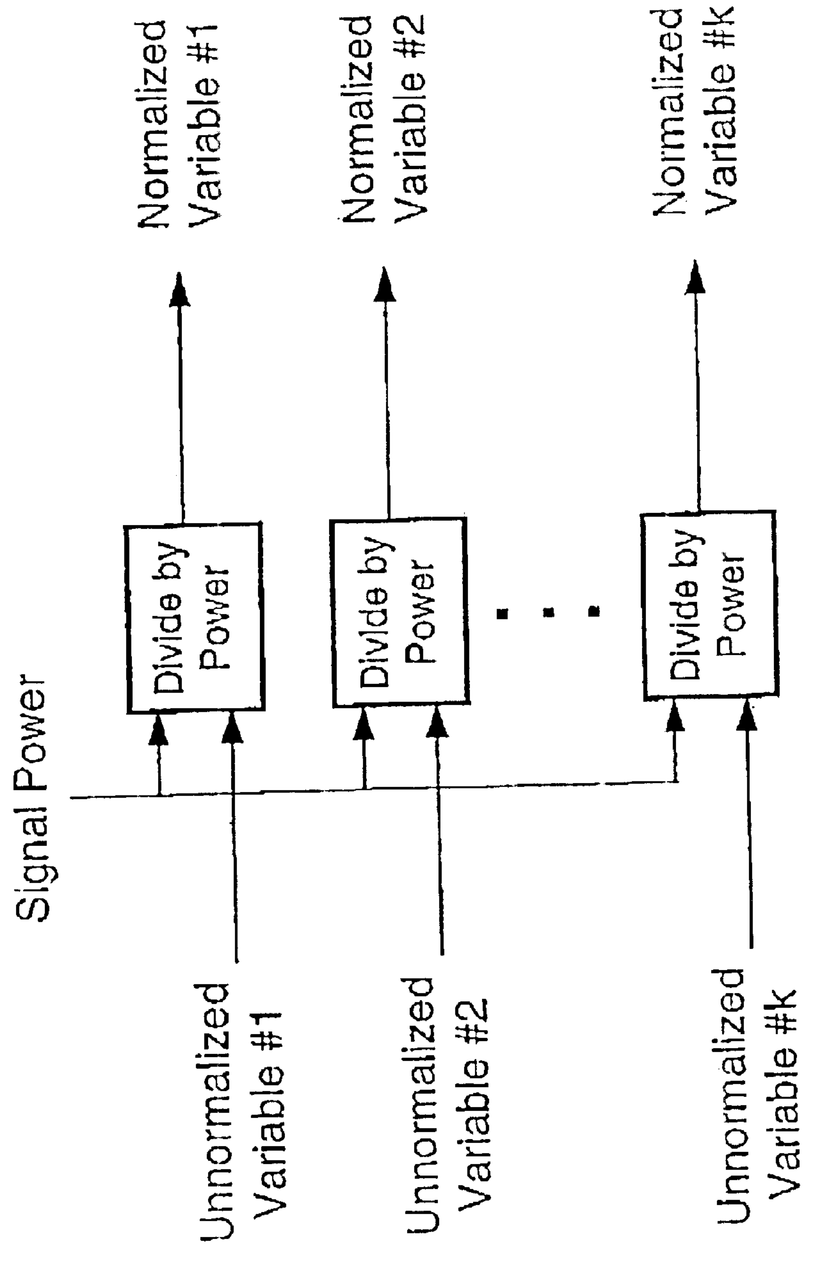
FIG. 7 is a flow diagram showing the Structure of the Discriminant Variable Normalizer.
Figure 8:
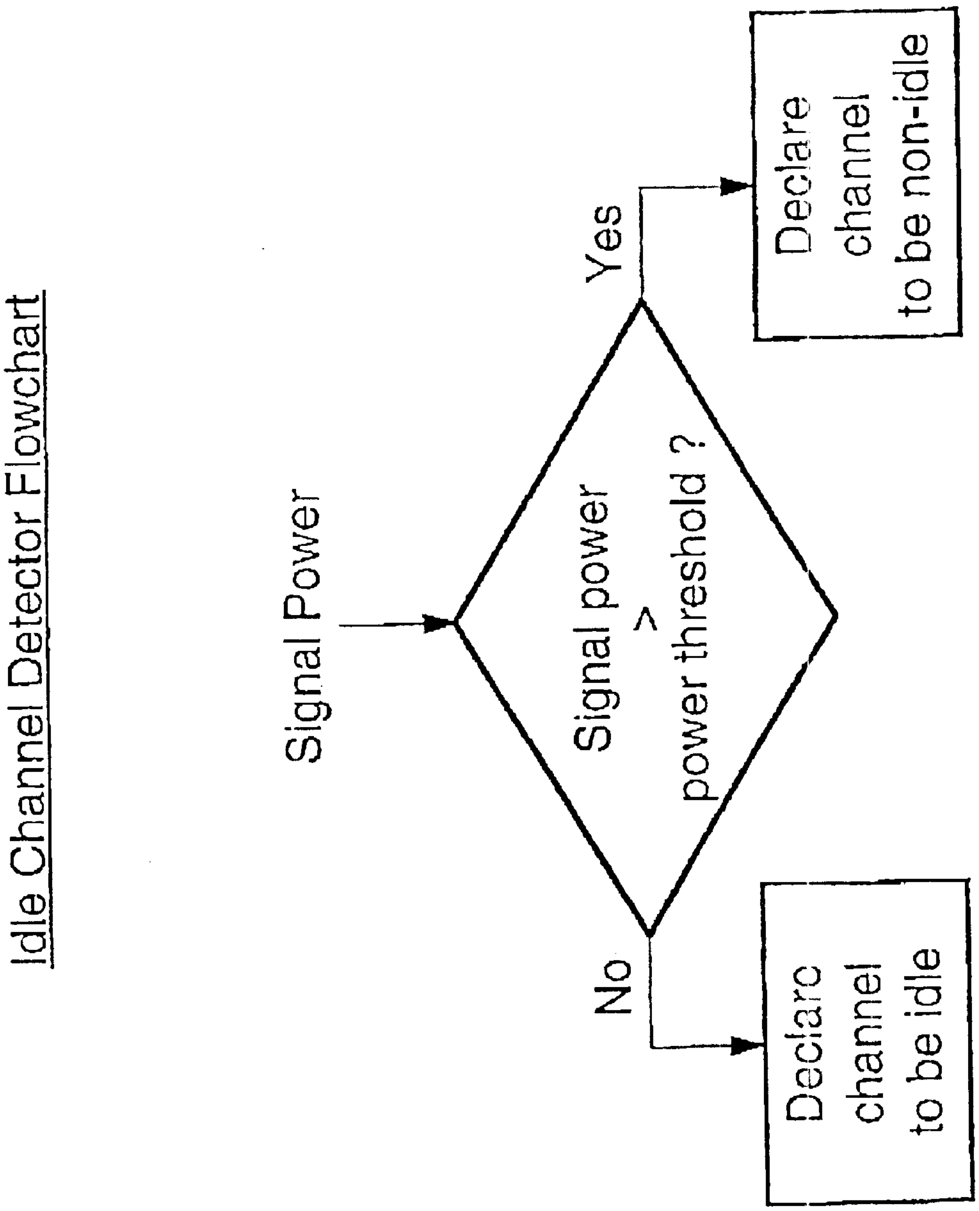
FIG. 8 is a flow diagram showing the Idle Channel Detector.

Combinations of the autocorrelation coefficients are required to discriminate between signals from classes 1–9. In addition, as shown in FIGS. 2 and 3, silent signals are detected by first passing the input signal 10 to a power estimator 22, to produce an estimate of the power of the signal. The power estimate of the segment may be estimated as the autocorrelation of the signal segment with lag 0. The output of the power estimator 22 is passed to idle channel detector 24 which compares the power of the signal 10 to a threshold and outpus a signal indicative of whether there is a signal present or the channel is silent as illustrated in FIG. 8. An idle or silent channel may be considered to have a signal of class 0. As indicated in FIG. 2 the value of the central second order moment and the autocorrelation coefficients may be normalized with respect to the average power in normalizer 26. The structure of the normalizer 26 is shown in FIG. 7. Normalization is carried out in the conventional manner by dividing the unnormalized variables 1, . . . , k, namely the output of the central second order moment generator 20 and the output of the autocorrelator 12, by the estimate of the signal power from power estimator 22 to yield as output the normalized variables 1, . . . , k. As shown in FIG. 3, the signal classifier may omit use of the central second order moment for signal classification, and thus omit elements 18 and 20, the other elements of FIG. 2 remaining the same.

In the preferred implementation of the invention, the normalized central second-order moment of the rectified passband signal (henceforth denoted by N2) and the first ten lags Rdi of the ACS of the passband signal (henceforth denoted by Rd1, . . . , Rd10, respectively) are used as discriminant variables for a linear discriminant function. Commercial statistical analysis software SPSS can then be used to rank the eleven candidate variables as to their usefulness for classification.

Figure 9:
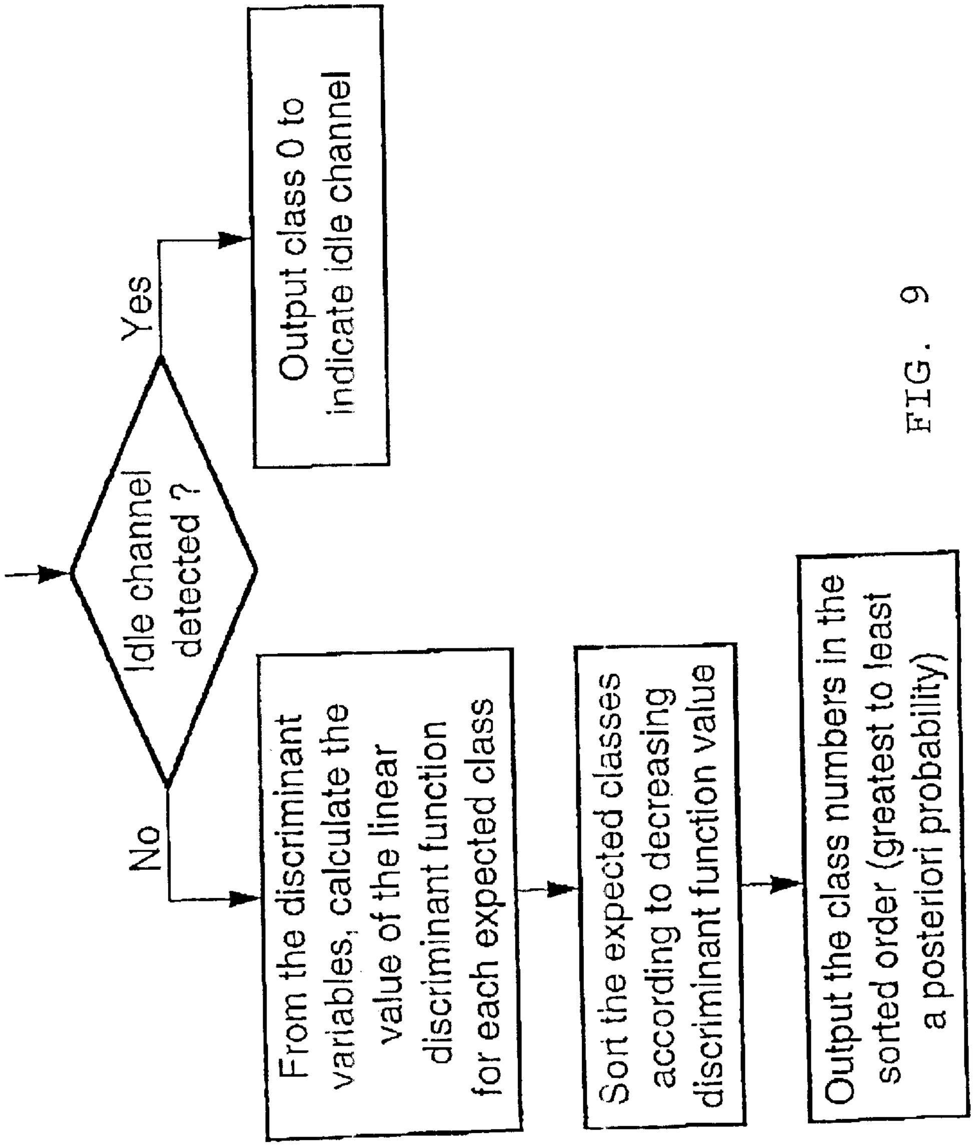
FIG. 9 is a flow diagram showing the Linear Decision Subsystem (no Signal PDF Database)

FIG. 9 illustrates operation of a decision subsystem 16, in the case of a linear decision subsystem. First, the subsystem decides whether an idle channel is detected, and outputs class 0 to indicate idle channel if the answer is yes. If an idle channel is not detected, the linear discriminant function for each expected class is calculated using the discriminant variables output from the normalizer 26. The expected classes are then sorted according to decreasing discriminant function value, and the class numbers are output in the sorted order.

Figure 10:
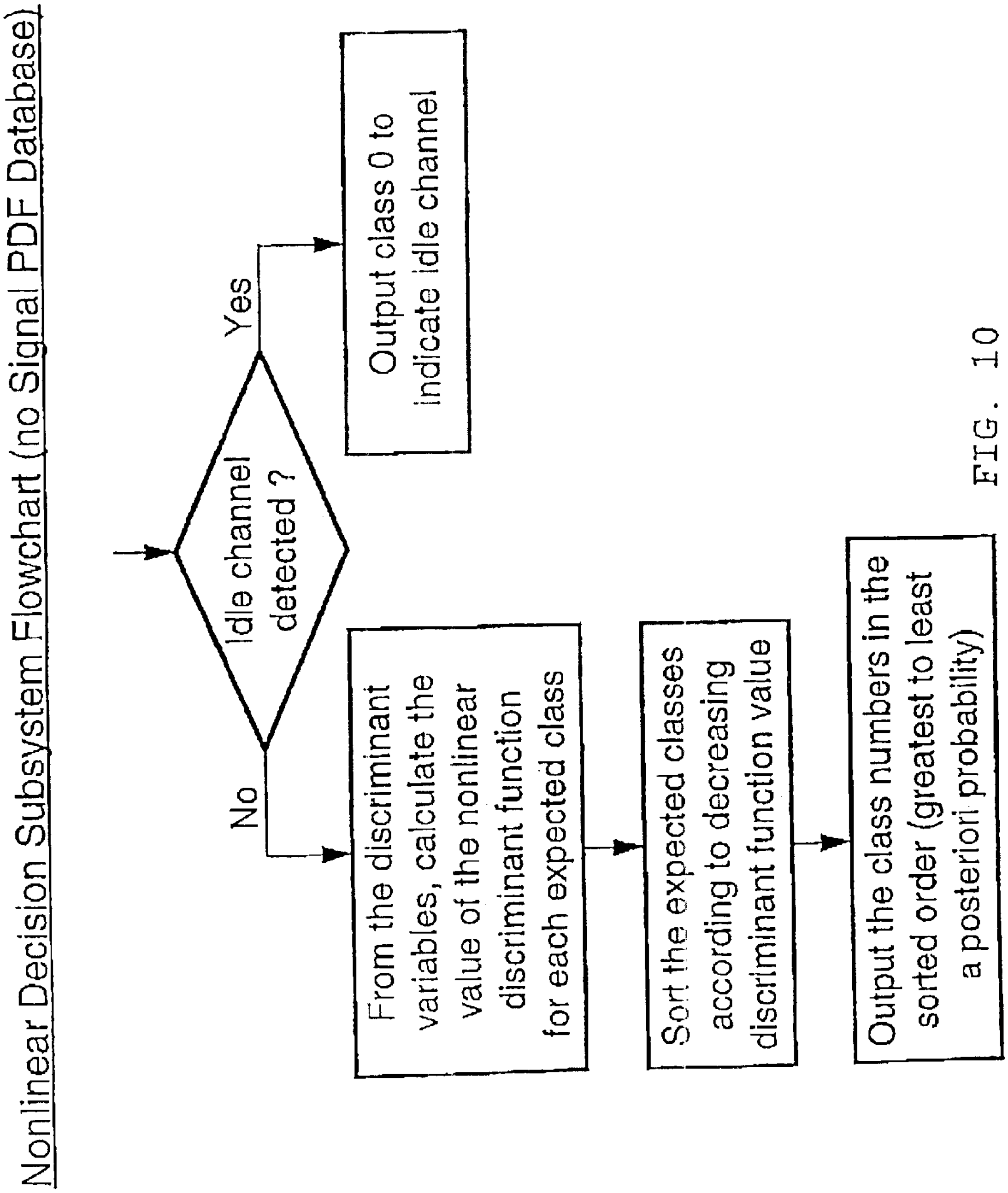
FIG. 10 is a flow diagram showing the Nonlinear Decision Subsystem (no Signal PDF Database)

FIG. 10 illustrates operation of a decision subsystem 16, in the case of a non-linear decision subsystem. First, the subsystem decides whether an idle channel is detected, and outputs class 0 to indicate idle channel if the answer is yes. If an idle channel is not detected, the non-linear discriminant function for each expected class is calculated using the discriminant variables output from the normalizer 26. The expected classes are then sorted according to decreasing discriminant function value, and the class numbers are output in the sorted order.

A distance measure is a function that determines how effective a given discriminant variable is at discriminating between a given set of classes. Distance measures allow different candidate variables to be ranked according to their relative usefulness in a classification problem. SPSS provides the following five distance measures: (1) Wilk's lambda, (2) unexplained variance, (3) Mahalanobis distance, (4) smallest F ratio, and (5) Rao's V.

In the problem of distinguishing speech (class 8) from non-speech (the eight VBD classes), the five distance measures provided in SPSS agree on the following ranking (from most to least effective) of the 11 candidate discriminant variables: N2, Rd9, Rd4, Rd1, Rd2, Rd8, Rd3, Rd10, Rd7, Rd5, and Rd6. N2 is the most effective variable for discriminating speech from non-speech. Rank of the discriminant variables Rd0–Rd9 and N2 is shown in Table 1 below for discrimination between mostly non-speech classes:

TABLE 1

| Rank | Wilks' Dist | Mahalanoboi | F-ratio | Rao's V | Unexplained |
|---|---|---|---|---|---|
| 1 | Rd2 | Rd4 | Rd4 | Rd2 | Rd2 |
| 2 | Rd3 | Rd8 | Rd1 | Rd4 | Rd1 |
| 3 | Rd7 | Rd5 | Rd5 | Rd5 | Rd4 |
| 4 | Rd1 | Rd7 | Rd8 | Rd7 | Rd5 |
| 5 | Rd4 | Rd9 | Rd7 | Rd1 | Rd3 |
| 6 | Rd5 | Rd6 | Rd9 | Rd6 | Rd6 |
| 7 | Rd6 | Rd10 | Rd6 | Rd3 | Rd8 |
| 8 | Rd8 | Rd1 | Rd10 | Rd9 | Rd7 |
| 9 | N2 | N2 | N2 | Rd8 | Rd9 |
| 10 | Rd9 | Rd3 | Rd3 | N2 | N2 |
| 11 | Rd10 | Rd2 | Rd2 | Rd10 | Rd10 |

As shown in Table 2, below, for the full problem of discriminating between signal classes 1–9, as determined using SPSS, variables Rd4, Rd5, Rd1, Rd7, and Rd2 have the highest average rankings, while N2 has the second lowest average ranking. When the speech class is removed from consideration, variables Rd4, Rd2, Rd6, Rd5, and Rd3 have the highest average rankings, while N2 has the lowest average ranking. Rd4 is the most effective ariable for non-speech signal subclassification. Rd4 also has the largest Mahalanobis distance between classes 4 and 5, which happen to be the most difficult to classes of classes 1–9.

TABLE 2

| Rank | Wilks' Dist | Mahalanoboi | F-ratio | Rao's V | Unexplained |
|---|---|---|---|---|---|
| 1 | Rd4 | Rd4 | Rd4 | Rd4 | Rd2 |
| 2 | Rd2 | Rd2 | Rd5 | Rd2 | Rd4 |
| 3 | Rd5 | Rd6 | Rd2 | Rd6 | Rd5 |
| 4 | Rd6 | Rd5 | Rd6 | Rd8 | Rd6 |
| 5 | Rd7 | Rd1 | Rd1 | Rd3 | Rd1 |
| 6 | Rd3 | Rd3 | Rd3 | Rd7 | Rd3 |
| 7 | Rd8 | Rd10 | Rd10 | Rd10 | Rd7 |
| 5 | Rd1 | Rd8 | Rd8 | Rd5 | Rd10 |
| 9 | Rd10 | Rd7 | Rd7 | Rd1 | Rd8 |
| 10 | N2 | Rd9 | Rd9 | Rd9 | Rd9 |
| 11 | Rd9 | N2 | N2 | N2 | N2 |

If the number of discriminant variables is restricted to three, it has been found that Rd4, Rd5, and Rd1 are the most effective classification variables for distinguishing between classes 1–9. However, for many applications it is especially important to achieve accurate voice versus non-voice discrimination. Thus variable N2 is preferably included in a three variable set. The second most desirable variable has been found to be Rd4. Variable Rd2 is probably the best third variable to choose (rather than Rd5, Rd1, or Rd7) since Rd2 is a compromise that contributes to voice versus non-voice discrimination as well as to VBD subclassification.

Classification algorithms designed in accordance with the present invention were verified through simulation using a data set containing roughly 2.25 hours of both recorded and simulated signals representing all nine classes 1–9. Without a priori knowledge of class probabilities, roughly equal durations of signals from each VBD class were included in the data set. Examples of most of the VBD fall-back modes (with different baud rates, carrier frequencies, and/or modulation types) were also included.

Signals were recorded using a workstation equipped with a telephone interface, an external FAX/modem, a codec, and a digital signal processor (DSP). In addition, samples of the common International Telecommunications Union (ITU) VBD signals (except V.34) were simulated directly. Recorded calls were sampled at 8 KHz and stored as companded mu-law pulse-coded modulation (PCM) codes.

Thirty-two different speech recordings totaling 850 seconds were collected. One recorded a typical conversation between male and female English speakers. Thirty-one recordings are of people speaking the same two representative English sentences used by O'Neal and Stroh [J. B. O'Neal Jr. and R. W. Stroh, Differential PCM for Speech and Data Signals, *Trans. Comm.*, vol. COM-20, no. 5, October 1972, pp. 900–912]:

Nine rows of soldiers stood in a line, and

The beach is dry and shallow at low tide.

To model the effects of analog line impairments, a simulated channel model was included before the classifier for samples in the data set. The channel model allowed introduction of controlled amounts of attenuation distortion, frequency offset, envelope delay distortion, flat attenuation, echoes, and additive noise. Impairment levels were selected to produce worst case, moderate, and best case channels according to the 1982/83 ECOS study [M. B. Carey, H. T. Chen, A. Desloux, J. F. Ingle, K. I. Park, 1982/83 End Office Connections Study: Analog Voice and Voiceband Data Transmission Performance Characterization of the Public Switched Network, *AT&T Bell Labs. Tech. J.*, vol. 63, no. 9, November 1984, pp. 2059–2119].

As reported in J. S. Sewall and B. F. Cockburn, Signal Classification in Digital Telephone Networks, *Proc.* 1995 *IEEE Cdn. Conf Electrical and Comp. Eng.*, pp. 957–961, Benvenuto's classifier was compared with a classifier using a single autocorrelation and rectification of the input signal before computing the central second-order moment. Comparable classification accuracy is achieved with much less effort by using rectification instead of the complex demodulation stage of Benvenuto.

Increasing the number of samples N per processed signal segment improves classification accuracy. For example, with a variable set N2, Rd2 and Rd4, a quadratic discriminant function improves from about 85% accuracy at N=256, to 95% at N=512, 96% at N=1024 and 97% at N=2048. To salvage as much of the signal as possible, each N-sample segment should be constructed by concatenating possibly noncontiguous subsegments containing L=16 samples, in which subsegments are included in a segment only if they exceeded an empirically determined power threshold $P_{Th}$.

The inventors have evaluated discriminant functions that are purely linear, purely pseudo-quadratic, and a combination of the two types. In one series of simulations the sample size was set to N=1024 and all eleven discriminant variables (N2 and Rd0 to Rd9) were used. The resulting linear classifier had an overall accuracy $P_c$ of 91.14% if each signal class has equal representation; for the pseudo-quadratic classifier the overall accuracy rose to $P_c$=98.2%. As expected, classes 4 and 5 were the most difficult to distinguish using the purely linear classifier (94.5% and 81.5%, respectively). In addition, voice tends to be confused with high-speed modem. For the purely pseudo-quadratic classifier, the accuracy for classes 4 and 5 improved to 99.7% and 98.7%, respectively, while the remaining seven non-silent classes were distinguished with no misclassifications.

When speech signals (class 8) are classified using relatively short sample segments (e.g. 32 ms), it becomes increasingly difficult for linear classifiers, especially, to separate speech from V.34 VBD (class 3). The problem may be overcome by filtering out anomalous classification decisions that are contradicted by the majority of recent decisions. Alternatively, the sample size N may be increased to make it more likely that brief spectrally white phonemes are mixed with speech sounds more easily recognized as belonging to class 8.

Figure 4:
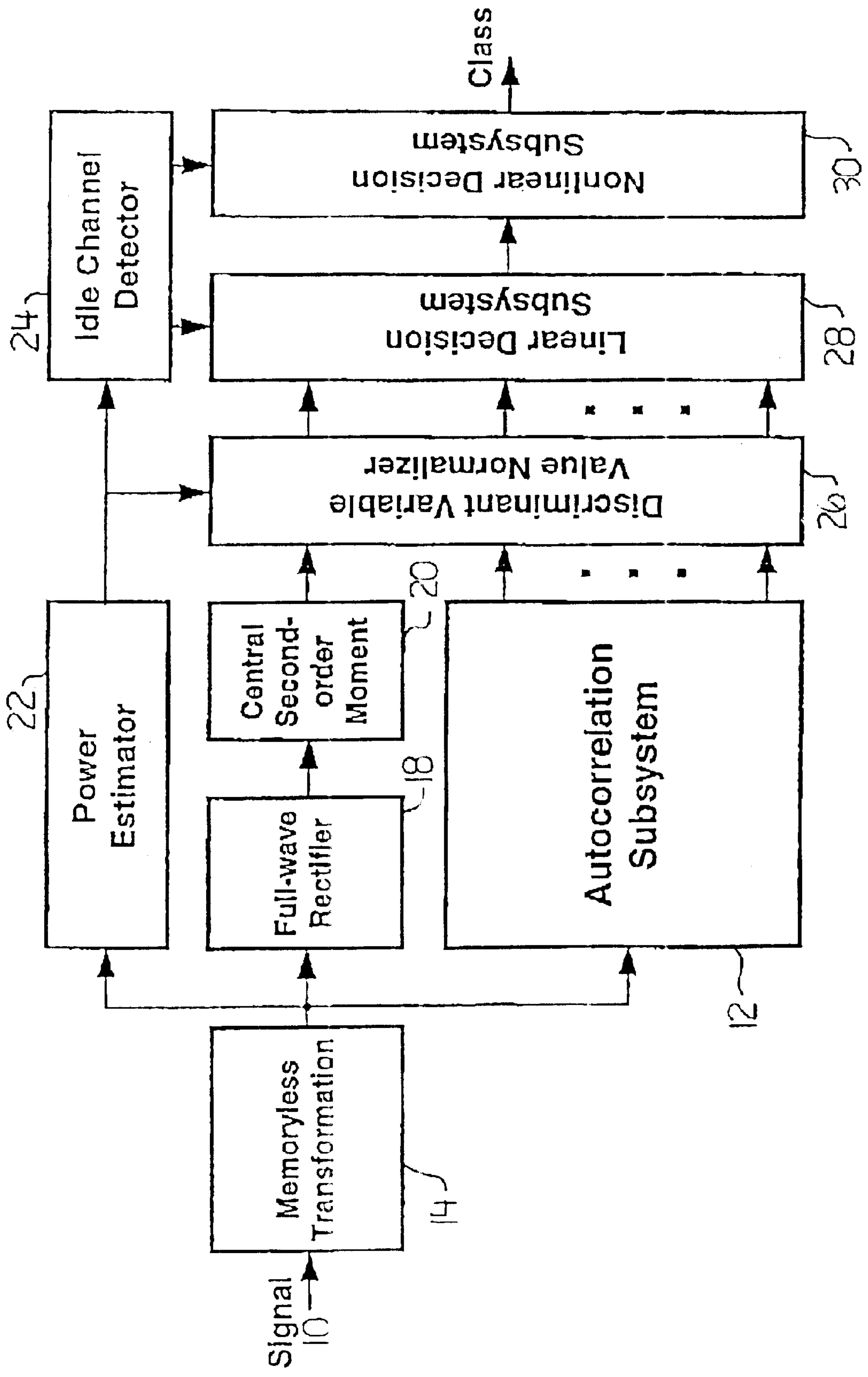
FIG. 4 is a schematic of a signal classification system according to the invention a two-stage decision making process.

Most classes are discriminated very well using a linear discriminant function. For example, using a pseudo-quadratic function on classes 1, 2, and 3 produces little additional classification accuracy, since the accuracy of a linear classifier is already very high. Accuracies for classes 6, 7, and 8 are improved when using a pseudo-quadratic function, but similar gains can be achieved by simply increasing N. Classes 4 and 5 benefit the most from quadratic discrimination. Therefore, in some situations it may be desirable to use a two-step discriminator as illustrated in FIG. 4, in which a linear discriminator 28 is followed by a quadratic discriminator 30. Such an arrangement is believed to approach the accuracy of a fully quadratic classifier, with much less computational effort.

Statistical analysis shows that a carefully chosen subset of highly ranked discriminant variables can permit accurate classification. The inventors have investigated various choices of highly ranked variables and then measured the resulting classification accuracies. In each case, long signal segments (N=2048), linear discriminant functions, and the three most useful variables as selected by the Wilks' lambda method were used. Table 3 compares the results from five different test classifiers where: classifier 1 uses the best non-speech variable set {Rd2, Rd4, Rd5} to discriminate all classes; classifier 2 uses the best non-speech variable set {Rd2, Rd4, Rd5} to discriminate only non-speech classes; classifier 3 uses the best speech versus non-speech variable set {Rd4, Rd9, N2} to discriminate all classes; classifier 4 uses the best variable set for all signals {Rd2, Rd3, Rd7} to discriminate all classes; and classifier 5 uses the heuristically selected variable set {Rd2, Rd4, N2} to discriminate all classes. All five linear classifiers have difficulty distinguishing classes 4 and 5. Classifiers 1, 3, and 4 tend to misclassify speech (class 8) as random binary data (class 9) roughly 10% of the time. Classifier 5 avoids this problem by exploiting the information present in variable N2. In addition, classifier 3 is prone to misclassifying class 2 signals as classes 6 and 7 (6.3% of the time), while classifier 5 misclassifies class 2 signals as class 7 (29.4% of the time). Misclassification rates can be reduced, at the cost of greater computation, by using more variables and/or quadratic discriminant functions.

Table 3:

Classification accuracy for various functions of discriminant variables. CFR refers to the classifier used as noted in the preceding paragraph. The Fig. under the classes is the percentage of correctly classified segments from each class. Class 9 had the same results as class 1.

| CFR | Class 1 | Class 2 | Class 3 | Class 4 | Class 5 | Class 6 | Class 7 | Class 8 |
|---|---|---|---|---|---|---|---|---|
| 1 | 100 | 100 | 99.4 | 80.7 | 85.7 | 100 | 100 | 87.2 |
| 2 | 100 | 100 | 100 | 93.7 | 93.3 | 100 | 100 | n.a. |
| 3 | 100 | 93.7 | 99.8 | 80.6 | 74.5 | 100 | 85.8 | 86.2 |
| 4 | 100 | 100 | 100 | 50.3 | 60.5 | 99.2 | 99.4 | 86.9 |
| 5 | 100 | 70.2 | 99.6 | 80.8 | 74.7 | 100 | 99.4 | 97.2 |

The above noted results (for Tables 1, 2 and 3) are found in more detail in J. S. Sewall, *Signal Classification in Digital Telephone Networks*, M.Sc. thesis, Jan. 5, 1996, Dept. of Electrical Eng., U. Alberta, Edmonton, AB, Canada.

When the best speech versus non-speech variable set {Rd4, Rd9, N2} was used to discriminate between speech and non-speech signals, non-speech signals were correctly classified as non-speech 100% of the time. Speech signals, however, are correctly classified as speech only 91.6% of the time. This accuracy could be greatly increased by adding inertia or hysteresis to the classifier's decisions. For example, silence, a relatively common occurrence in a voice signal, may cause the signal to be wrongly classified as silence. Thus, the discriminator may be programmed to ignore silence in a voice signal that occurs for less than a pre-selected threshold. This may be accomplished by turning on a timer with a fixed on period when a signal segment is classified as voice, and not identifying any signal as silence until the timer has turned off. The predicted accuracies also do not show significant shrinkage (drop in accuracy) when evaluated on data that is separate from the training set.

Figure 5:
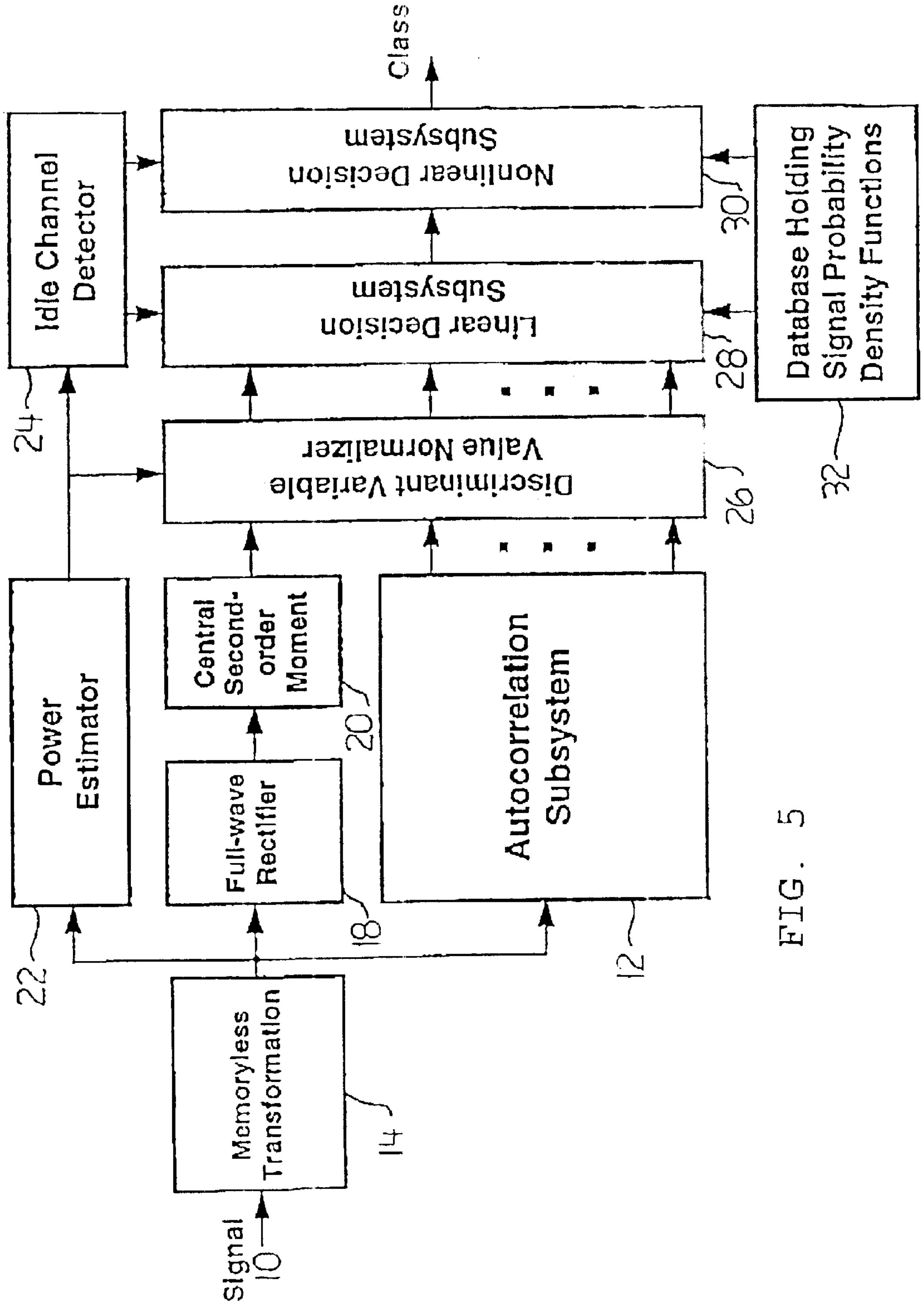
FIG. 5 is a schematic of a signal classification system according to the invention using a two stage decision making technique together with a tored PDF database.
Figure 6:
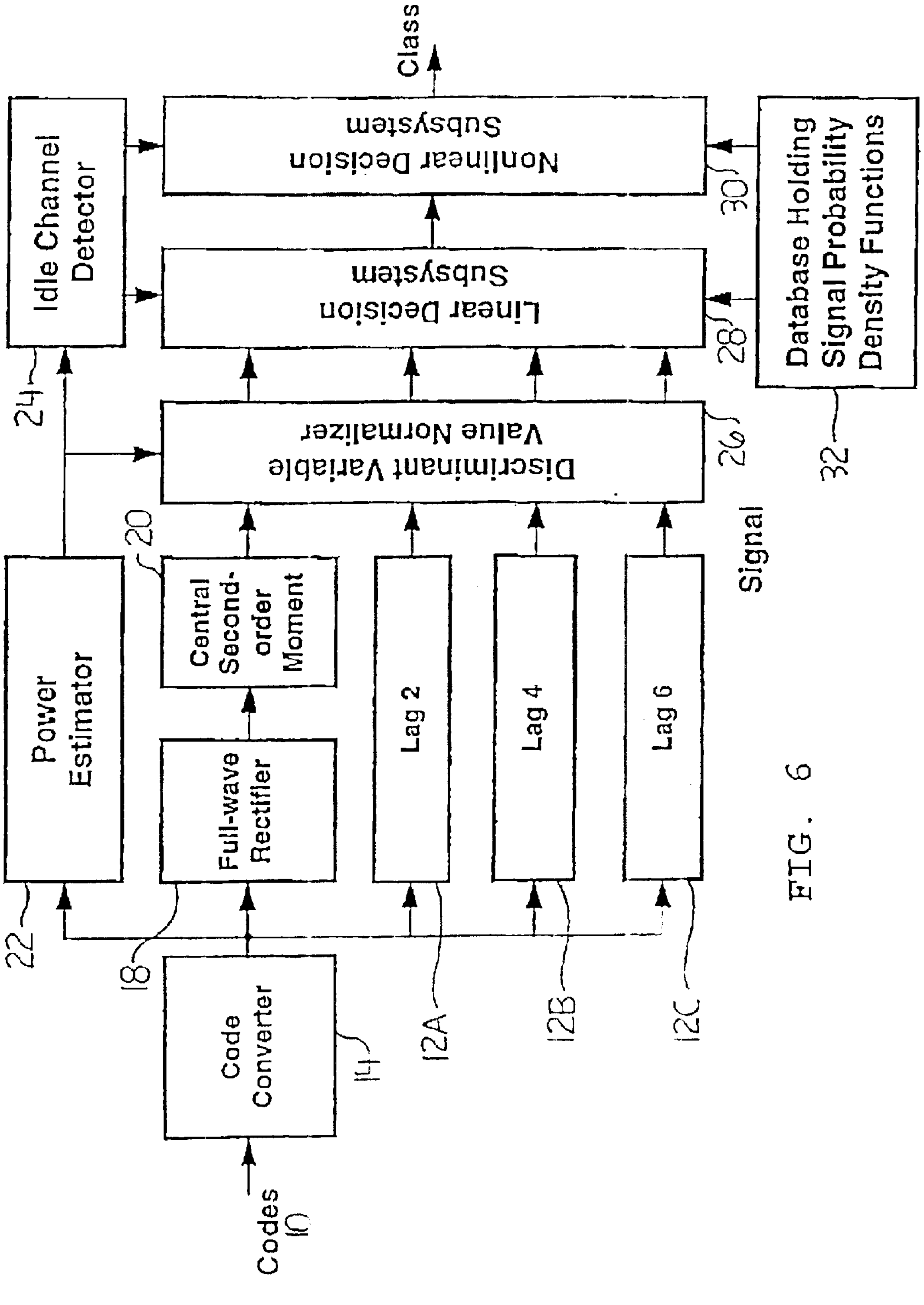
FIG. 6 is a schematic of a signal classification system acording to the invention using four particular discriminant variables and a two stage decision technique and stored PDF database.

The signal classifiers shown in FIGS. 1–4 may be made more accurate using variable or function probability density functions (PDFs) as shown in FIGS. 5 and 6. A PDF database 32 is used to hold information on the past values of the autocorrelation coefficients, including their probability density function. That is, the autocorrelation coefficients for a type of signal will have a probability density function or scatter that is characteristic of that signal. Knowledge of the potential range of values that an autocorrelation coefficient can take may be used to assess whether a given value is indicative of one type of signal or another. The PDF database then will contain PDF's for each variable and each class. Alternatively, the ODFs for each discriminant function may be stored. Thus for four variables and nine classes, 36 PDFs must be stored. These PDFs may be derived during a training period on signals that are representative of the signals to be tested. Simple decision boundaries or thresholds may be substituted for the PDFs but there is a trade off in lost accuracy. The cost incurred by the simpler architecture is that more discriminant variables have to be considered in order to achieve accuracy comparable to that obtainable using methods that exploit accurate PDF data. Also, such a classifier cannot provide the posterior probability of class membership for each classification decision (as could a Bayesian classifier).

The classifier shown in FIG. 4 provides greater classification accuracy than the classifiers shown in FIGS. 1–3. In FIG. 4, a linear first stage 28 is followed by a pseudo-quadratic second stage 30 that resolves between classes 4 and 5. For such a two-stage classifier with various segment lengths, subsegment length L=16, power threshold $P_{Th}$= 1089, classes 1–9, Bayes' Rule for class allocation, and the discriminant variable sets {Rd2, Rd4, N2} and {Rd2, Rd4, Rd6, N2}, the expected average accuracy over all classes of the four-variable classifier (assuming N=2048) is 98.27% and 99.54% for the first and second stages respectively.

In the case where a linear discriminant function is used in the discriminator, with eleven variables, classification accuracy over classes 1–9 of 98% may be obtained. In the case where a pseudo-quadratic discriminant function is used in the discriminator, the signal segment length may be reduced to 512 samples for a classification accuracy of 100% over classes 1–9. If the signal segment length is held constant at 2048, the number of discriminant variables may be reduced from eleven to three by switching from linear to pseudo-quadratic functions, and still achieve the same classification accuracy.

A preferred classifier is a two-stage classifier that uses the normalized central second-order moment of the rectified signal along with the second, fourth, and six lags of the estimated normalized autocorrelation sequence (four discriminant variables) as shown in FIG. 6. In FIG. 6, the elements of the apparatus are the same as those shown in FIG. 4, with the two exceptions that the autocorrelator 12 is shown broken down into the portions 12A, 12B and 12C for generating the three autocorrelation coefficients Rd2, Rd4 and Rd6 and the PDF database 32 from FIG. 5 is also shown. The first classification stage uses linear discriminant functions to resolve signals into one of nine classes (including silence). The second classification stage uses pseudo-quadratic discriminant functions to resolve one of the nine classes into two classes. Overall classification accuracies of 98.27% and 99.54% are believed achievable in the two stages using 256 ms long signal segments.

Figure 11:
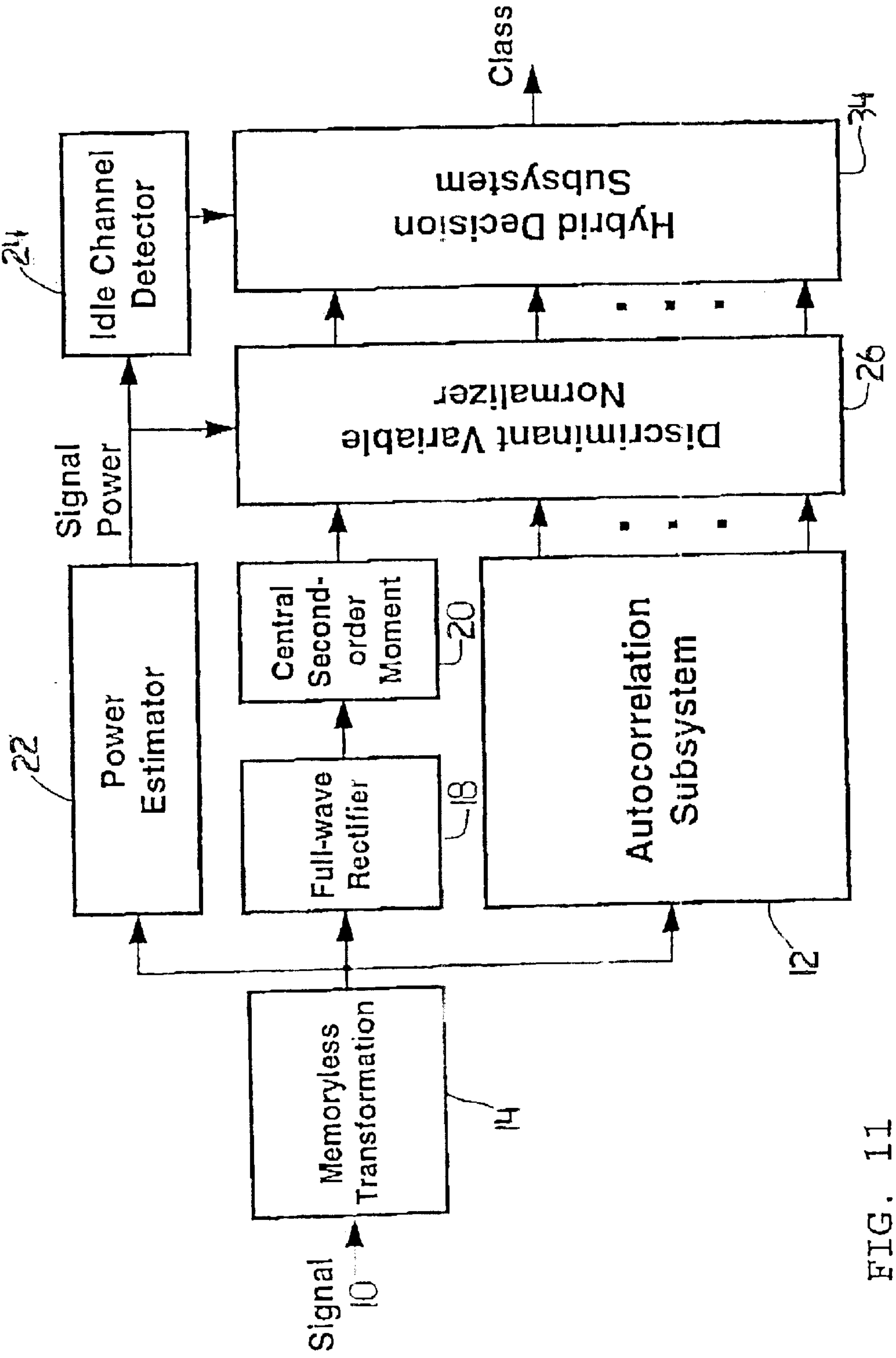
FIG. 11 is a schematic showing a Signal Classification System Using Hybrid Decision Subsystem.
Figure 12:
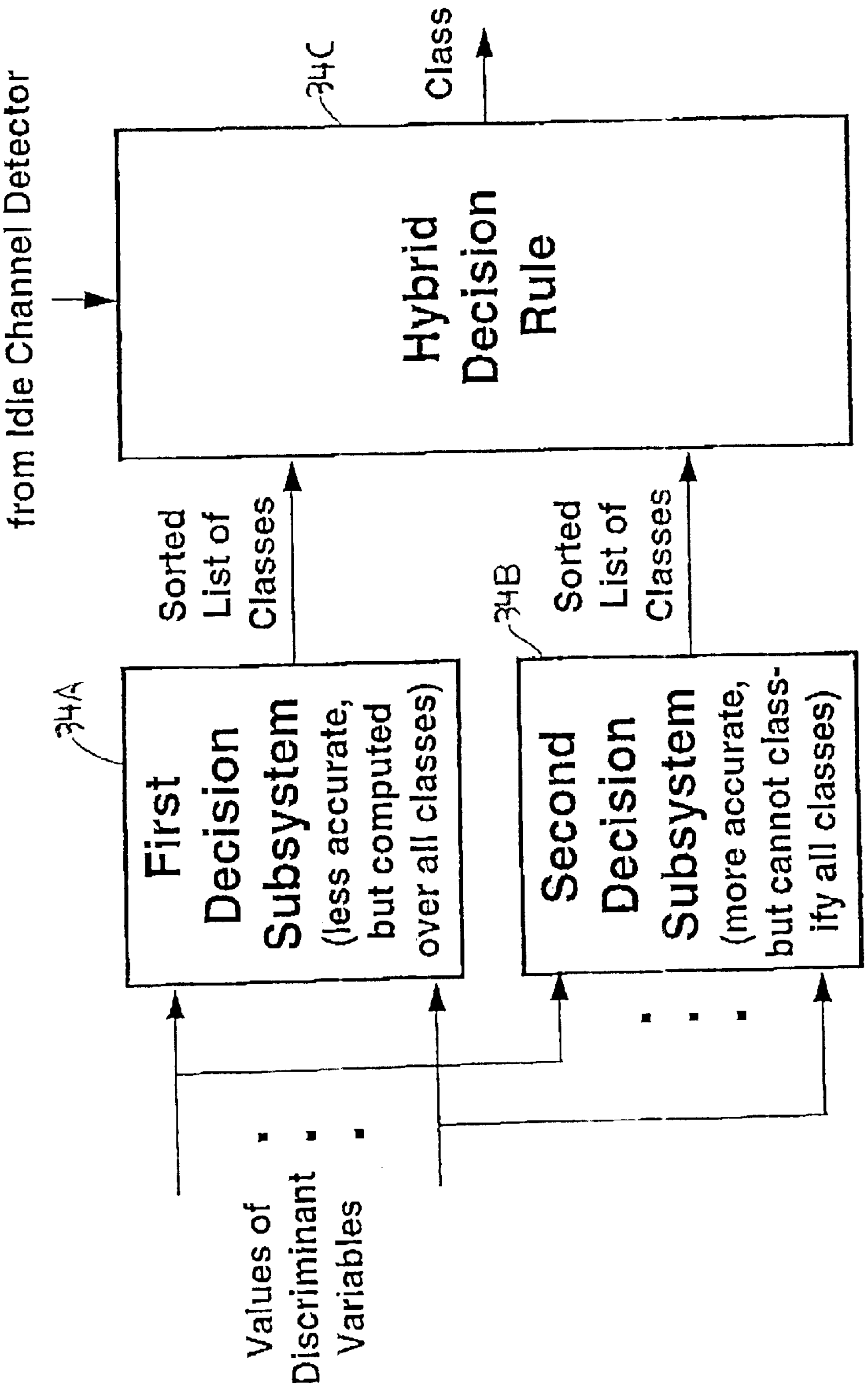
FIG. 12 is a schematic showing a Hybrid Decision Subsystem.
Figure 13:
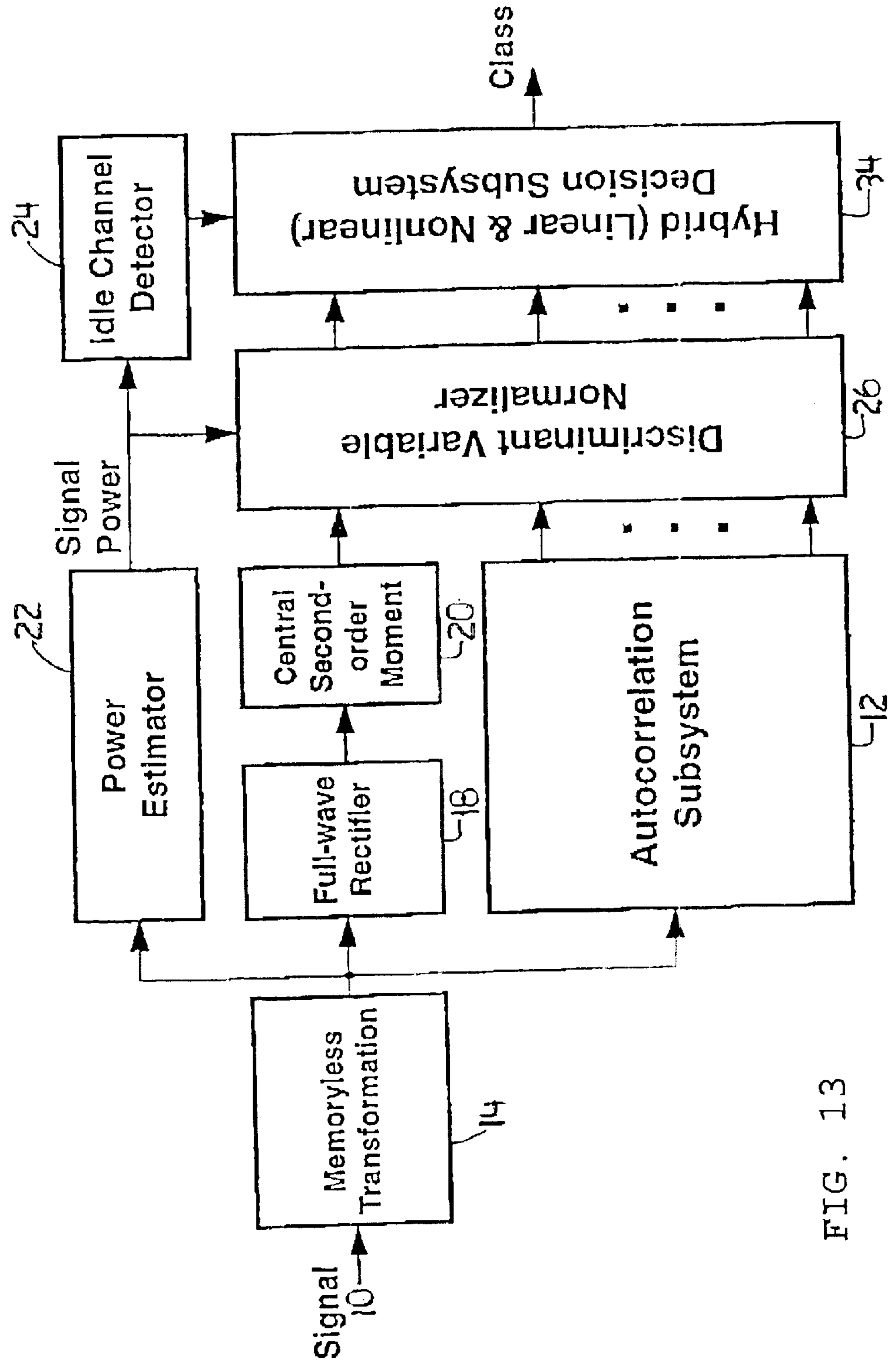
FIG. 13 is a schematic showing a Signal Classification System Using Hybrid Decision Subsystem.
Figure 14:
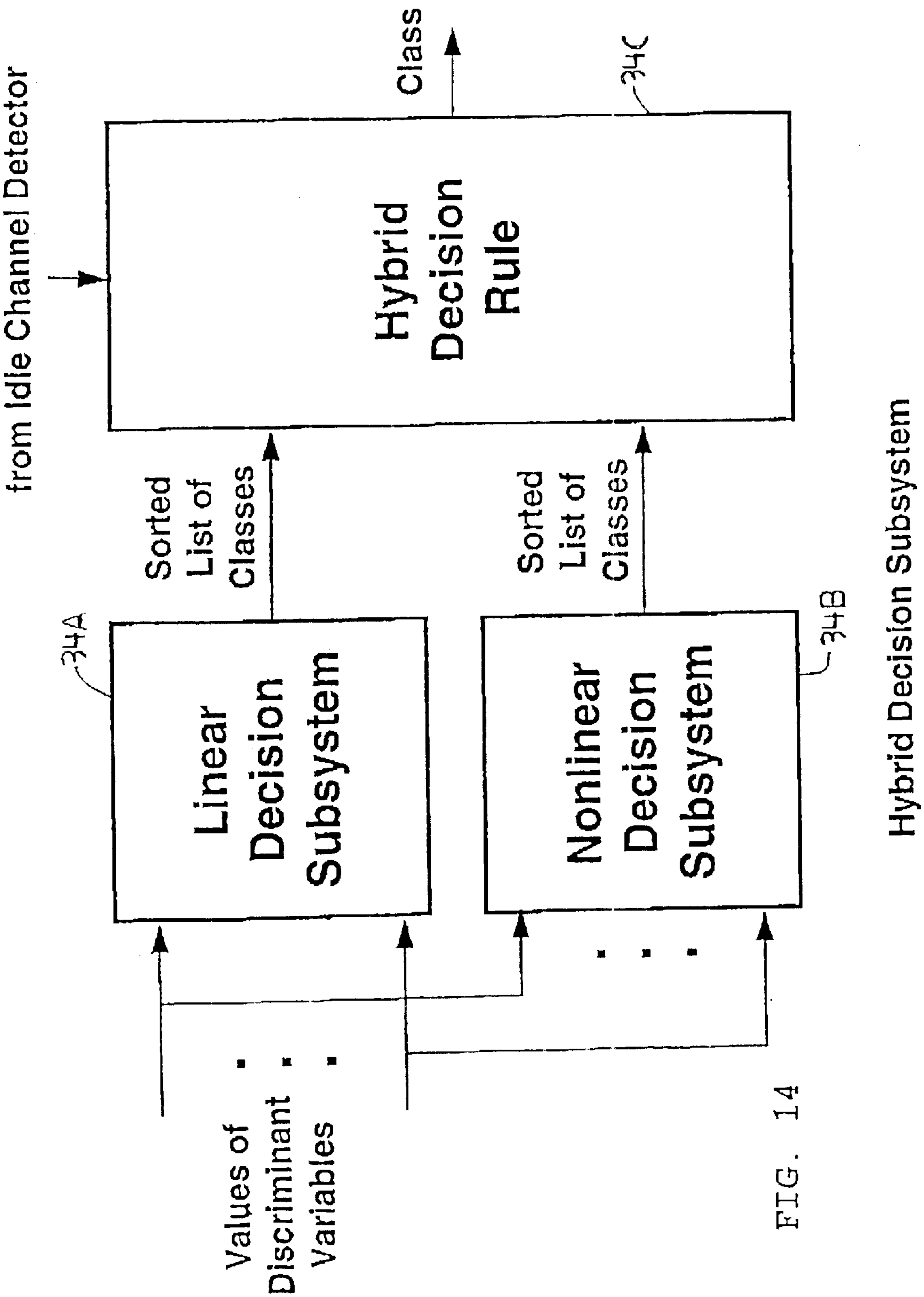
FIG. 14 is a schematic showing a Hybrid Decision Subsystem.

A hybrid decision sub-system in which linear and non-linear discriminant functions are used is shown in FIG. 11. The components are the same as those shown in FIG. 4, except that the decision sub-systems are illustrated as a single hybrid decision sub-system 34. The hybrid decision sub-system 34 is a combination of a first decision sub-system 34*a* and a second decision sub-system 34*b*, together with a decision rule module 34*c* as illustrated in FIG. 12. The first and second decision sub-systems 34*a*, 34*b* may be implemented consecutively (in either order) or simultaneously. The first decision sub-system 34*a* is preferably a linear decision sub-system, while the second decision sub-system 34*b* is preferably a non-linear decision sub-system, as illustrated in FIGS. 13 and 14. Both act on the output values of the discriminant variables from the normalizer 26. Each decision sub-system 34*a*, 34*b* produces a sorted list of classes to a module 34*c* that implements a hybrid decision rule. It will be appreciated that each decision sub-system 34*a*, 34*b* may be implemented in a general purpose computer that is programmed with the algorithms and equations described in this patent document. In addition, the hybrid decision rule module 34*c* may also be implemented as an algorithm performed in a general purpose computer, for example as illustrated in FIGS. 15–17, 19–22, 26, 28, 30, 32, 36 and 37.

Figure 15:
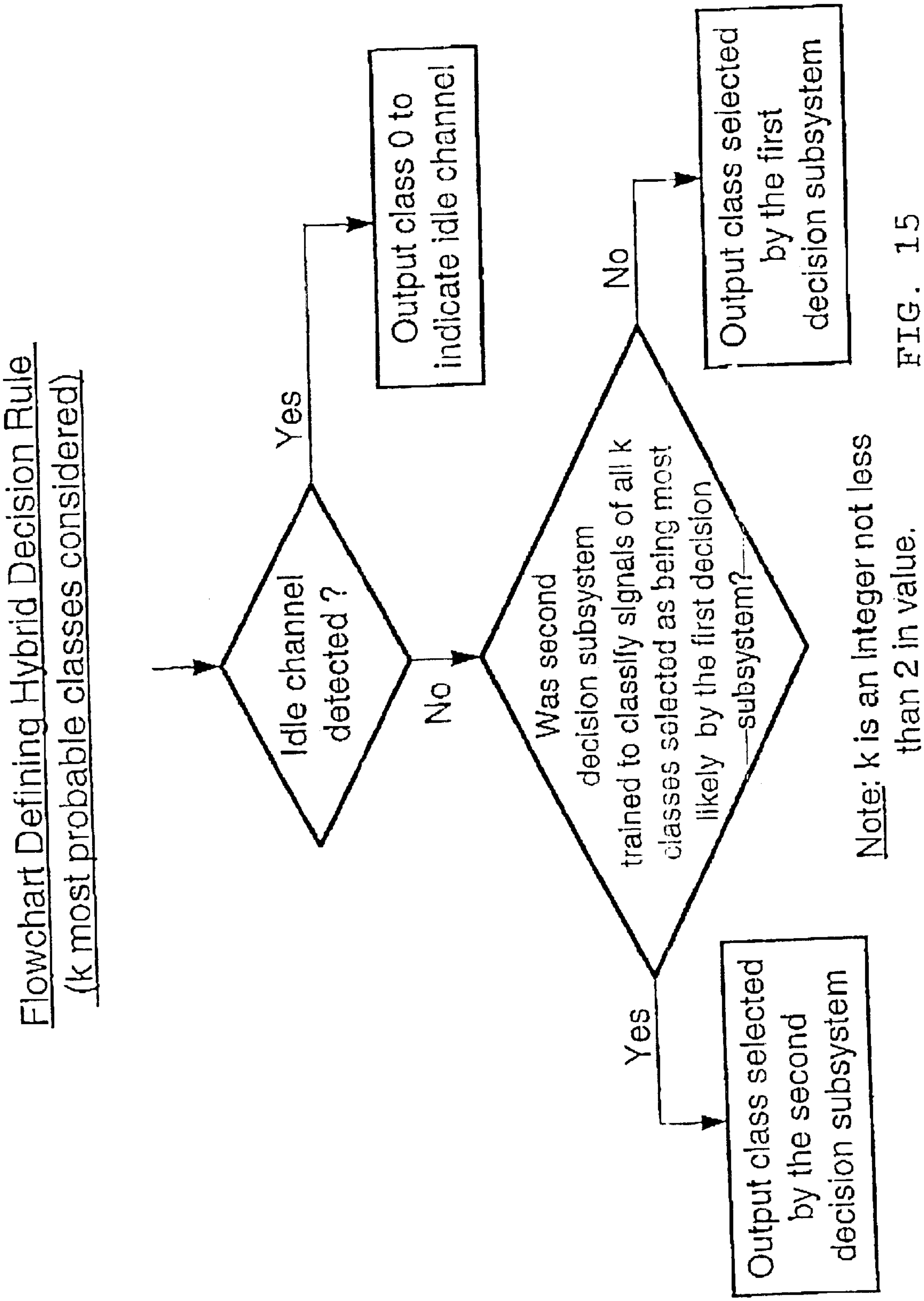
FIG. 15 is a schematic showing a Defining Hybrid Decision Rule (k most probable classes considered)
Figure 16:
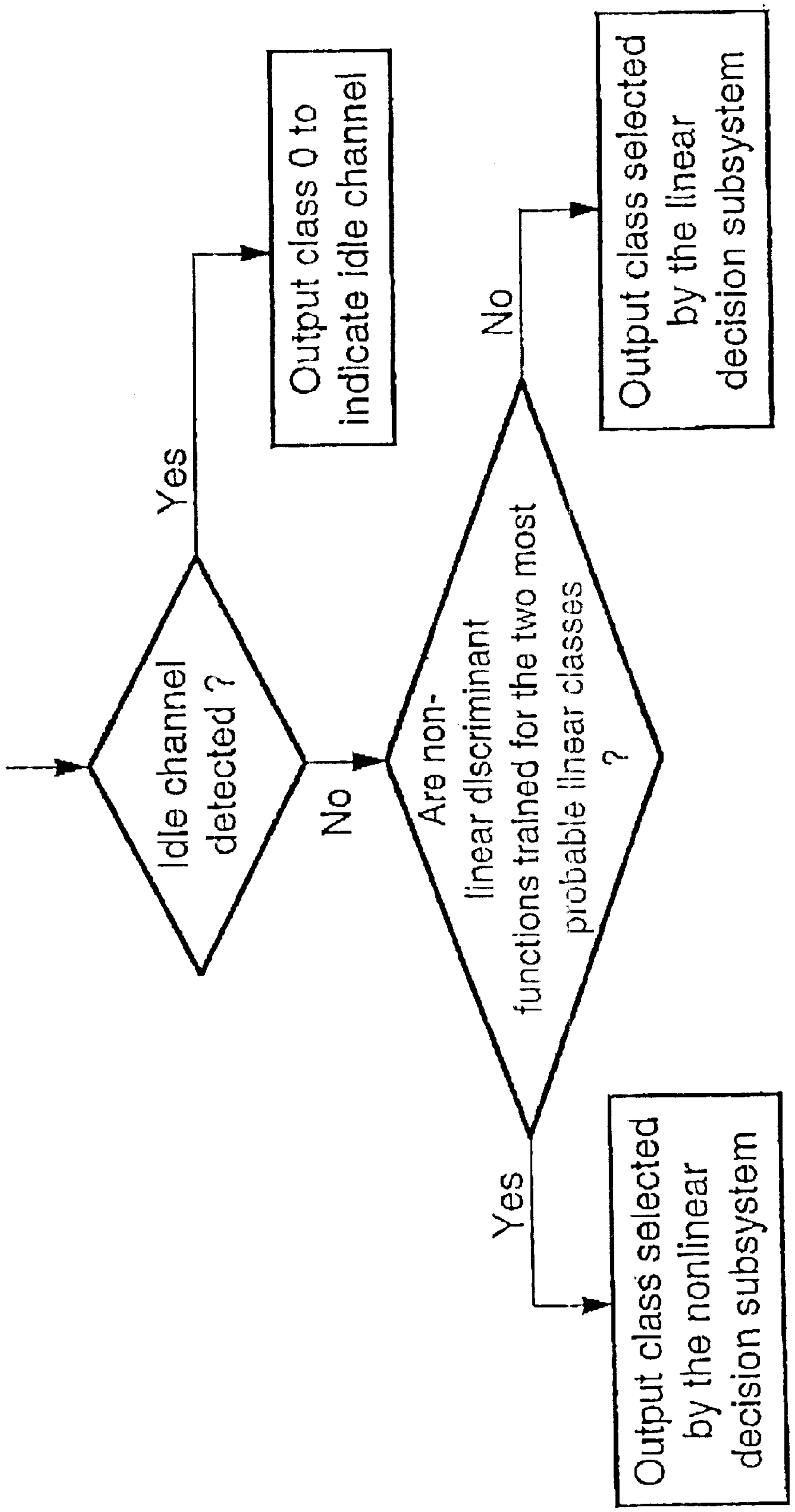
FIG. 16 is a schematic showing a Defining Hybrid Decision Rule (two most probable linear classes considered)
Figure 17:
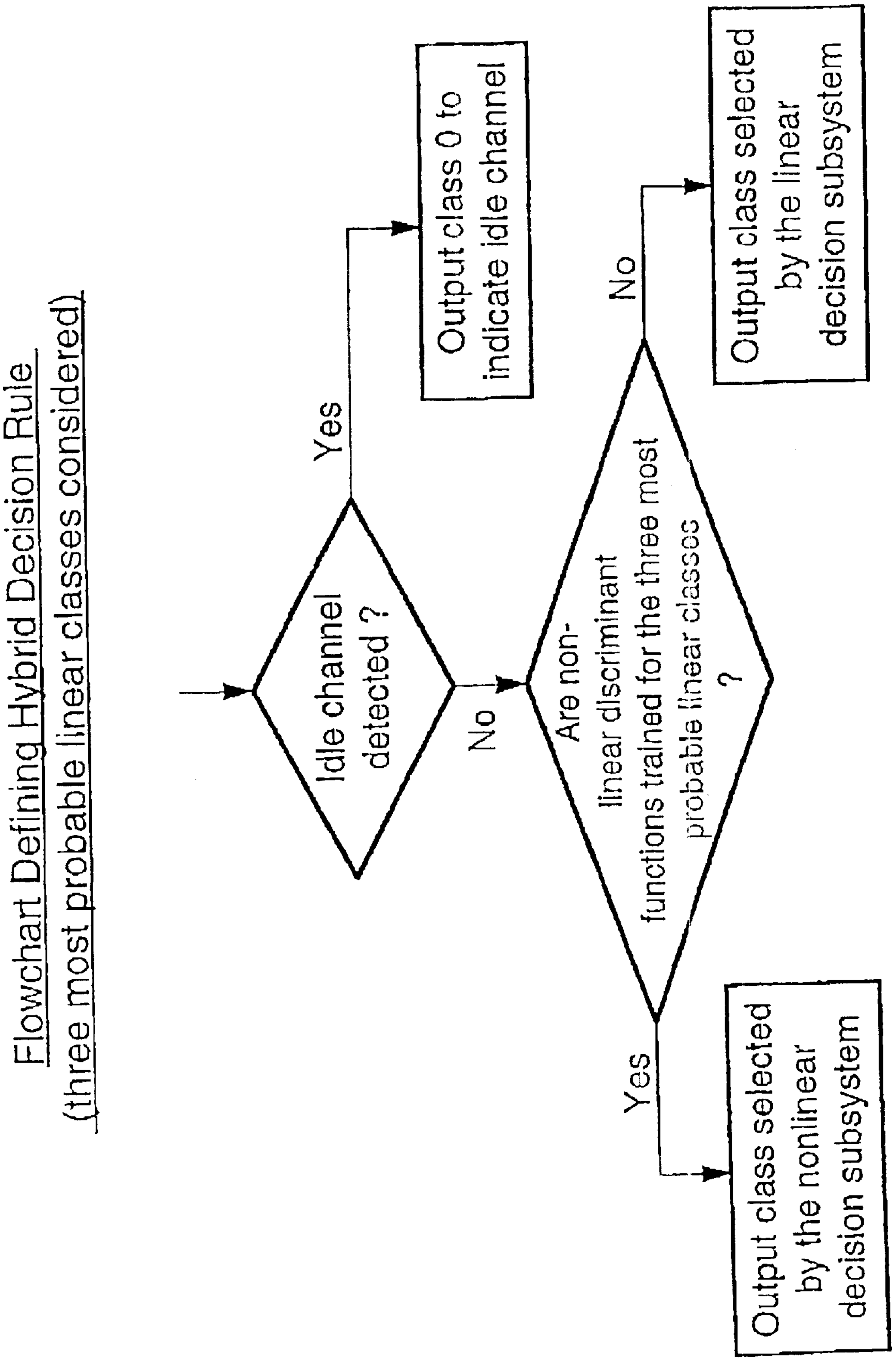
FIG. 17 is a schematic showing a Defining Hybrid Decision Rule (three most probable linear classes considered)

The hybrid decision rule illustrated in FIGS. 15–17 takes into account the fact that a linear decision sub-system is less accurate but more comprehensive than a non-linear decision sub-system. In each of the rules presented in FIGS. 15–17, a first decision is made as to whether an idle channel is detected. Next, in the rule presented in FIG. 15 for the case where $k \geqq 2$ classes are selected as most likely by the first decision sub-system it is determined whether the second decision sub-system was trained to classify signals of all of the k classes. If the answer is yes, the classes selected by the second decision sub-system are used, and if the answer is no, the classes selected by the first decision sub-system are used. FIG. 16 shows the case where k=2, and FIG. 17 shows the case where k=3.

Figure 18:
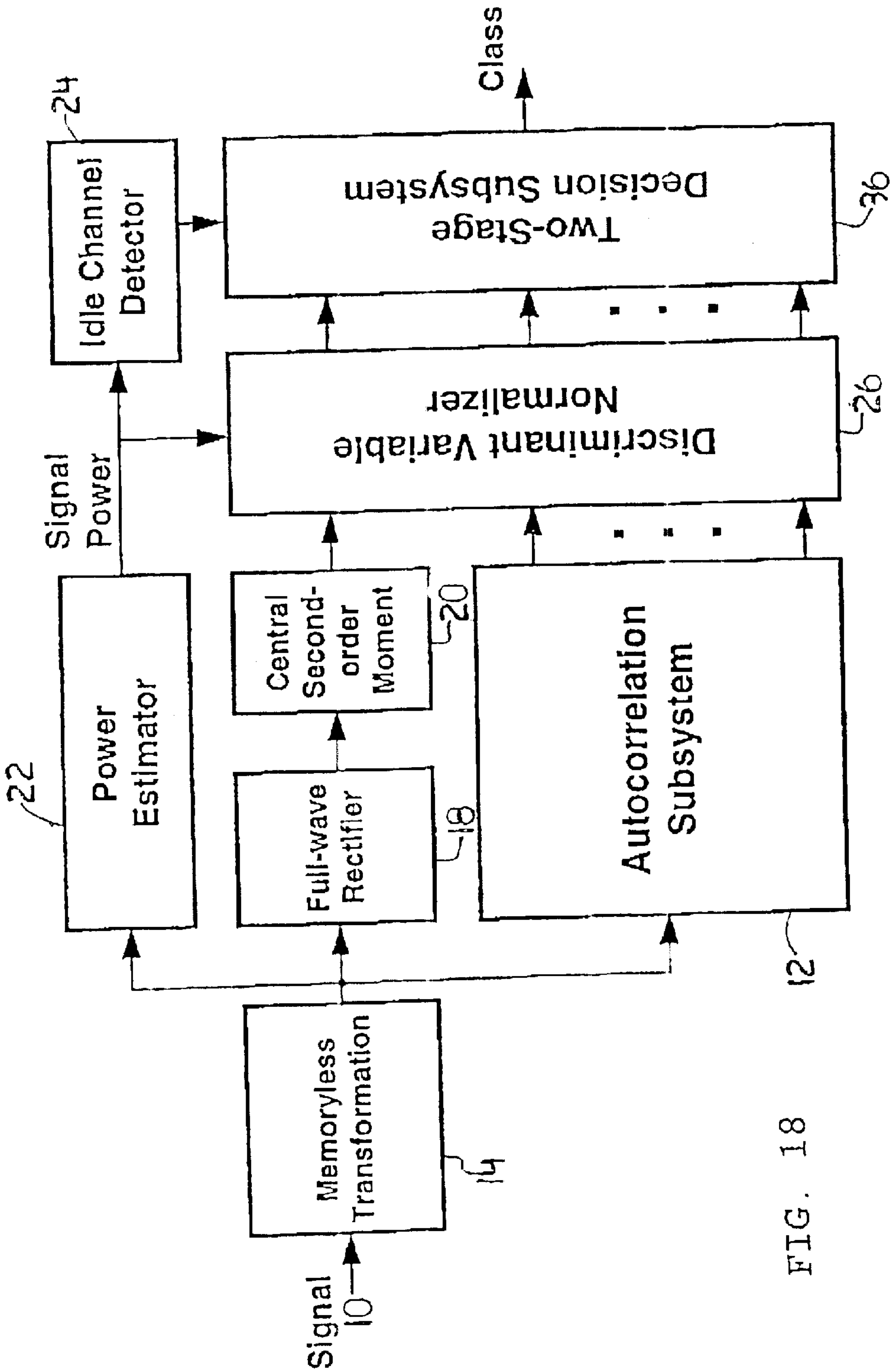
FIG. 18 is a schematic showing a Signal Classification System Using Normalized Discrimnant Variables.
Figure 19:
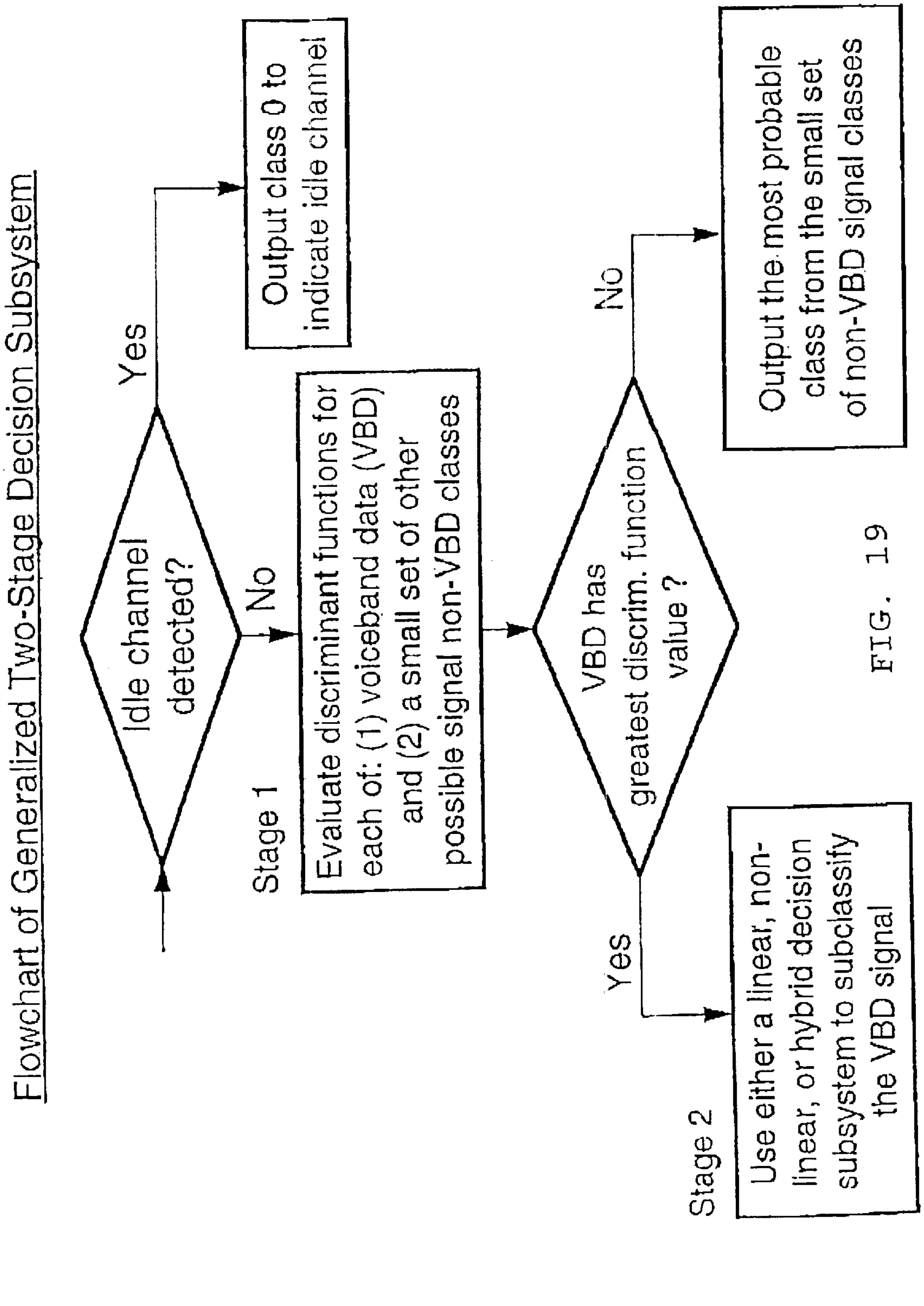
FIG. 19 is a schematic showing a Generalized Two-Stage Decision Subsystem.

FIG. 18 shows a signal classifier in which a two-stage decision sub-system 36 is used. The operation of the two stage decision sub-system 36 is shown in FIG. 19. As with the decision sub-systems shown in FIGS. 15–17, first a decision is made as to whether the idle channel is detected. Next, a decision is made based upon discriminant functions to distinguish between voice band data (VBD) and non-VBD. If VBD is identified, then a linear, non-linear or hybrid decision sub-system is used to sub-classify the VBD signal. If non-VBD is identified, then the most probably class from the small set of non-VBD signal classes is output.

Figure 20:
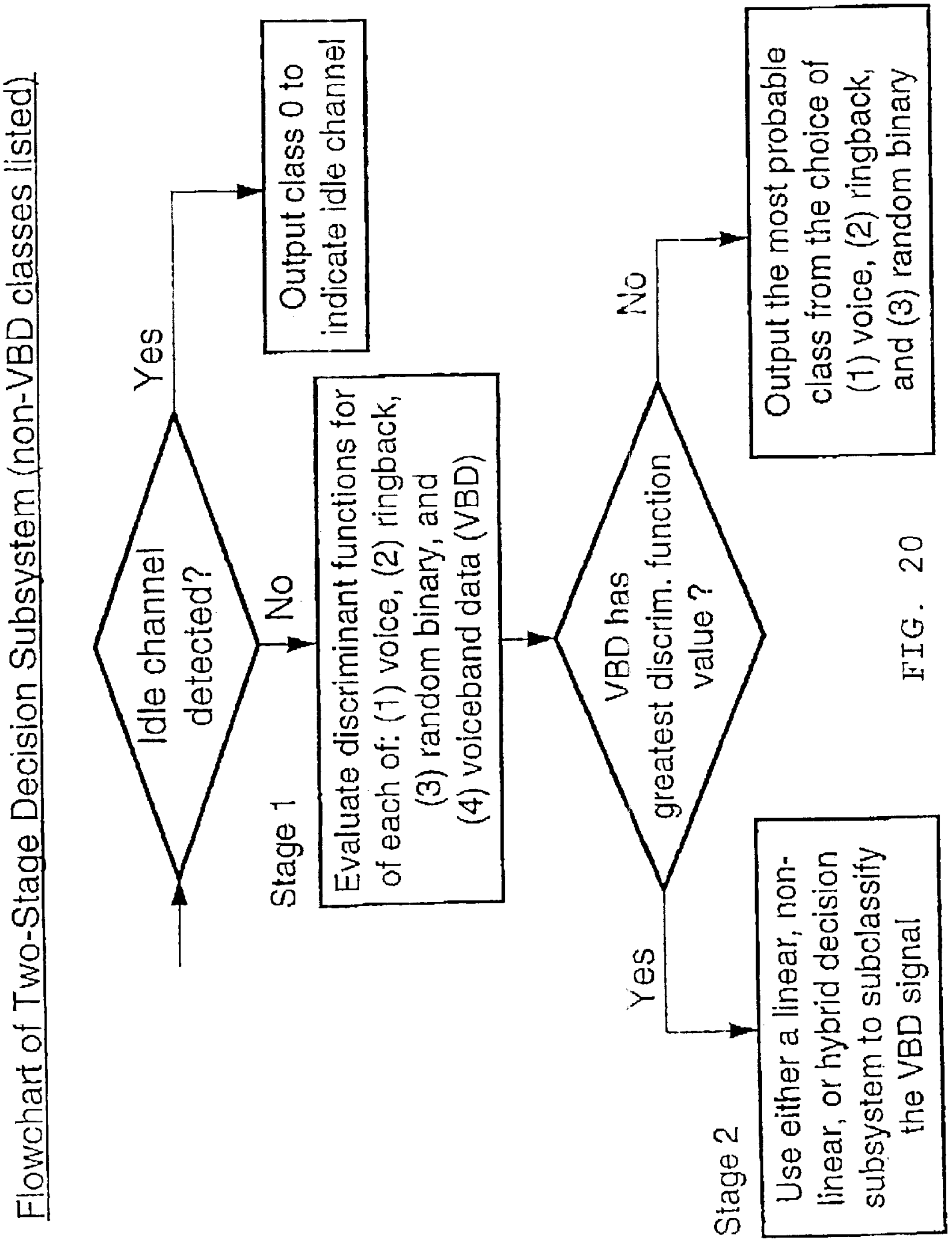
FIG. 20 is a schematic showing a Two-Stage Decision Subsystem (three possible non-VBD classes listed)
Figure 21:
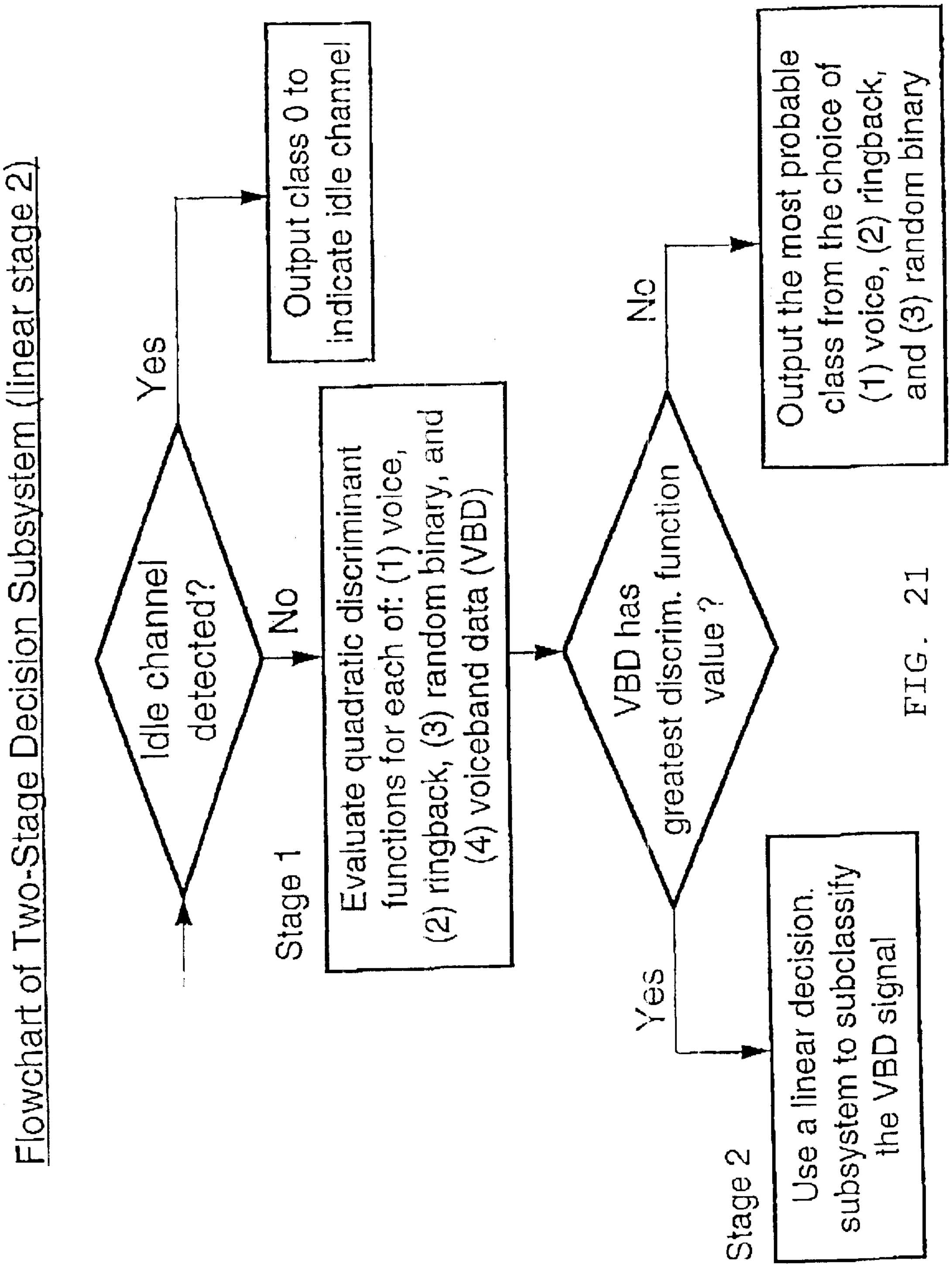
FIG. 21 is a schematic showing a Two-Stage Decision Subsystem (linear stage 2)
Figure 22:
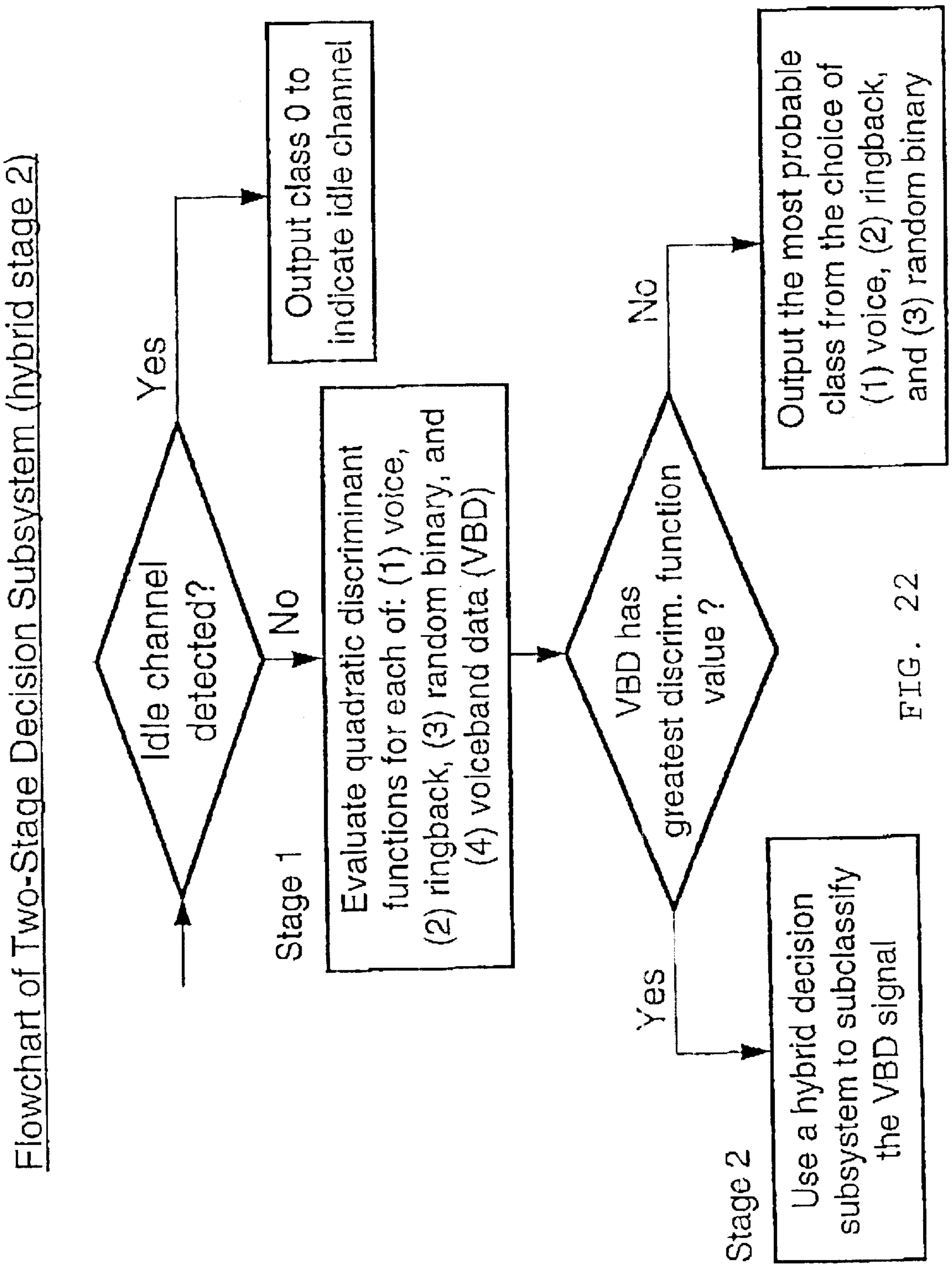
FIG. 22 is a schematic showing a Two-Stage Decision Subsystem (hybrid stage 2)
Figure 23:
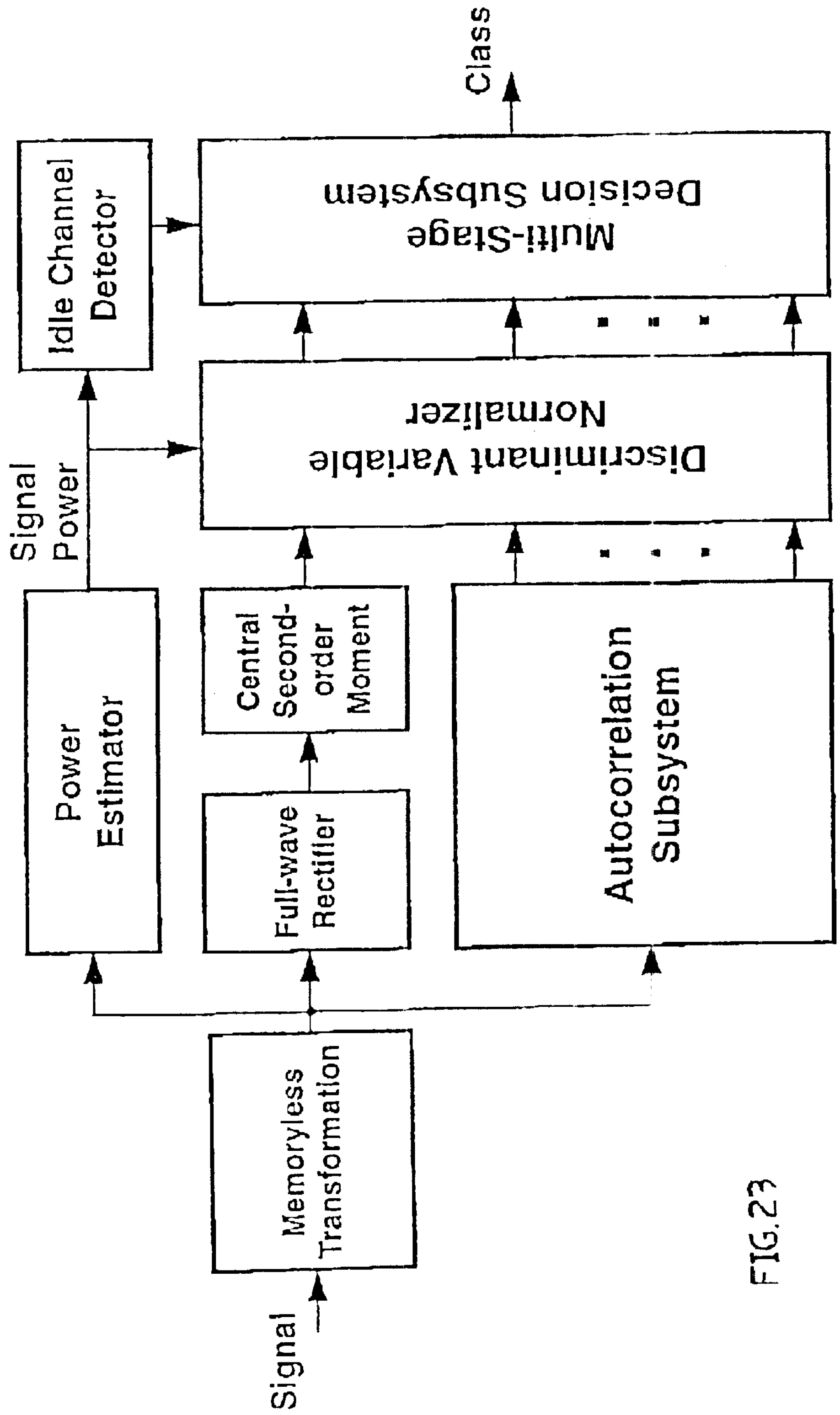
FIG. 23 is a schematic showing a Signal Classification System Using Multistage Decision Subsystem.

FIG. 20 illustrates a two stage decision sub-system similar to that of FIG. 19 in which the non-VBD classes are classified into voice, ringback and random binary using discriminant functions for each of those sub-classes. FIG. 21 illustrates a two stage decision sub-system similar to that of FIG. 20 in which only a linear decision sub-system is used to classify the VBD signal. FIG. 22 illustrates a two-stage decision sub-system similar to that of FIG. 20 in which only a hybrid decision sub-system is used to classify the VBD signal. The two stage sub-system may also be generalized into a multi-stage sub-system shown in FIG. 23, in which further refinements to the classification are made using different decision sub-systems.

Figure 24:
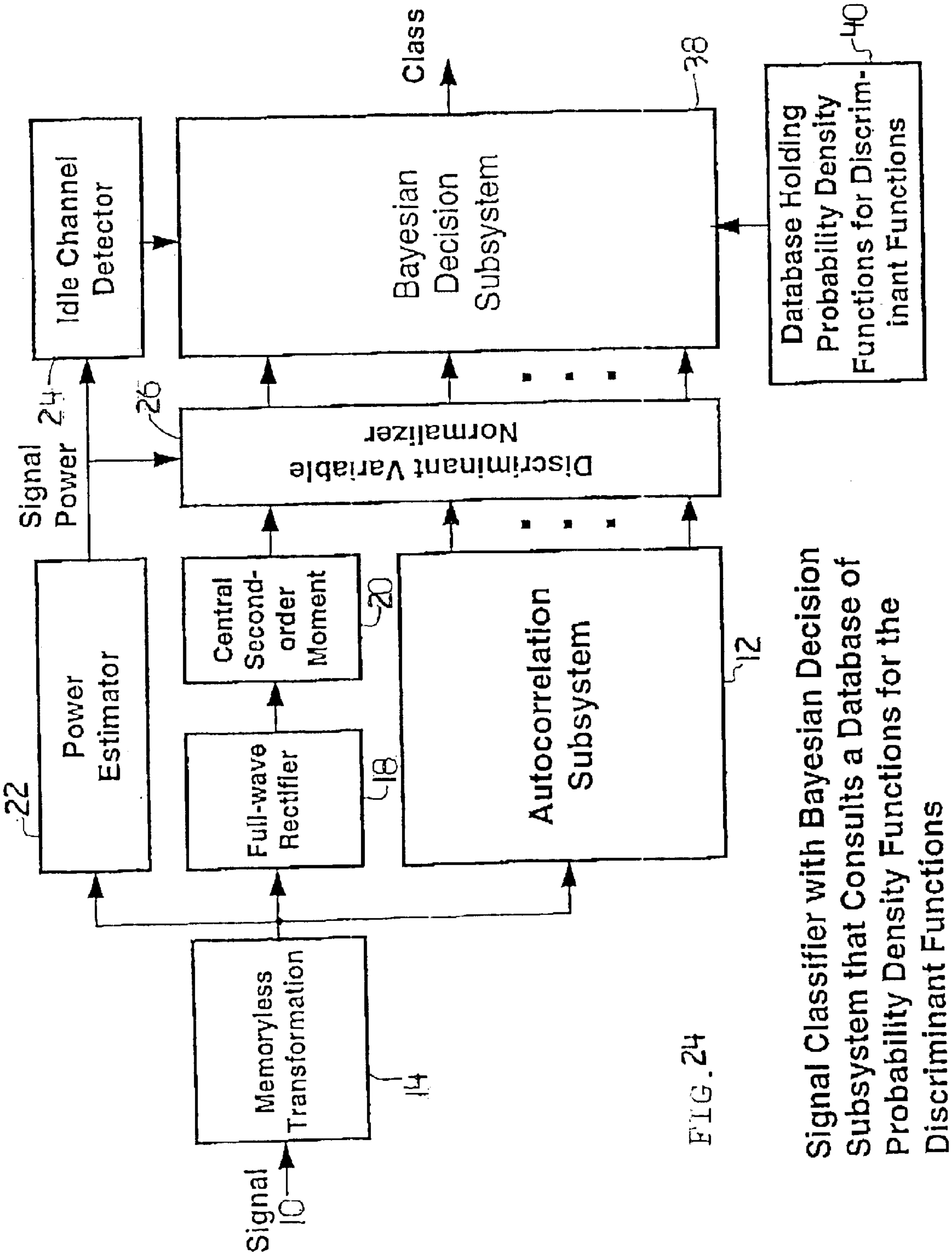
FIG. 24 is a schematic showing a Signal Classifier with Bayesian Decision Subsystem that Consults a Database of Probability Density Functions for the Discriminant Functions.
Figure 26:
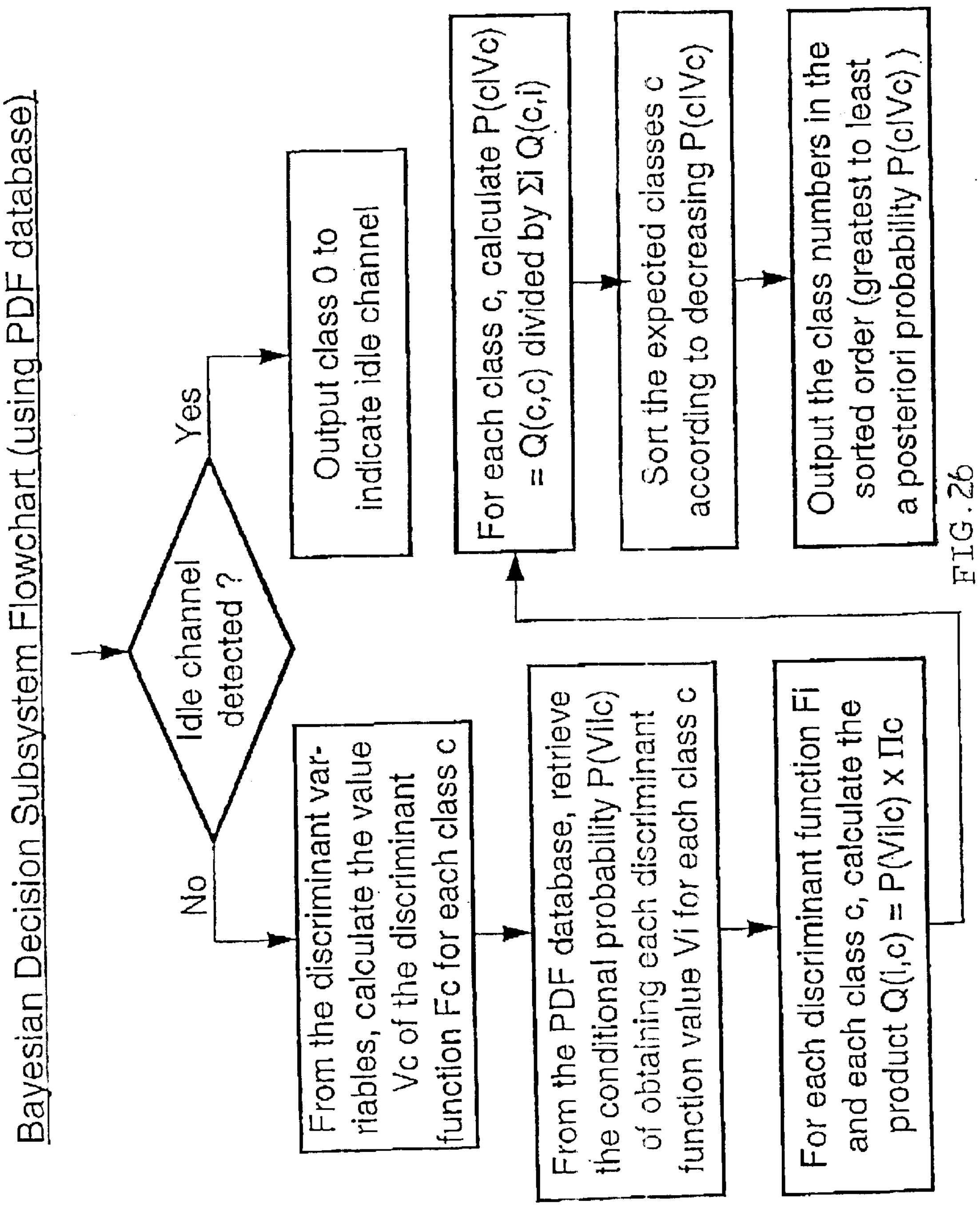
FIG. 26 is a schematic showing a Bayesian Decision Subsystem (using PDF database)

FIG. 24 illustrates a signal classifier with a Bayesian decision sub-system 38 connected to a PDF database 40 holding probability density functions for discriminant functions, the other elements being the same as shown in FIG. 4. The Bayesian decision sub-system 38 consults the PDF database 40 during decision making. The structure of a record in the PDF database 40 is shown in FIG. 25, each record having field for signal class, discriminant variable, interval start, interval end and the probability value. FIG. 26 illustrates the operation of a Bayesian decision sub-system 38. First, a decision is made as to whether an idle channel is detected. If an idle channel is not detected, then the value Vc of the discriminant function for each class c is calculated from the discriminant variables. Next, the conditional probability P(Vi|c) of obtaining each discriminant function Vi for each class c is retrieved from the PDF database 40. Next, the product Q(I,c)=P(Vi|c)xΠc is calculated for each discriminant function Fi and each class c. Next, P(c|Vc)=Q(c,c)/ΣiQ (c,I) is calculated for each class c. The expected classes c are then sorted according to decreasing P(c|Vc), and the class numbers are output in the sorted order (greatest to least).

Figure 27:
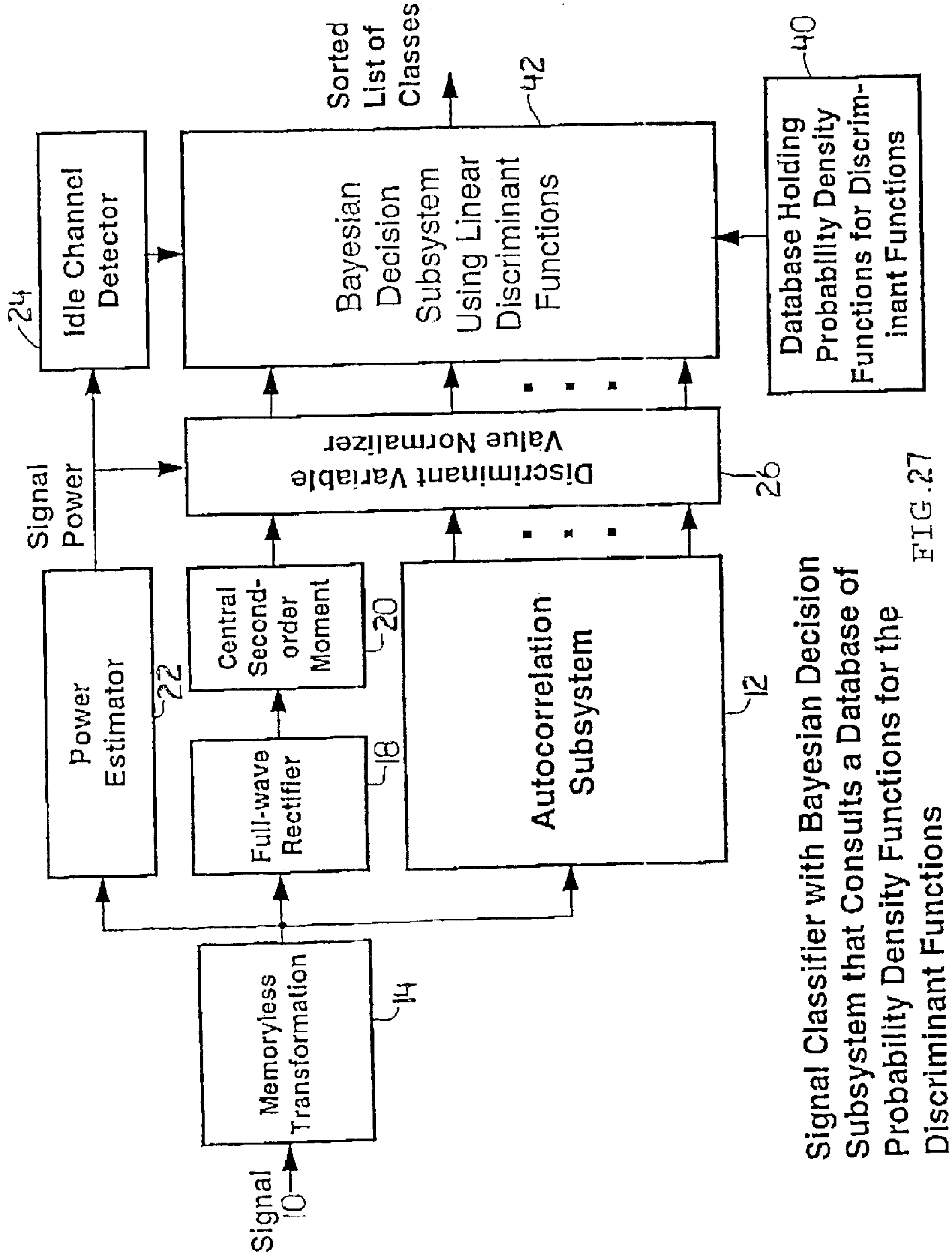
FIG. 27 is a schematic showing a Signal Classifier with Bayesian Decision Subsystem that Consults a Database of Probability Density Functions for the Discriminant Functions.
Figure 28:
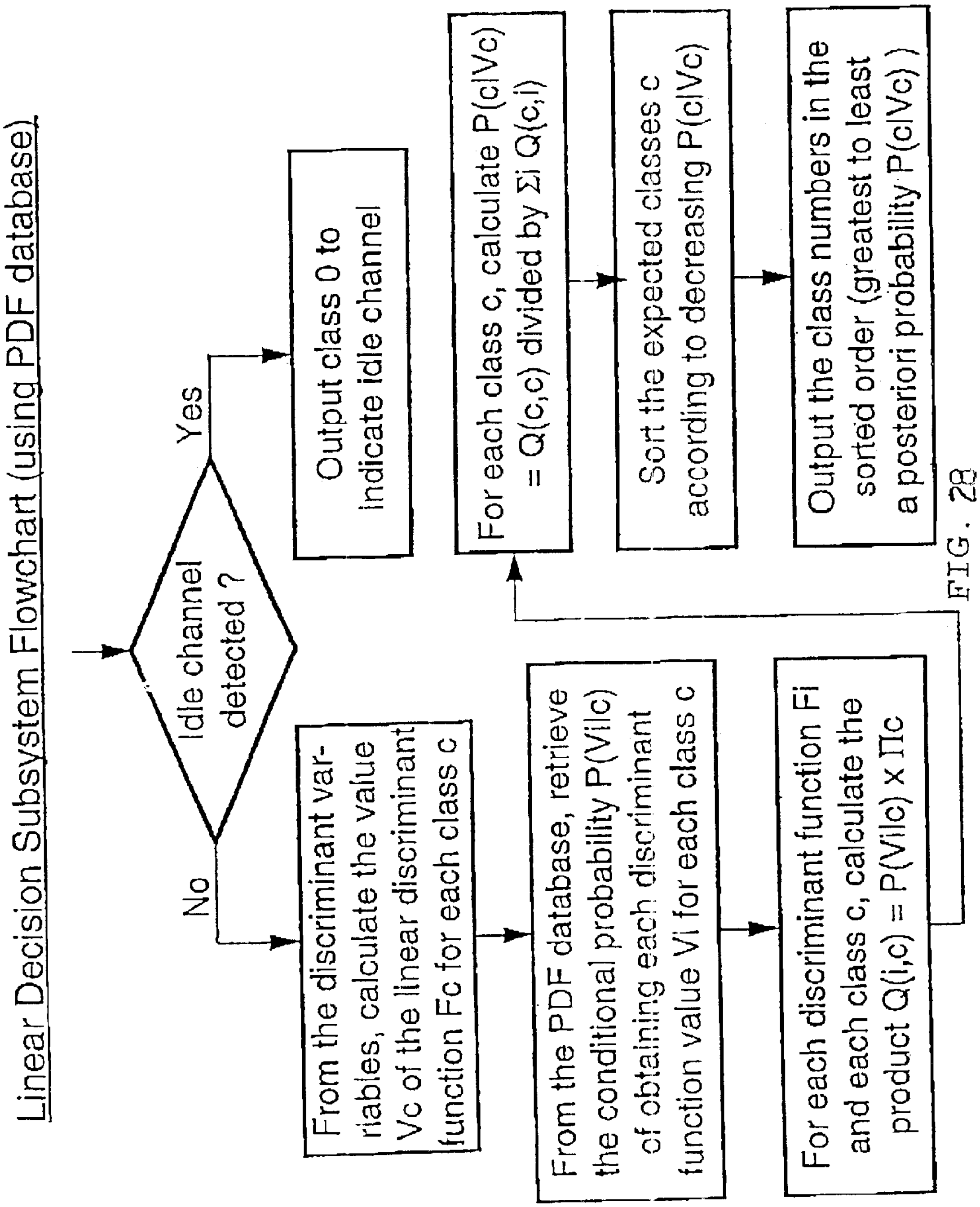
FIG. 28 is a schematic showing a Linear Decision Subsystem (using PDF database)

FIG. 27 illustrates a signal classifier with the same elements as in FIG. 24, except the Bayesian decision sub-system 42 uses linear discriminant functions operating as shown in FIG. 28, which is the same process as shown in FIG. 26 except that Vc is calculated based on a linear discriminant function Fc.

Figure 29:
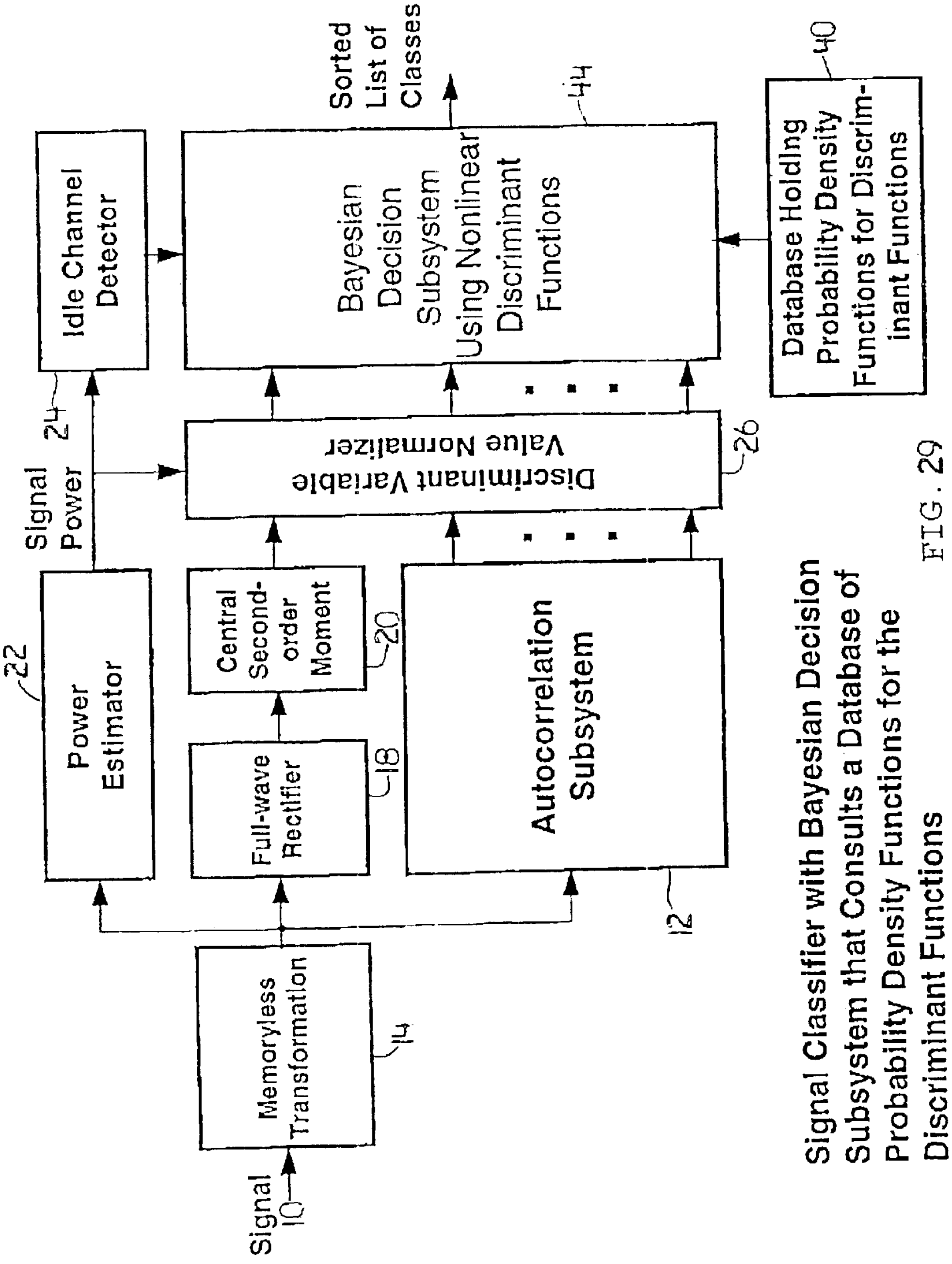
FIG. 29 is a schematic showing a Signal Classifier with Bayesian Decision Subsystem that Consults a Database of Probability Density Functions for the Discriminant Functions.
Figure 30:
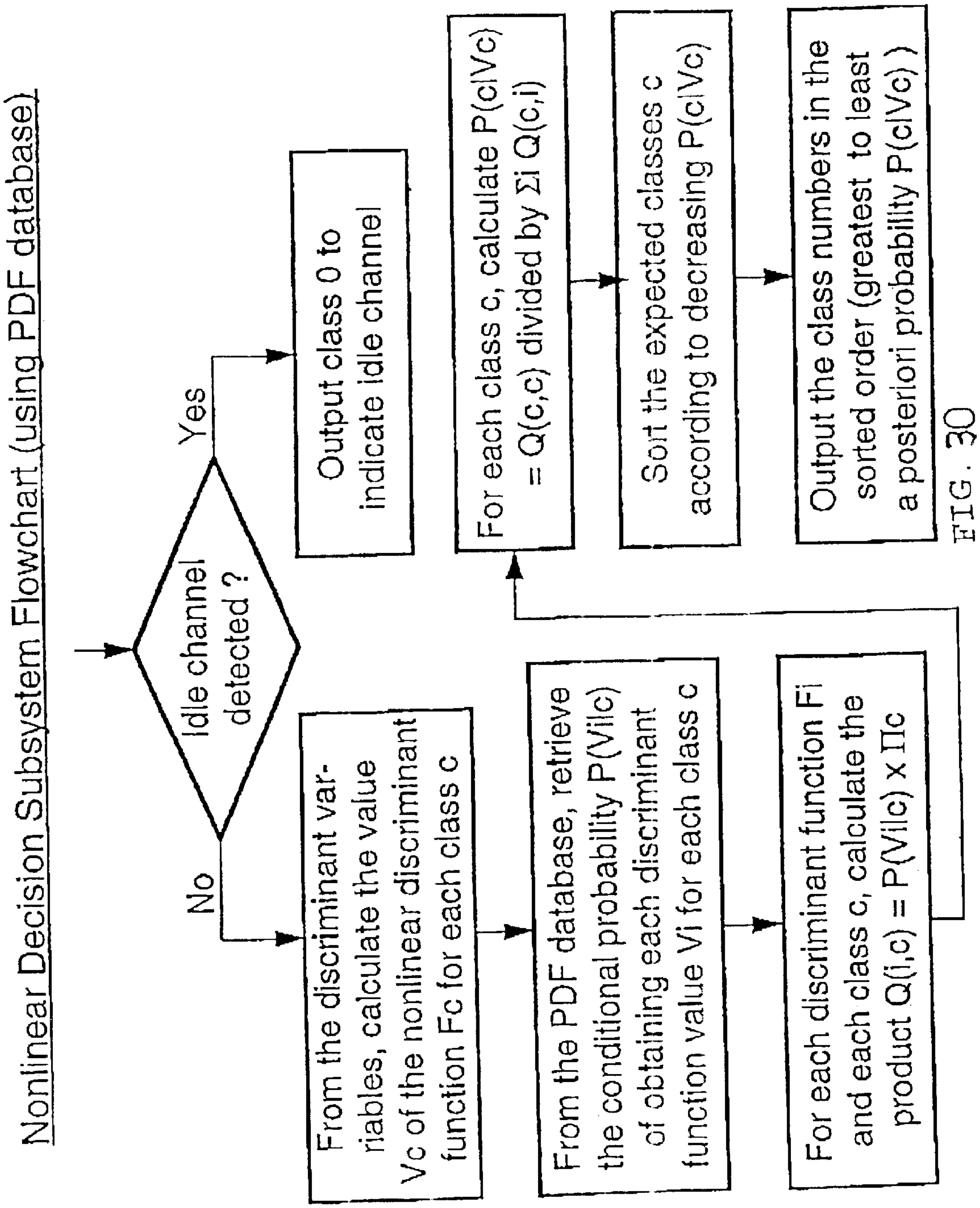
FIG. 30 is a schematic showing a Nonlinear Decision Subsystem (using PDF database)

FIG. 29 illustrates a signal classifier with the same elements as in FIG. 24, except the Bayesian decision sub-system 44 uses non-linear discriminant functions operating as shown in FIG. 30, which is the same process as shown in FIG. 26 except that Vc is calculated based on a non-linear discriminant function Fc.

Figure 31:
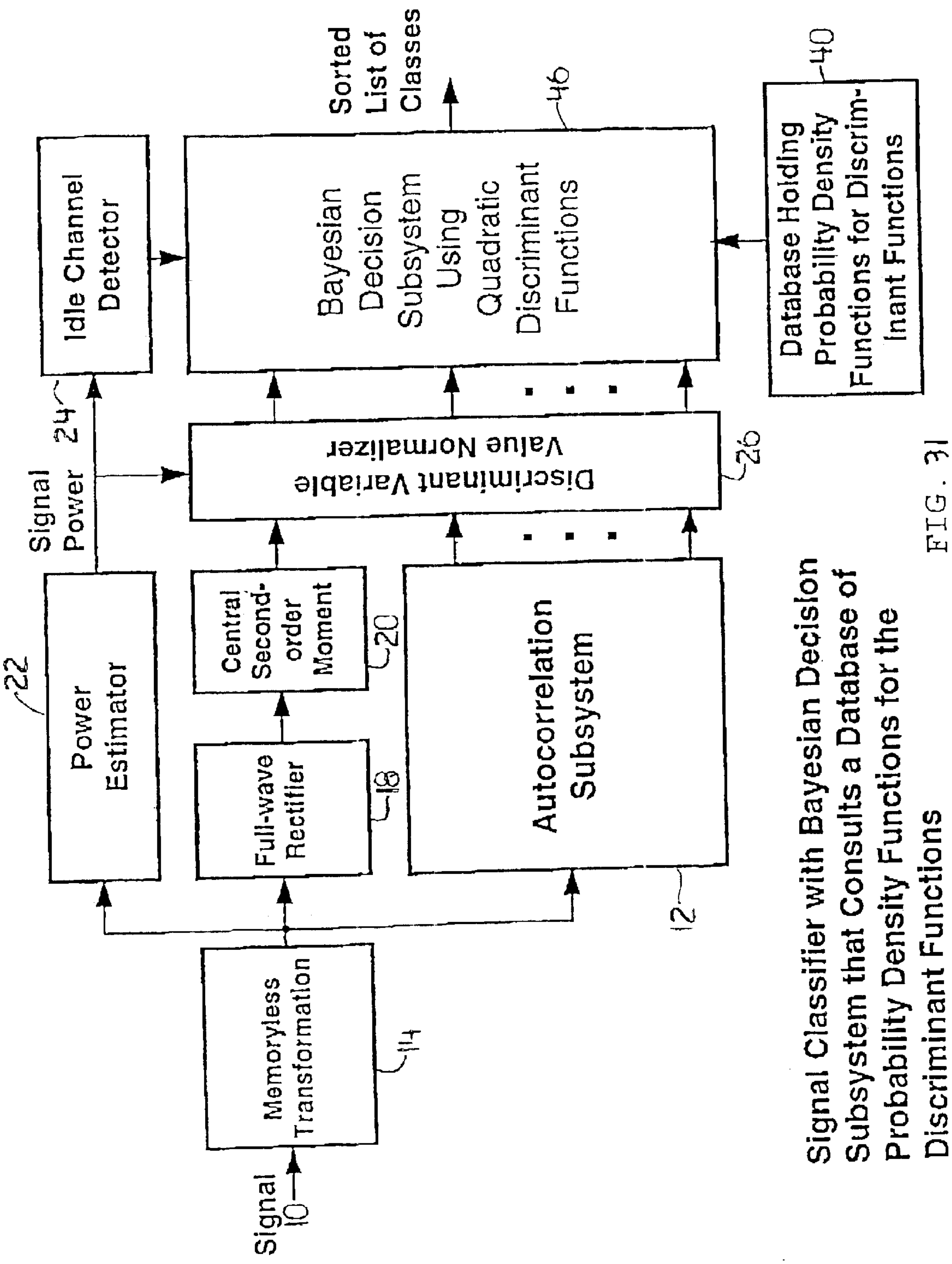
FIG. 31 is a schematic showing a Signal Classifier with Bayesian Decision Subsystem that Consults a Database of Probability Density Functions for the Discrimnant Functions.
Figure 32:
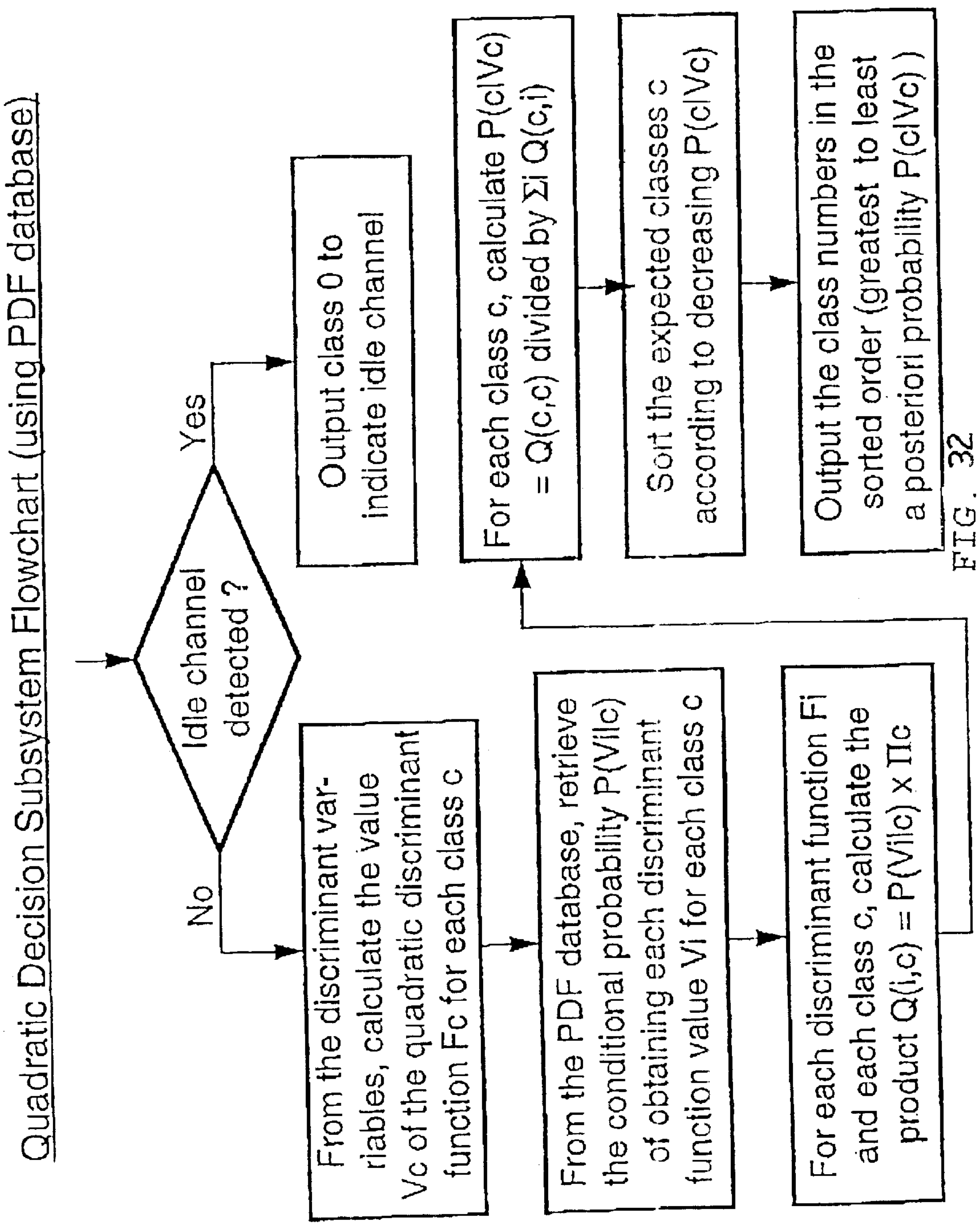
FIG. 32 is a schematic showing a Quadratic Decision Subsystem (using PDF database)

FIG. 31 illustrates a signal classifier with the same elements as in FIG. 24, except the Bayesian decision sub-system 46 uses quadratic discriminant functions operating as shown in FIG. 32, which is the same process as shown in FIG. 26 except that Vc is calculated based on a quadratic discriminant function Fc.

Figure 33:
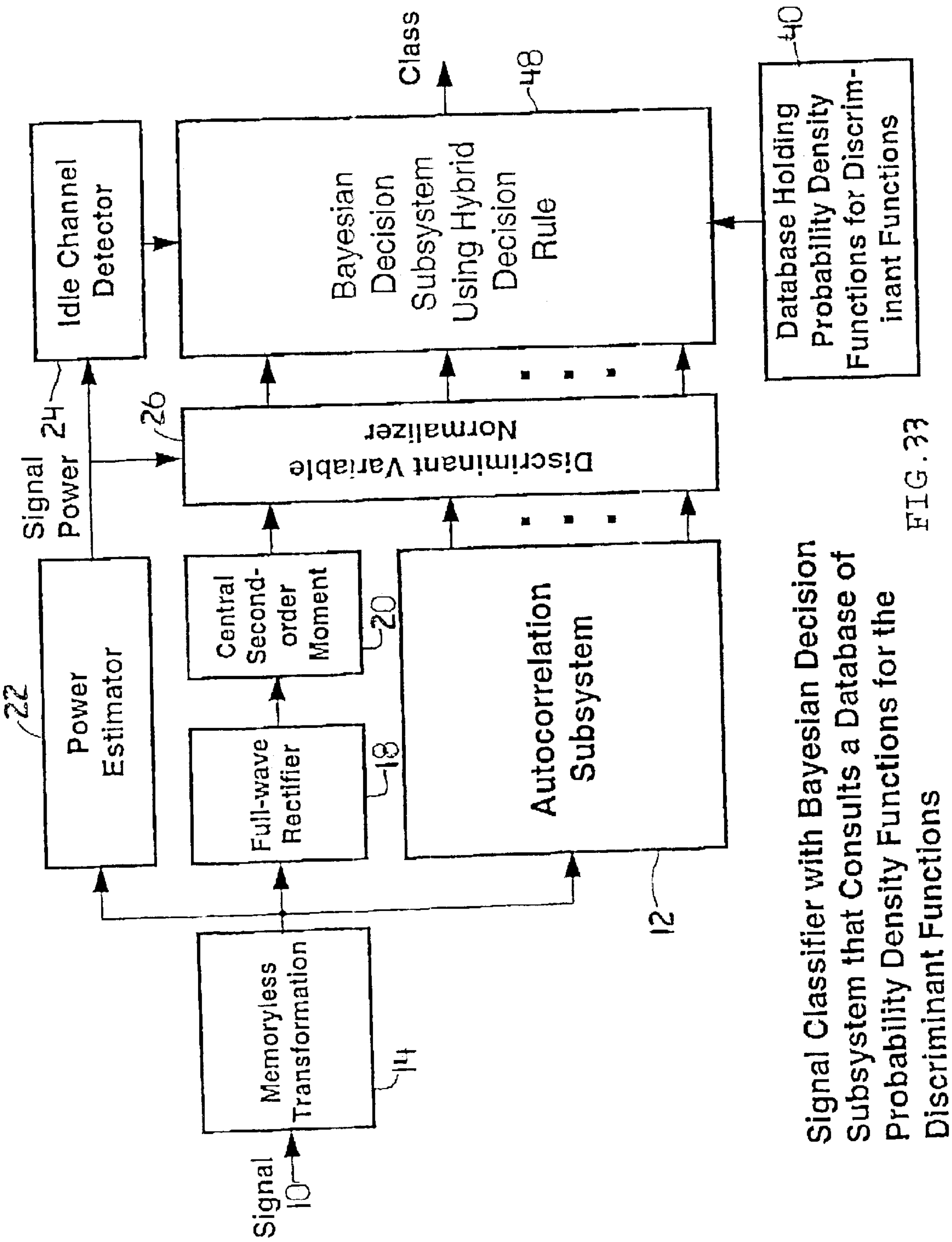
FIG. 33 is a schematic showing a Signal Classifier with Bayesian Decision Subsystem that Consults a Database of Probability Density Functions for the Discriminant Functions.
Figure 34:
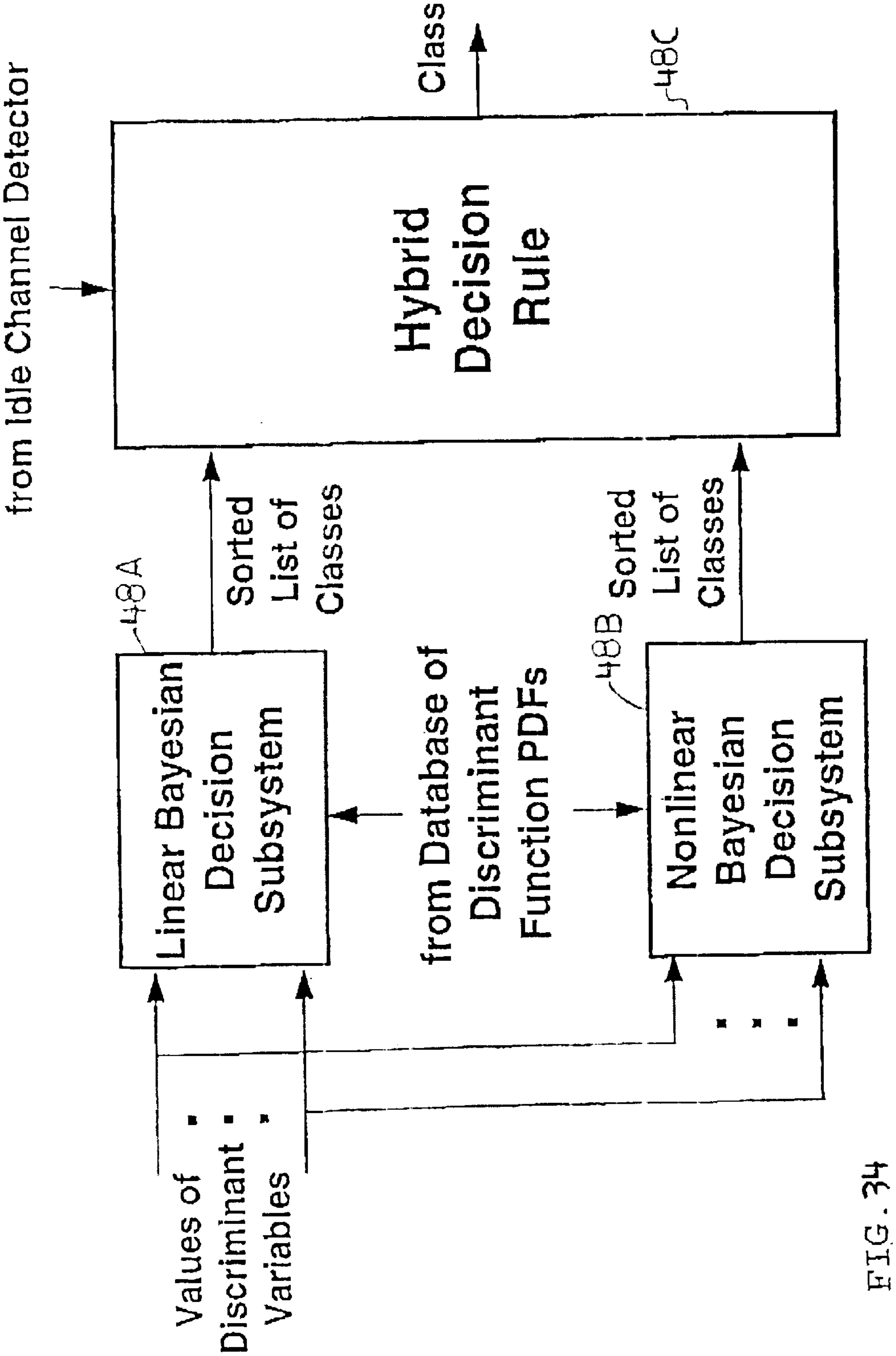
FIG. 34 is a schematic showing a Bayesian Decision Subsystem Using Hybrid Decision Rule.

FIG. 33 illustrates a signal classifier with the same elements as in FIG. 24, except the Bayesian decision sub-system uses a hybrid decision rule module 48 operating as shown in FIG. 34. As shown in FIG. 34, the decision sub-systems 48*a*, 48*b* operate as shown in FIGS. 28 and 30 respectively and each outputs a sorted list of classes. A decision rule module 48*c* then chooses between the respective outputs as described above in relation to FIGS. 12 and 14.

Figure 35:
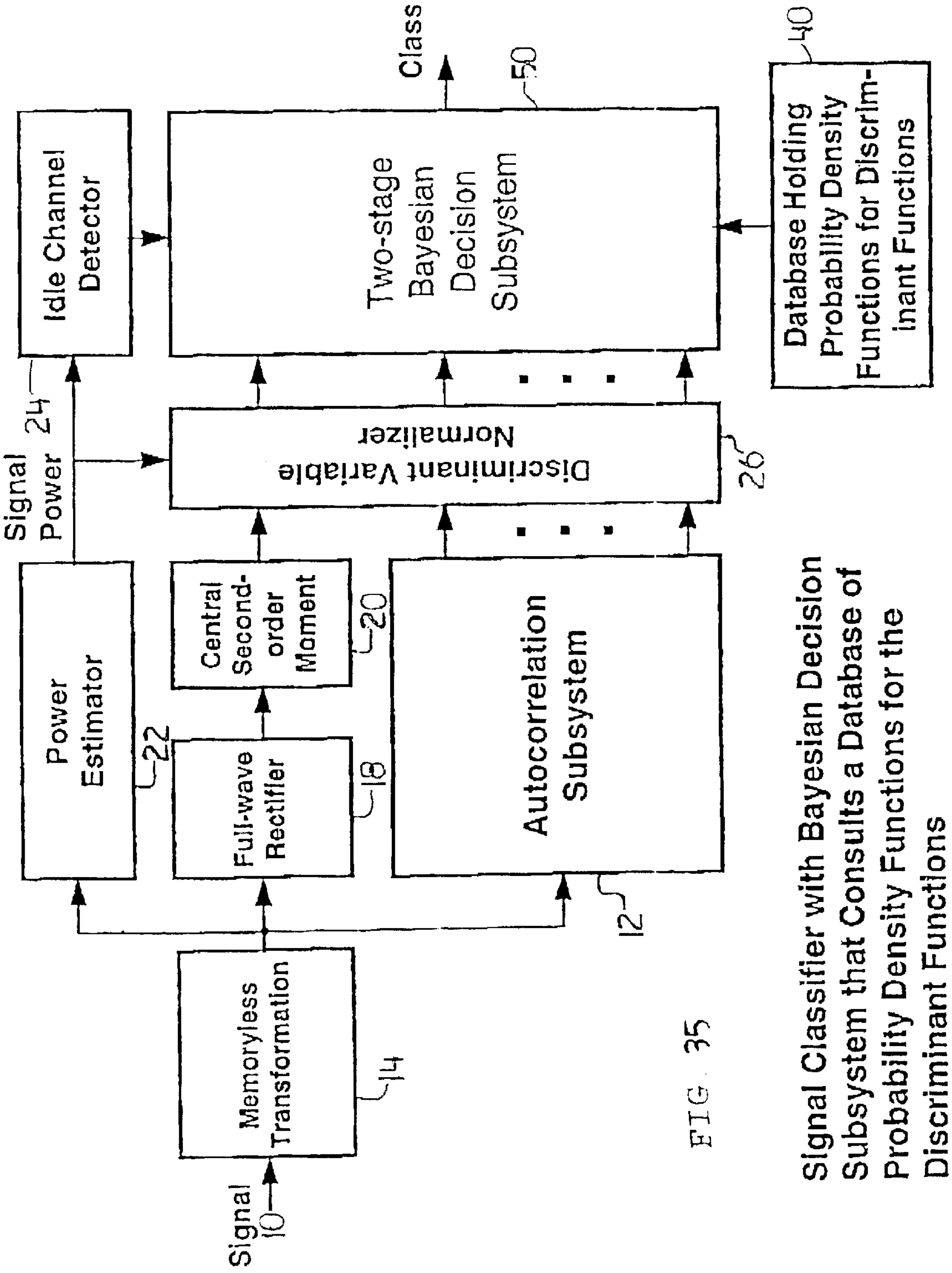
FIG. 35 is a schematic showing a Signal Classifier with Bayesian Decision Subsystem that Consults a Database of Probability Density Functions for the Discriminant Functions.
Figure 36:
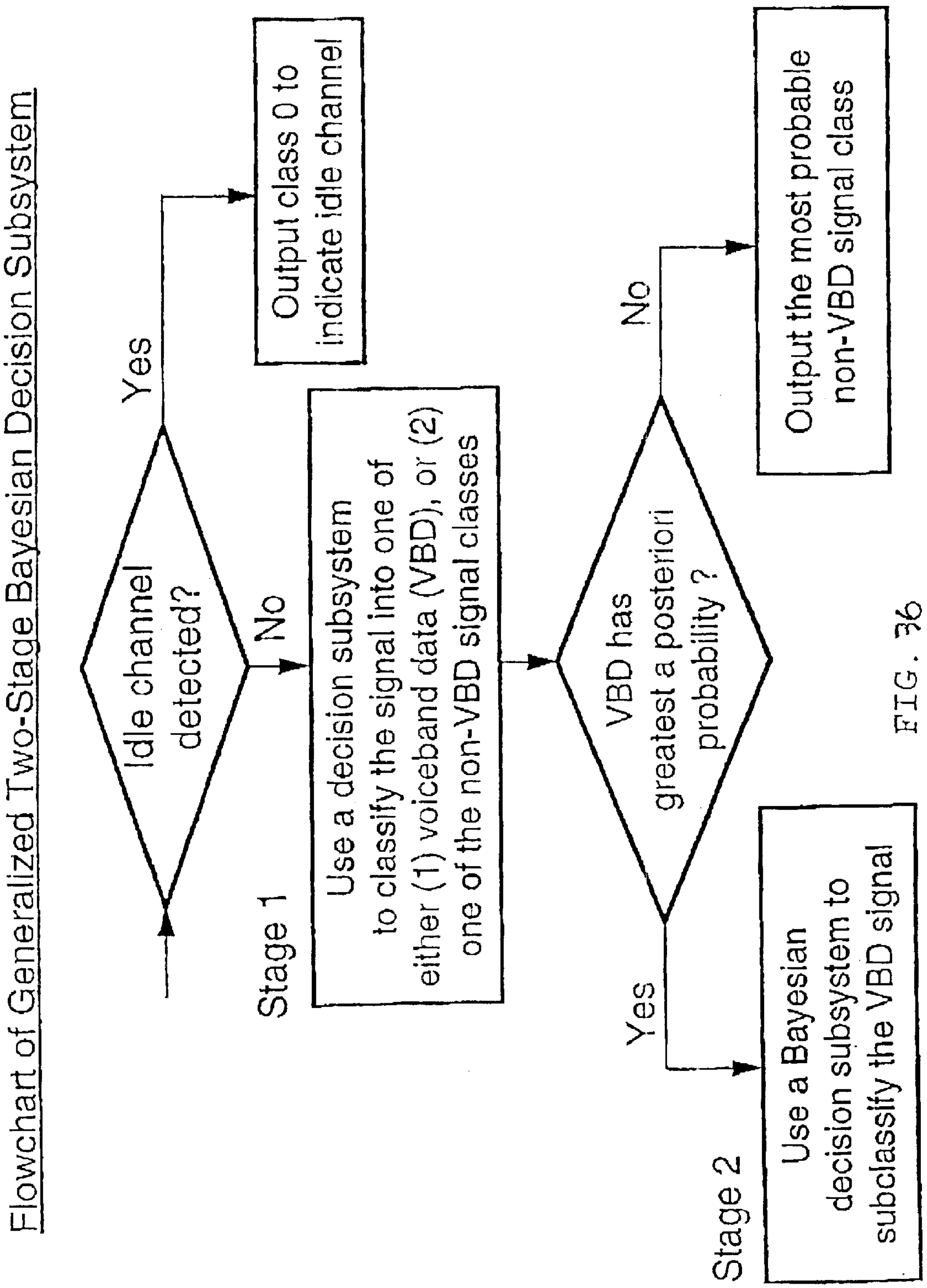
FIG. 36 is a schematic showing a Generalized Two-Stage Bayesian Decision Subsystem.
Figure 37:
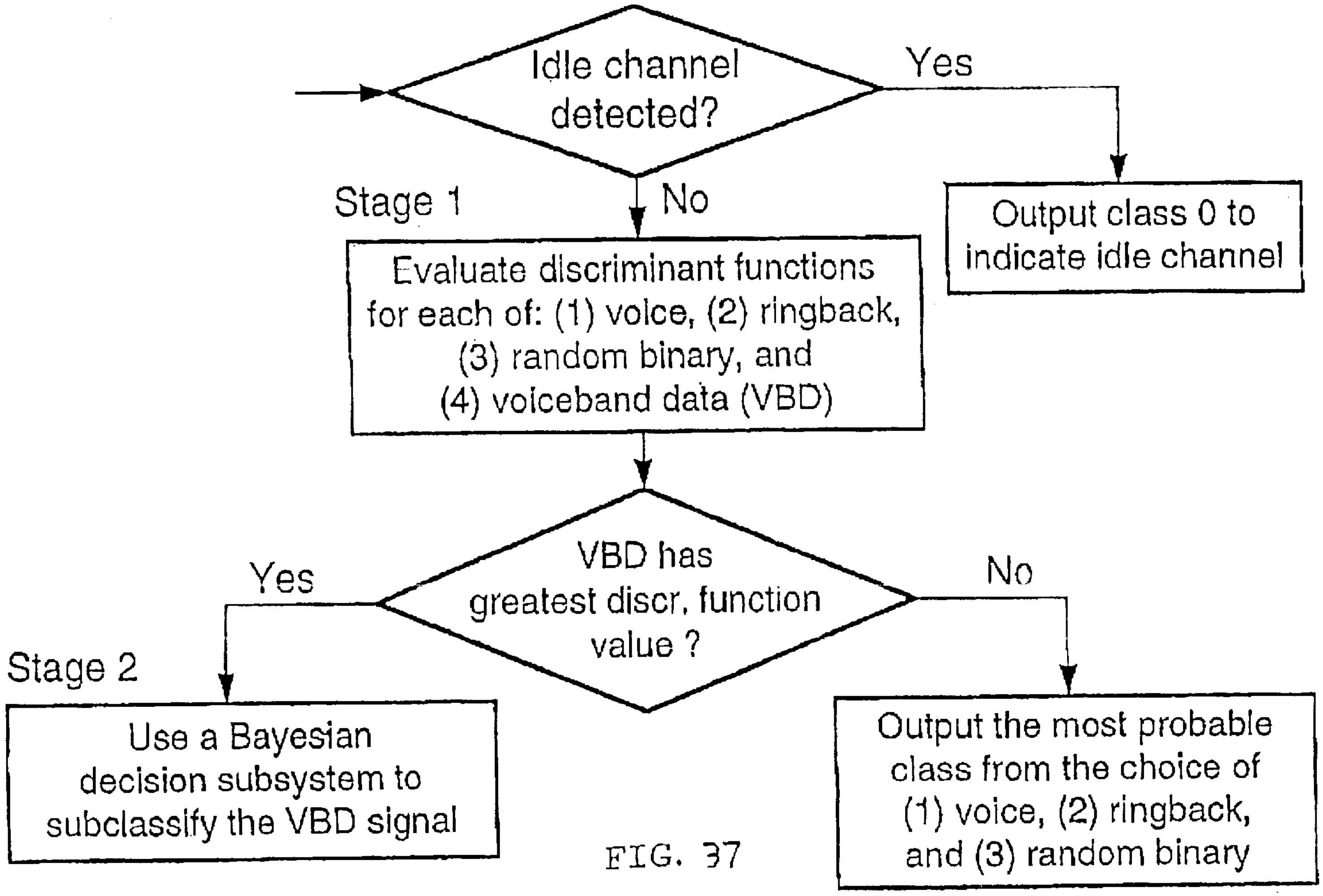
FIG. 37 is a schematic showing a More Specific Two-Stage Bayesian Decision Subsystem.

FIG. 35 illustrates a signal classifier with the same elements as in FIG. 24, except the Bayesian decision sub-system 50 uses a two-stage decision process as outlined in FIGS. 36 or 27. In FIG. 36, first it is determined whether the idle channel is detected. Next, a decision sub-system is used to classify the signal into one of either (1) VBD or (2) one of the non-VBD classes. If VBD has greater a posteriori probability, then a Bayesian decision sub-system 42, 44, 46 or 48 is used to subclassify the VBD signal. If the VBD does not have greater a posteriori probability then the most probable non-VBD signal class is output. FIG. 37 illustrates an alternative to the process of FIG. 36 in which a discriminant functions are used to discriminate between several non-VBD classes, namely voice, ringback and random binary.

Figure 38:
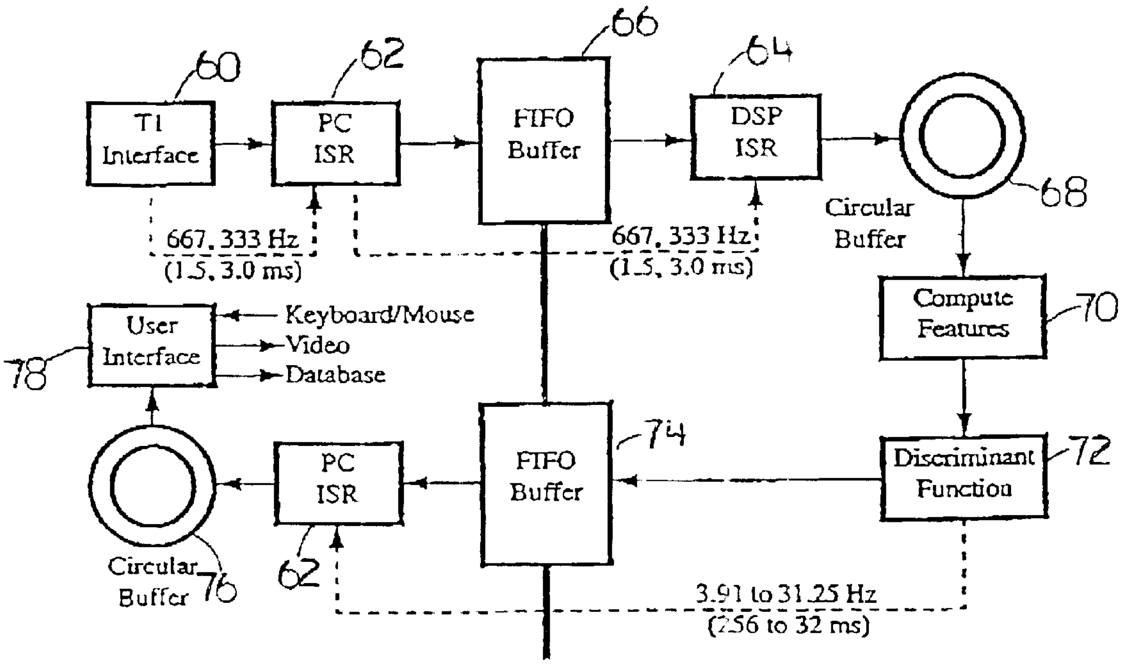
FIG. 38 shows a hardware set up for implementation of the invention.

The voiceband signal classifier may be implemented using a simple operating system such as MS-DOS, for its predictable behaviour, or an operating system with a graphical user interface (GUI), for its ease of compatibility with other commercial software. FIG. 38 shows an implementation. A T1 card 60 may be used to frame on an incoming T1 signal and to extract 8 bit PCM data for voice channels. A digital signal processor (DSP) 64 may be used to implement the LDFs and QDFs. The classification vectors are stored in a database.

Data is extracted using the T1 card 60, and when enough samples are gathered, the T1 card 60 generates an interrupt to a PC 62, which is preferably as powerful and fast as the budget for the project will allow. A PC Interrupt Service Routine acknowledges the interrupt by copying data from PC-T1 shared memory to a FIFO buffer 66 that is shared between the PC 62 and the DSP 64. The DSP 64, PC 62 and FIFO buffer 66 are used if the PC CPU is not fast enough to perform real time classification. The PC 62 then generates an interrupt to the DSP card 64. The DSP ISR responds by copying the data from the FIFO buffer 66 into an internal circular buffer 68. A circular buffer 68 is required to provide elastic data storage during the discriminant function computation. If a circular buffer 68 is not used then incoming data will be lost while the DSP 64 is busy computing the classification decisions for the previous batch of data. Data is then copied from the circular buffer 68 to compute the feature variables at 70. Data samples will temporarily back up in the circular buffer 68 when the DSP 64 is busy evaluating the discriminant functions. Once the LDF and QDF have been evaluated at 72, a class is selected for each of the 24 channels. The classes assigned to each channel are called classification vectors. The classification vectors are then copied into another shared PC-DSP FIFO buffer 74 and then the DSP 64 generates an interrupt to the PC 62 to let the PC 62 know that new vectors are available. The PC 62 then copies the classification vectors into a circular buffer 76, again to ensure that no data loss will occur when the PC is temporarily unable to attend to the data. The GUI 78 then extracts the classification vectors from the circular buffer 76 and displays the results on the video monitor (if a real-time display is being viewed by the user), and stores them into a database.

Various programs, such as MATLAB™ software may be used to analyze the data, and various database programs such as dBase IV may be used for reading and writing data. Classification data stored may include, for each database entry, the channel, classification vector returned by the DSP, number of classification vectors returned by the entry, segment size, classification method, variables used, starting date, starting time, starting seconds and whether the entry was made as part of a synchronization phase.

The algorithms running on the DSP 64 are able to process data in real time for a segment size of 1020 samples or greater. If a segment size of 252 or 516 is selected, the DSP 64 cannot keep up with the incoming data and starts losing data. This limit is postponed if fewer than 24 channels are monitored and if the LDF's and QDF's are not both being evaluated. The main reason of this limitation has to do with the frequency at which the LDF and QDF are calculated. For the 1020 segment size, the LDF's and QDF's are only calculated about 8 times per second, but for the 252 and 516 segment sizes the LDF's and QDF's are calculated about 16 and 32 times per second, respectively. These additional computations cannot be completed in real time for all 24 channels. To ensure no data loss, the discriminant function calculation and backed-up feature variable calculations must be completed before then next LDF and QDF calculation. If this does not occur, the buffer count will continue to increase until it exceeds full capacity resulting in a loss of data. For example, for a 1020-sample segment size, the ramping up and down of the buffer count occurs just before the next LDF and QDF calculation. The cycle continues with the beginning of each discriminant function calculation beginning with a buffer count of zero. For the 516 segment size there is enough time to complete the LDF and QDF calculation, but not enough real time for the feature variable catch up stage, resulting in an increase of the buffer count and finally in the loss of data. This is also true when the segment size is 252, the only difference being that there is not even enough time to compute the LDF and QDF calculation before the next classification decision time arrives.

In conclusion, the DSP 64 is only able to classify data in real time if the segment size is greater than 1020 samples, and the LDF and QDF are being evaluated. On the other hand, a different choice of DSP may result in shorter length samples being able to be processed in real time.

There are three stages in the classification process: the DSP 64 ISR for incoming T1 data buffers, the feature variable calculation, and the discriminant function evaluation. Each of these stages differs in its computational requirements, as discussed below.

The ISR stage does not burden the DSP 64 as much compared with the other stages of the classification process. The ISR simply copies data from the shared PC-DSP FIFO buffer 66 into the DSP circular buffer 68. This takes about 7% of the DSP's time (i.e. 2.8 MIPs) between superframe interrupts (1.5 ms). The ISR is executed by the DSP 64 with a higher priority than other routines; however, ISR handling may be delayed during critical computations that must be made without being interrupted, such as updating pointers and flags associated with the circular buffer 68. This is a critical section because, if this section is interrupted, the interrupting code could corrupt the circular buffer data structure.

The feature variable computation stage is computed once new data arrives. The data is processed 12 samples at a time for each channel (one superframe), and takes about 68% of the DSP's time (i.e. 27.2 MIPS) between superframe interrupts. It is important that this stage be computed efficiently because it directly affects how quickly the buffer 68 gets cleared before the next disciiminant function evaluation stage (feature variable catch-up).

The evaluation of the discriminant functions imposes a sudden load at the end of each segment. The buffer count swells to a maximum value of 36 during this stage. Since the buffer count increments once every 1.5 ms, this count corresponds to an approximate time of 54 ms.

The actual number of multiply and accumulates required for the LDF and QDF for N classes and J feature variables, are given by:

Computations for LDF=N (J+1) Multiply and Accumulates

Computations for QDF=N($J^2$+2J+2) Multiply and Accumulates

By reducing the number of classes, N, and the number of feature variables, J, the number of computations required reduce thus making real time classification at segment sizes of less than 1020 samples possible.

One can obtain an approximate limit on the computational load of the discriminant function evaluation (assuming 23 classes and 11 feature variables) as follows. The DSP just barely keeps up at the 1020 segment size. The upper limit on discriminant function calculation is thus (40 MIPS)*(100%−70%−68%)=10 MIPS. Clearly this load is inversely proportional to the segment size. Therefore we have, (8000/1020)M 10 MIPS, where M is a constant or proportionality. Thus the load of the discriminant function evaluation is upper bounded by:

(*8000*/Segment Size)(1.275)MIPS.

If the number of feature variables were now reduced from 11 to 6, the computational load on the DSP is reduced. Using six variables results in a higher classification accuracies for both the LDF's and QDF's). The computations required to complete the feature variable calculation stage and discriminant function evaluation stage are both reduced by approximately 45% and 60%, respectively. The computations saved for the feature variable calculation stage is only valid if the same 6 variables are used for both the LDF's and QDF's. With these computational savings it is likely that the classifier can handle a segment size of 516 samples without losing any data samples. Additional computational savings are likely needed to handle a segment size of 252 samples.

Multiple T1 lines may be handled using multiple processor DSPs or multiplexing the signal from several T1 lines to the DSP.

As the segment size increases, the classification accuracy also increases. A larger segment size allows more information about the signal to be considered by the classifier before generating a classification vector. For LDF's, the accuracy averaged over all classes ranges from 96% to 87% for segment sizes falling from 2052 to 252 samples. The largest drips in accuracy occur in classes 1, 4, 5, 6, 7, and 8. The classification accuracy for QDF's falls from 99% to 97%, with largest drips appearing in classes 4, 5, and 8. Using an ALN (adaptive logic network) method, the classification accuracy only falls from 99% to 97%, with the largest drops occurring in classes 4 and 5. Overall the QDF and ALN methods did not differ significantly in average accuracy (−2%). However, when using the LDF method the accuracy fell 10% as the segment size was shortened from 2052 to 252.

Additional simulations were conducted by further increasing the segment length to determine if the classification accuracy would improve to 99% over all classes while using LDF's. The data used to generate the classification accuracy values for the 2052 sample (4 Hz) segment length were used to generate the data to be used for the 4092 sample (2 Hz) segment length. This was done by taking the values of each corresponding feature variable and then simply averaging them. The data for the 1 Hz and ½ Hz were then obtained similarly.

Using a segment length of 16416 samples (−½ Hz) the classification accuracy over all classes improves from 96.06% (using a 2052 segment size) to 99.41%. The classes which showed the most improvements were classes 1, 5, and 8.

QDF accuracies are sensitive to the training conditions, and it is preferred to ensure adequate training before using the output from the classifier. For example, for voice only portions of calls that contain clear speech samples should be used. Silence should be removed. For data calls, the initial negotation phase needs to be removed, along with any FSK signalling. In general, the training data should closely simulate the actual expected data. In addition, increasing the segment size increases the accuracy of the classifier. On the other hand, the classifier segment length should, as a rule of thumb, be no greater than half the duration of the smallest signal class, to avoid misclassification at signal transitions. Misclassification may also occur if the classifier segment is asynchronous with signal transition times. If the segment boundaries straddle a signal transition, then misclassification may occur. It has been found that classification accuracy does not necessarily increase with increasing numbers of variables. Thus, selecting a subset of variables is preferred.

Figure 39:
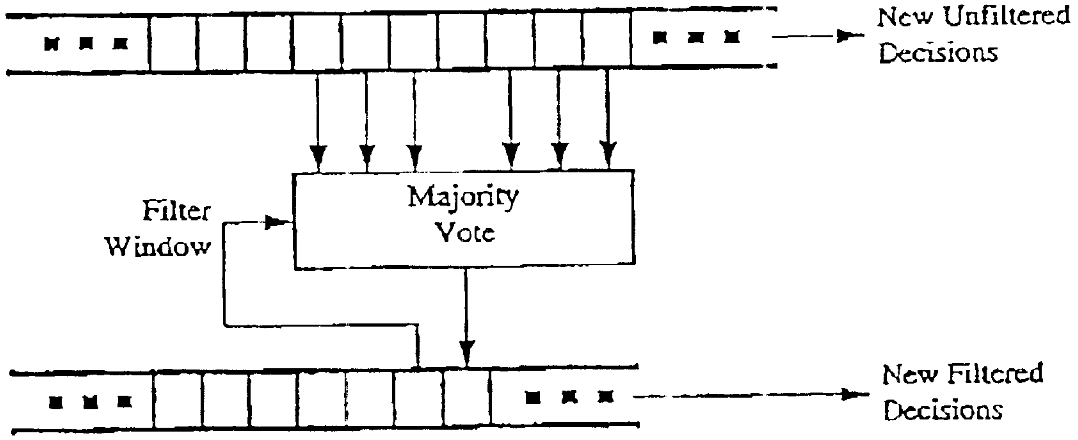
FIG. 39 shows a filter for improving classification decisions.

Another misclassification avoidance technique is to use a filter. One example of a filter is a majority filter. The filter looks at a window on the output from the classifier containing a user defined number of classification decisions. If the window does not contain a clear majority of decisions classifying a single class, then the previous decision is kept, otherwise the decision is taken to be the majority decision. The window is then moved and the process repeated. An application of a filter is shown in FIG. 39. Filter lengths of 1.25 to 5 seconds have been shown to improve signal classification accuracy. Using a filter of length greater than 10 seconds runs the risk of bridging adjacent calls on a busy T1.

For speech a larger filter window is desired to filter away as many silent intervals as possible. However, using an overly long filter window on non-speech calls, actual signals are lost. An adaptive, multiple-window filter may be required. For example, if the present call has a majority of speech in the filter window, then the filter can be made to change the window size to the speech window filter setting for the next filter output. If the filter determines that the majority is non-speech, then it could be made to change back to the non-speech window filter setting.

The maximum filter window that can be used without filtering out actual signal transitions depends on the signal that is present for the shortest period of time. PSK signalling and ringback are clearly not present in an actual call for a long period of time compared with, say, facsimile or modern calls. DTMF tones are only actually present for a fraction of a second, possibly only 50 ms for automatic dialers. Manually activated DTMF signals will of course be several times longer. Even if a small 1.5 second filter window is selected, a DTMF tone would have to be present for a least 750 ms or else the filter would remove it. Another method would be to disable short-window filtering when DTMF tones can reasonably be expected. The problem with this method is that the classifier would have to be very certain that any DTMF detected were in fact not misclassifications. Unfortunately, class 1(v.22F), and class 8 (speech) are two classes that have been seen to be sometimes misclassified as DTMF tones.

While the preferred embodiment uses linear and quadratic discriminant functions, the hybrid decision device may also be implemented with either or both LDFs and QDFs along with an adaptive logic network (ALN). An ALN is available from Dendronic Decisions Limited of Edmonton, Alberta, Canada. ALNs use piecewise linear methods to develop flexible boundaries between the classes. The first step in classifying a new observation is to determine which linear segment in each variable's domain needs to be evaluated. This is done with the help of a decision tree. Once the relevant linear segment has been determined, it is a matter of evaluating an equation for each group. For implementation of the ALN, the following parameters may be used: Minweight=−10000, Maxweight=10000, Input epsilon=0.001, Output epsilon=0.2, Jitter=true, Learn rate=0.3, Min Rmse=0.001, Epochs=14, Random seed=238. The train file should be named "1_all.txt" and the test file should be named "2_all.txt". Each file should be formatted so that the feature and class variables are all on one row separated by tab characters. The class needs to be the last column in each row. Also, any row that begins with a ";" character is ignored. All parameters are read in as command line segments. To get the syntax, the name of the executable file is typed.

In analyzing the performance of the hybrid and two-stage classifiers, three new classes were added. These were: Class 10, FSK signalling, from which the number of pages in a fax call can be determined since FSK signalling is used at the page breaks; Class 11, ringback and Class 12, DTMF tones. There are 12 DTMF tones corresponding to the 12 buttons on the handset, but they are treated as one class. Class 9 was also expanded to include V.90 downlink signals.

Input from pages 108–112

In the implementation described here, when monitoring wireless channels, non-standard modes such as V.34 were ignored, and may be required to be taken into account during training. Since V.34 has several different modes, several new classes may be required. All classes should be used if the mix of classes is not known. Fewer classes may be used when fewer classes are known to be used. A 2052 segment size appears to be a good compromise between high accuracy and precision. This is about four classification vectors per second, which is fast enough to track signal transitions in most signal classes, although it is too large to accurately collect DTMF digits at their maximum arrival rate. On the other hand, it has been found that only one set of filter coefficients need be stored in the classifier, regardless of the segment size used.

Signal classification of speech does not appear to be affected by the power threshold level. However, too high a power threshold may result in a difficulty in filtering silent signals from speech, and too low a power threshold may cause more misclassifications with decreased signal to noise ration.

In one set of trials on a T1 trunk, optimized variables for LDF classification were Rd1, Rd2, Rd4, Rd5, Rd8 and N2. For QDF, they were Rd1, Rd2, Rd3, Rd5, Rd6 and Rd7. However, any six variables for QDF have been found to yield almost identical classification accuracies, hence if only one set of variables is used with LDFs and QDFs, then the preferred set for LDFs should be used.

Using probability distributions may improve classification accuracy, if the probabilities are known in advance. The applicants have found that the type of traffic on a T1 varies considerably. Therefore, the probabilities should be adaptive, and should be changed as the signal mix changes. However, this is complicated, and, since the classifier is already quite accurate, cannot be expected to yield much improvement in a given case.

Figure 40:
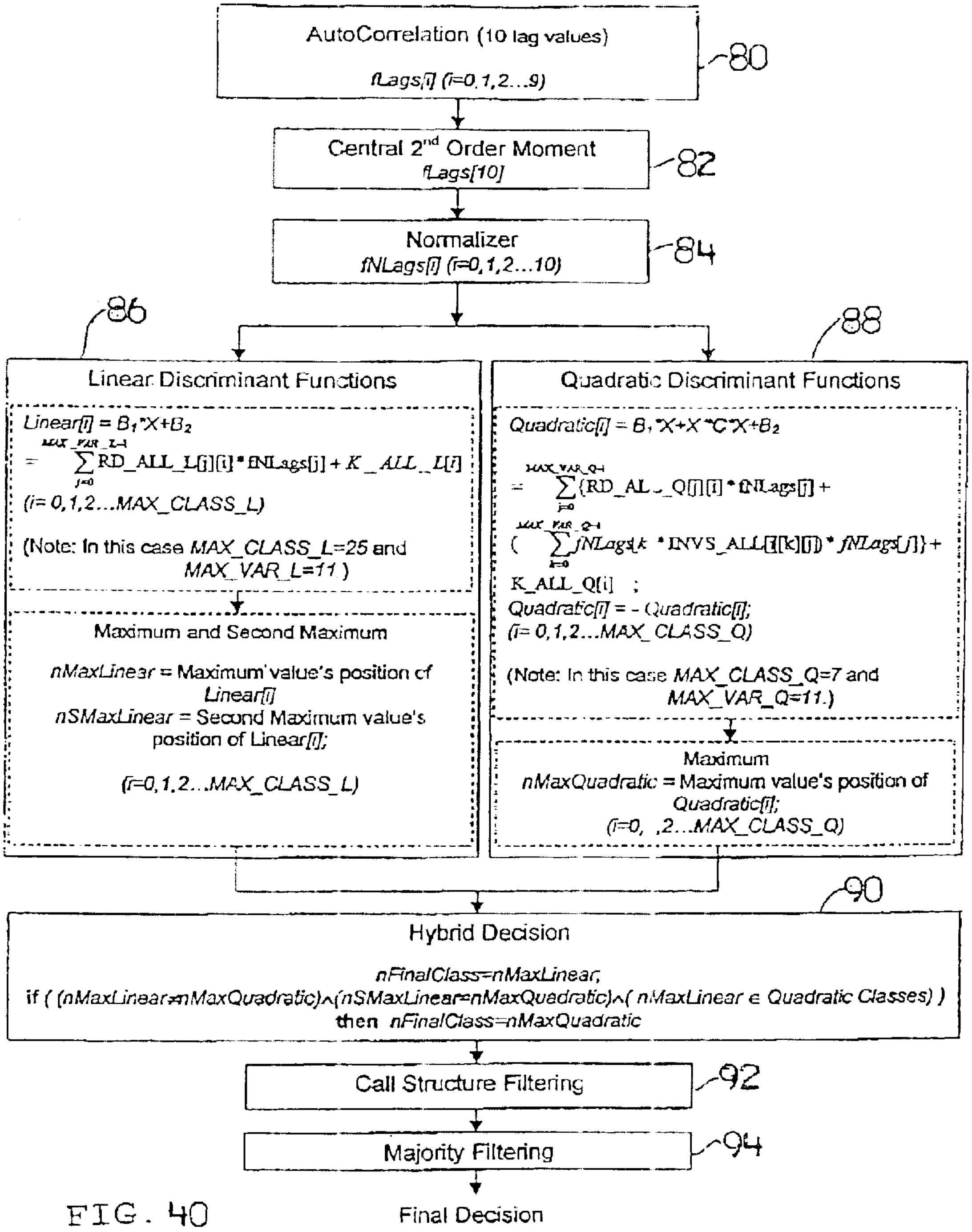
FIG. 40 is a flow chart showing an exemplary classification algorithm.

The data may be stored for off-line queries, and may be displayed conveniently as busy hour and pie chart graphs. An exemplary classification is illustrated in the flow chart in FIG. 40 First, the autocorrelation of the input segment is calculated at 80 for 10 lag values fLags (i=0, 1 . . . 9). Next, the central second-order moment is calculated at 82 for the input segment (fLags[10]). The calculated values are normalized at 84 to yield fNLags, which is a vector having 11 entries.

A linear discriminant function is applied to fNLags, as shown in the Figure at 86, where the matrix $B_1$ is composed of values RD_ALL_L[j][i] derived from using a training sequence. $B_2$ is a vector of constants K_ALL_L[i] that are also derived from a training sequence, where i=0, 1, . . . , 25. The linear discriminant function sums the product of $B^1$ and fNLags[j] plus $B_2$ for all values of fNLags[j], where j=0, . . . , 10 in this example. The linear discriminant function is applied for each class i for which the coefficients of the linear discriminant function have been found using a raining sequence. Once values for the discriminant function have been found for all classes, then the class (nMaxLinear) with the maximum function value as well as the class (nSMaxLinear) with the second maximum value is identified.

A quadratic discriminant function is also applied to fNLags, as shown in the Figure at 88, where the matrix $B_1$ is composed of values RD_ALL_Q[i][i] derived from using a training sequence. $B_2$ is a vector of constants K_ALL_Q[i] that are also derived from a training sequence. C is a matrix composed of values INKS_ALL[i][j][k] also found using a training sequence. The quadratic discriminant function sums the product of $B_1$ and fNLags[j] plus the vector of constants $B_2$ plus the product of the transpose of fNLags[j] and C and fNLags[j] for all values of fNLags[j], where where i=0, 1 . . . 7, j=0, . . . , 10 and k=0, 1 . . . , 10 in this example. The quadratic discriminant function is applied for each class for which the coefficients of the quadratic discriminant function have been found using a training sequence. Once values for the discriminant function have been found for all classes, then the class (nMaxQuadratic) with the maximum function value is found.

Next, a hybrid decision is made at 90. If nMaxLinear is not equal to nMaxQuadratic, and nSMaxLinear equals nMaxQuadratic, and nMaxLinear is a member of the quadratic classes, then the final decision, nFinalClass is set equal to nMaxQuadratic. Otherwise, nFinalClass is set to be nMaxLinear.

Following the hybrid decision, the call structure may be filtered at 92, or majority filtering applied at 94 before yield a final decision.

Call structure filtering is illustrated in FIGS. 41A and 41B. FIG. 41A shows a typical call structure set up showing a sequence of rings and silence followed by speech or other signals. The object is to remove misclassifications in and around the time of ringing signal. These misclassifications could be due to noise confusing mixtures of known signals, or initial data training signals for which the classifier has not been trained. If the summation of the ringback signal in a given period (during a ring sequence, eg between ① and ③ in FIG. 41A) is less than a set threshold (determined at 100), and the algorithm has not just left from a ringing phase (determined at 102), then the signal is assumed to be a signal to be classified and passed by the filter for further filtering. If the summation of ringback between ② and ③ is more than a set threshold, then the ringing phase is entered and the threshold decreased, eg by 50% at 104. The signals between ① and ② in the eg 2s preceding the ringing) are set to silence at 106. The signals between ② and ③ (eg next 2s period) are set to ringback at 108. The signals in the 2s following ringback at 3 to ④ are set to silence at 110. The operation of the algorithm is then delayed for 6 seconds at 112. The call set up filter then returns back to check whether the summation of ringback signal between ② and ③ is more than the threshold. When it goes below threshold, having gone through the ringing phase, the threshold is reset to its original signal at 114 and the signal passed for further processing.

While preferred implementations of the invention have been described as illustrative of the invention, the invention is defined in the claims that follow. Immaterial variations of the invention as claimed are intended to be covered by the claims. For example, various methods may be used to arrive at the optimum form of the discriminant functions, such as Fisher's linear discriminant functions discussed in P. A. Lachenbruch, Discriminant Analysis, MacMillan Publishing Co., New York, 1975. Fisher's method yields accuracies that approach those obtainable using Bayes' theorem. The classifier could be implemeted as either a program running on a single computer or as programs running on two or more computers including DSPs.

TABLE 4

Percent classification accuracy using the hybrid method (N = 2052, Std V.34, Incl. EN).

| Class | 1 | 2 | 3 | 4 | 5 | 6 | 7 | 8 | 9 | 10 | 11 | 12 | >12 |
|---|---|---|---|---|---|---|---|---|---|---|---|---|---|
| 1 | 99.93 | — | — | — | — | — | — | — | — | — | — | 0.07 | — |
| 2 | — | 100.00 | — | — | — | — | — | — | — | — | — | — | — |
| 3 | — | — | 99.90 | — | 0.04 | — | 0.03 | 0.01 | — | — | 0.02 | — | — |
| 4 | — | — | — | 98.80 | 1.20 | — | — | — | — | — | — | — | — |
| 5 | — | — | — | 0.02 | 99.94 | 0.04 | — | — | — | — | — | — | — |
| 6 | — | — | — | — | — | 98.90 | 1.10 | — | — | — | — | — | — |
| 7 | — | — | — | — | — | 1.20 | 98.79 | — | — | — | — | — | 0.01 |
| 8 | — | 0.25 | 1.97 | 1.23 | 0.12 | — | — | 91.63 | 0.49 | — | 1.72 | — | 2.59 |
| 9 | — | — | — | — | — | — | — | — | 100.00 | — | — | — | — |
| 10 | — | — | — | — | — | — | — | — | — | 100.00 | — | — | — |
| 11 | — | — | — | — | — | — | — | — | — | — | 100.00 | — | — |
| 12 | — | — | — | — | — | — | — | — | — | — | — | 100.00 | — |
| >12 | — | — | — | — | — | — | — | — | — | — | — | — | 100.00 |

TABLE 5

Percent classification accuracy using the hybrid method and variables Rd1, 2, 3, 5, 6, and 7 (N = 2052, Std V.34, Incl. EN).

| Class | 1 | 2 | 3 | 4 | 5 | 6 | 7 | 8 | 9 | 10 | 11 | 12 | >12 |
|---|---|---|---|---|---|---|---|---|---|---|---|---|---|
| 1 | 99.93 | — | — | — | — | — | — | — | — | — | — | 0.07 | — |
| 2 | — | 100.00 | — | — | — | — | — | — | — | — | — | — | — |
| 3 | — | — | 99.90 | 0.04 | — | — | 0.03 | 0.01 | — | — | 0.02 | — | — |
| 4 | — | — | — | 98.59 | 1.41 | — | — | — | — | — | — | — | — |
| 5 | — | — | — | 0.16 | 99.80 | 0.04 | — | — | — | — | — | — | — |
| 6 | — | — | — | — | — | 98.90 | 1.10 | — | — | — | — | — | — |
| 7 | — | — | — | — | — | 1.20 | 98.80 | — | — | — | — | — | — |
| 8 | — | 0.25 | 1.97 | 1.23 | 0.12 | — | — | 91.63 | 0.49 | — | 1.72 | — | 2.59 |
| 9 | — | — | — | — | — | — | — | — | 100.00 | — | — | — | — |
| 10 | — | — | — | — | — | — | — | — | — | 100.00 | — | — | — |
| 11 | — | — | — | — | — | — | — | — | — | — | 100.00 | — | — |

TABLE 5-continued

Percent classification accuracy using the hybrid method and variables Rd1, 2, 3, 5, 6, and 7 (N = 2052, Std V.34, Incl. EN).

| Class | 1 | 2 | 3 | 4 | 5 | 6 | 7 | 8 | 9 | 10 | 11 | 12 | >12 |
|---|---|---|---|---|---|---|---|---|---|---|---|---|---|
| 12 | — | — | — | — | — | — | — | — | — | — | — | 100.00 | — |
| >12 | — | — | — | — | — | — | — | — | — | — | — | — | 100.00 |

TABLE 6

Percent classification accuracy using only two classes (N = 2052, LDF, Std V.34, Incl. EN).

| Class | Non-Speech | Speech |
|---|---|---|
| Non-Speech | 99.88 | 0.12 |
| Speech | 5.42 | 94.58 |

TABLE 7

Percent classification accuracy using only two classes (N = 2052, QDF, Std V.34, Incl. EN).

| Class | Non-Speech | Speech |
|---|---|---|
| Non-Speech | 99.51 | 1.49 |
| Speech | 0.25 | 99.75 |

TABLE 8

Percent classification accuracy using only four classes (N = 2052, Std V.34, Incl. EN).

| Class | Non-Speech (Classes 1–7, 10, & 12–23) | Speech | Random Binary | Ringback |
|---|---|---|---|---|
| Non-Speech | 99.99 | 0.01 | — | — |
| Speech | 0.74 | 99.26 | — | — |
| Random Binary | — | — | 100.0 | — |
| Ringback | — | 2.47 | — | 97.53 |

What is claimed is:

1. A signal classifier for classifying a passband signal into one of a plurality of signal classes, the passband signal being carried by a communications network and having at least one segment with N samples, the signal classifier comprising:

an autocorrelator having the passband signal as input and having more than one autocorrelation coefficient as output;

a discriminator operable on a vector of more than one of the autocorrelation coefficients to discriminate between signal classes and classify the passband signal as being a member of at least one of the signal classes; and the discriminator implementing both a linear decision sub-system and a non-linear decision sub-system, in which the linear decision sub-system and the non-linear decision sub-system each operate on a vector containing autocorrelation coefficients.

2. The signal classifier of claim 1 further comprising means to compute a normalized central second-order moment of the segment, and in which the discriminator is operable on the normalized central second-order moment.

3. The signal classifier of claim 2 in which the means to compute the central second-order moment of the segment includes a rectifier for rectifying the passband signal before computation of the central second-order moment.

4. The signal classifier of claims 1 or 3 in which the discriminator uses a non-linear decision sub-system to classify some but not all of the signal classes, and a linear decision sub-system to classify signal classes not classified by the non-linear decision sub-system.

5. The signal classifier of claim 4 in which the discriminator implements a non-linear decision sub-system to classify all classes for which it is trained, and a linear decision sub-system is used to classify all other classes.

TABLE 9

Percent classification accuracy using a two-stage classifier (N = 2052, QDF, Std V.34, Incl. EN).

| Class | 1 | 2 | 3 | 4 | 5 | 6 | 7 | 8 | 9 | 10 | 11 | 12 | >12 |
|---|---|---|---|---|---|---|---|---|---|---|---|---|---|
| 1 | 99.93 | — | — | — | — | — | — | — | — | — | — | 0.07 | — |
| 2 | — | 100.00 | — | — | — | — | — | — | — | — | — | — | — |
| 3 | — | — | 99.93 | 0.04 | — | — | 0.03 | — | — | — | — | — | — |
| 4 | — | — | — | 98.59 | 1.41 | — | — | — | — | — | — | — | — |
| 5 | — | — | — | 0.16 | 99.80 | 0.04 | — | — | — | — | — | — | — |
| 6 | — | — | — | — | — | 98.96 | 1.04 | — | — | — | — | — | — |
| 7 | — | — | — | — | — | 0.99 | 99.0 | — | — | — | — | — | 0.01 |
| 8 | — | — | 0.74 | — | — | — | — | 99.26 | — | — | — | — | — |
| 9 | — | — | — | — | — | — | — | — | 100.00 | — | — | — | — |
| 10 | — | — | — | — | — | — | — | — | — | 100.00 | — | — | — |
| 11 | — | — | — | — | — | — | — | 2.47 | — | — | 97.53 | — | — |
| 12 | — | — | — | — | — | — | — | — | — | — | — | 100.00 | — |
| >12 | — | — | — | — | — | — | — | — | — | — | — | — | 100.00 |

6. The signal classifier of claim 5 further comprising an idle channel detector for identifying when the signal power is below a threshold for a given segment.

7. The signal classifier of claim 1 further comprising means, connected between the autocorrelator and the discriminator, for normalizing the autocorrelation coefficients with respect to the power of the signal segment.

8. The signal classifier of claim 1 in which the passband signal is a voiceband signal.

9. Apparatus for classifying a passband signal, the passband signal being carried by a communications network, the apparatus comprising:

autocorrelation means for forming an autocorrelation value of the passband signal at two or more delay intervals; and means for combining mathematically the autocorrelation values to classify the passband signal as being a member of at least one of a plurality of expected classes;

the means of mathematically combining the values comprising means for using linear combinations operable on a vector of the autocorrelation values to classify the passband signal into one of a plurality of preliminary classes, and means for using nonlinear functions operable on a vector of the autocorrelation values for refining the classification decision to form a final decision assigning the passband signal into one of the plurality of expected classes.

10. The apparatus as defined in claim 9 where the passband signal is processed first by means that map, using a memoryless transformation, the signal into a processed signal which is then input to the autocorrelation means.

11. The apparatus as defined in claim 10 where the memoryless transformation is a nonlinear function.

12. The apparatus as defined in claim 9 where the passband signal is a sequence of codes representing samples of an originally analog signal taken at a regular sampling interval, and where the delay intervals are multiples of the sampling interval.

13. The apparatus as defined in claim 12 where the passband signal is processed using a memoryless one-to-one mapping from the codes to a sequence of processed codes, which represent a processed signal, and where the processed codes are input to the autocorrelation means.

14. The apparatus as defined in claim 13 where the passband signal is classified using a fixed number of consecutively received processed codes representing a finite-length segment of the originally analog signal.

15. The apparatus as defined in claim 14 where the autocorrelation values are normalized with respect to a normalization factor formed from the fixed number of processed codes.

16. The apparatus as defined in claim 15 where the normalization factor is an estimate of the average power of the passband signal contained in the finite-length segment of the originally analog signal.

17. The apparatus as defined in claim 16 where the means of mathematically combining the values of the autocorrelation of the signal use linear combinations of the values.

18. The apparatus as defined in claim 16 where the means of mathematically combining the values of the autocorrelation of the passband signal use nonlinear combinations of the values.

19. The apparatus as defined in claim 16 where the means of mathematically combining the values of the autocorrelation of the signal use quadratic combinations of the values.

20. The apparatus as defined in claim 16 where the means of mathematically combining the values of the autocorrelation of the passband signal use pseudo-quadratic combinations of the values.

* * * * *